United States Patent
Ishida

(10) Patent No.: US 8,736,666 B2
(45) Date of Patent: May 27, 2014

(54) IMAGING DEVICE, DISPLAY CONTROL METHOD AND PROGRAM

(75) Inventor: Yoshihiro Ishida, Tokyo (JP)

(73) Assignee: Sony Corporation, Tokyo (JP)

( * ) Notice: Subject to any disclaimer, the term of this patent is extended or adjusted under 35 U.S.C. 154(b) by 245 days.

(21) Appl. No.: 13/049,104

(22) Filed: Mar. 16, 2011

(65) Prior Publication Data

US 2011/0249149 A1    Oct. 13, 2011

(30) Foreign Application Priority Data

Apr. 9, 2010    (JP) ................. P2010-090117

(51) Int. Cl.
*H04N 7/00*    (2011.01)
*H04N 5/225*    (2006.01)
*H04N 5/76*    (2006.01)

(52) U.S. Cl.
USPC ............... 348/39; 348/218.1; 348/231.6

(58) Field of Classification Search
CPC .......... H04N 5/23238; H04N 5/23216; H04N 5/23293
USPC ............. 348/36, 38, 39, 218.1, 231.2, 231.3, 348/231.6
See application file for complete search history.

(56) References Cited

U.S. PATENT DOCUMENTS

| | | | |
|---|---|---|---|
| 6,392,658 B1 * | 5/2002 | Oura ........................ | 345/629 |
| 6,466,231 B1 * | 10/2002 | Dow et al. ................ | 345/629 |
| 7,064,783 B2 * | 6/2006 | Colavin et al. ........... | 348/231.3 |
| 7,373,017 B2 * | 5/2008 | Edwards et al. .......... | 382/284 |
| 7,424,218 B2 * | 9/2008 | Baudisch et al. ......... | 396/322 |
| 8,174,561 B2 * | 5/2012 | Andersson ................ | 348/39 |
| 2001/0010546 A1 * | 8/2001 | Chen ......................... | 348/218 |
| 2004/0130626 A1 * | 7/2004 | Ouchi et al. .............. | 348/207.1 |
| 2005/0146620 A1 * | 7/2005 | Monroe et al. ........... | 348/208.2 |
| 2009/0021576 A1 * | 1/2009 | Linder et al. ............. | 348/36 |
| 2010/0111429 A1 * | 5/2010 | Wang et al. ............... | 382/233 |
| 2010/0302347 A1 * | 12/2010 | Shikata ...................... | 348/36 |
| 2011/0249146 A1 * | 10/2011 | Ishida ....................... | 348/231.99 |

FOREIGN PATENT DOCUMENTS

| | | |
|---|---|---|
| JP | 11-164326 | 6/1999 |
| JP | 2003-524927 | 8/2003 |
| JP | 2008-186287 | 8/2008 |
| JP | 2009-027398 | 2/2009 |
| JP | 2009-296380 | 12/2009 |

OTHER PUBLICATIONS

Japanese Office Action issued Jan. 21, 2014 in Japanese Patent Application No. 2010-090117, 4 pages (no English translation).

* cited by examiner

*Primary Examiner* — Daniel M Pasiewicz

(74) *Attorney, Agent, or Firm* — Oblon, Spivak, McClelland, Maier & Neustadt, L.L.P.

(57) ABSTRACT

An image processing apparatus that includes an image acquiring unit that acquires a plurality of images, a processing unit that creates a plurality of composite images having a sequential relationship based on a predetermined rule using at least a portion of each of the acquired images, and selects a representative image corresponding to the plurality of composite images.

16 Claims, 35 Drawing Sheets

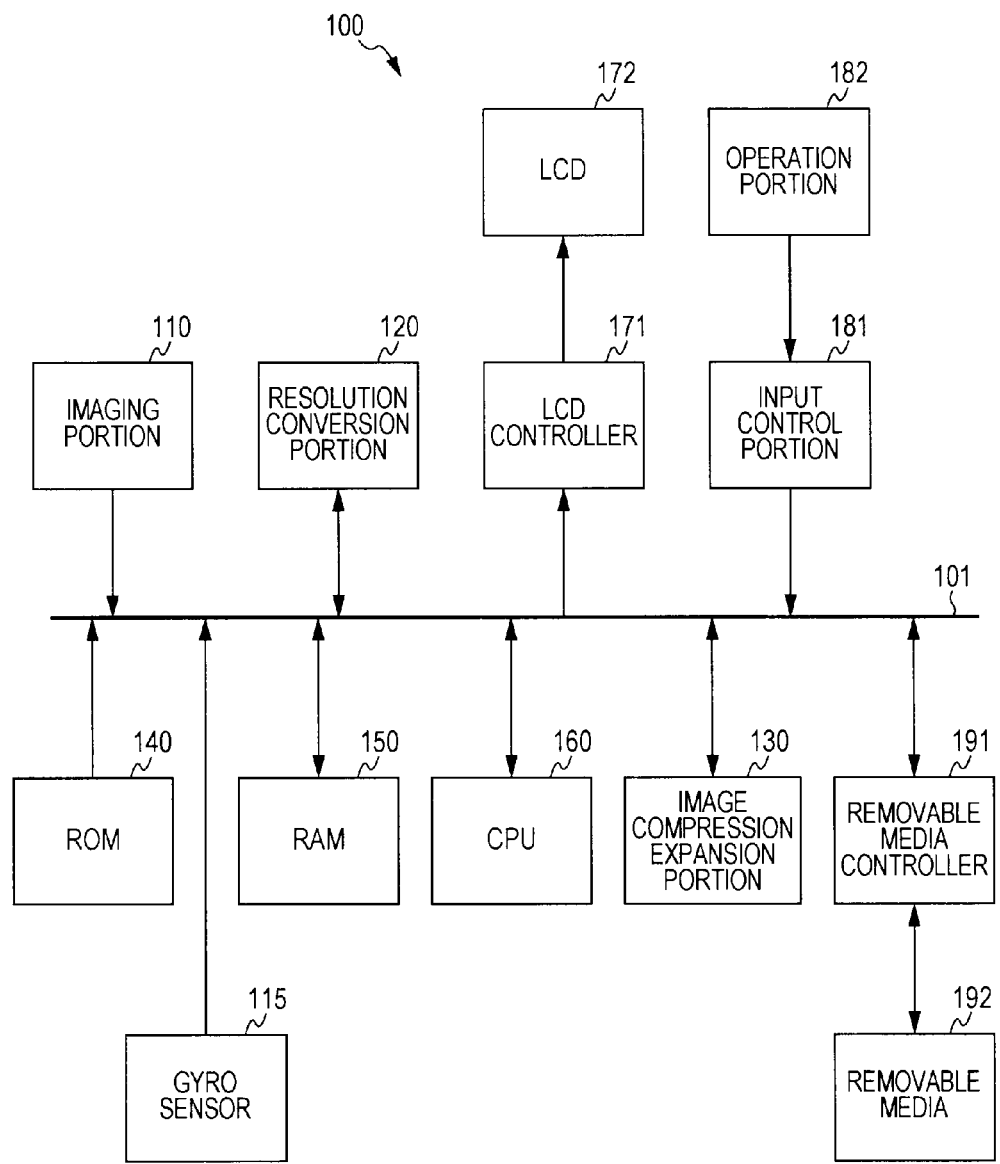

FIG. 2A

| |
|---|
| SOI |
| APP1 |
| APP2 |
| IMAGE (L) (JPEG) |
| EOI |
| SOI |
| APP1 |
| APP2 |
| IMAGE (R) (JPEG) |
| EOI |

| |
|---|
| SOI |
| APP1 |
| APP2 |
| IMAGE (L) (JPEG) |
| EOI |
| SOI |
| APP1 |
| MONITOR DISPLAY IMAGE (SCREEN NAIL (L)) |
| EOI |
| SOI |
| APP1 |
| APP2 |
| IMAGE (R) (JPEG) |
| EOI |
| SOI |
| APP1 |
| MONITOR DISPLAY IMAGE (SCREEN NAIL (R)) |
| EOI |

| |
|---|
| SOI |
| APP1 |
| APP2 |
| IMAGE (L) (JPEG) |
| EOI |
| ⋮ |
| SOI |
| APP1 |
| APP2 |
| IMAGE (M) (JPEG) |
| EOI |
| ⋮ |
| SOI |
| APP1 |
| APP2 |
| IMAGE (R) (JPEG) |
| EOI |

303

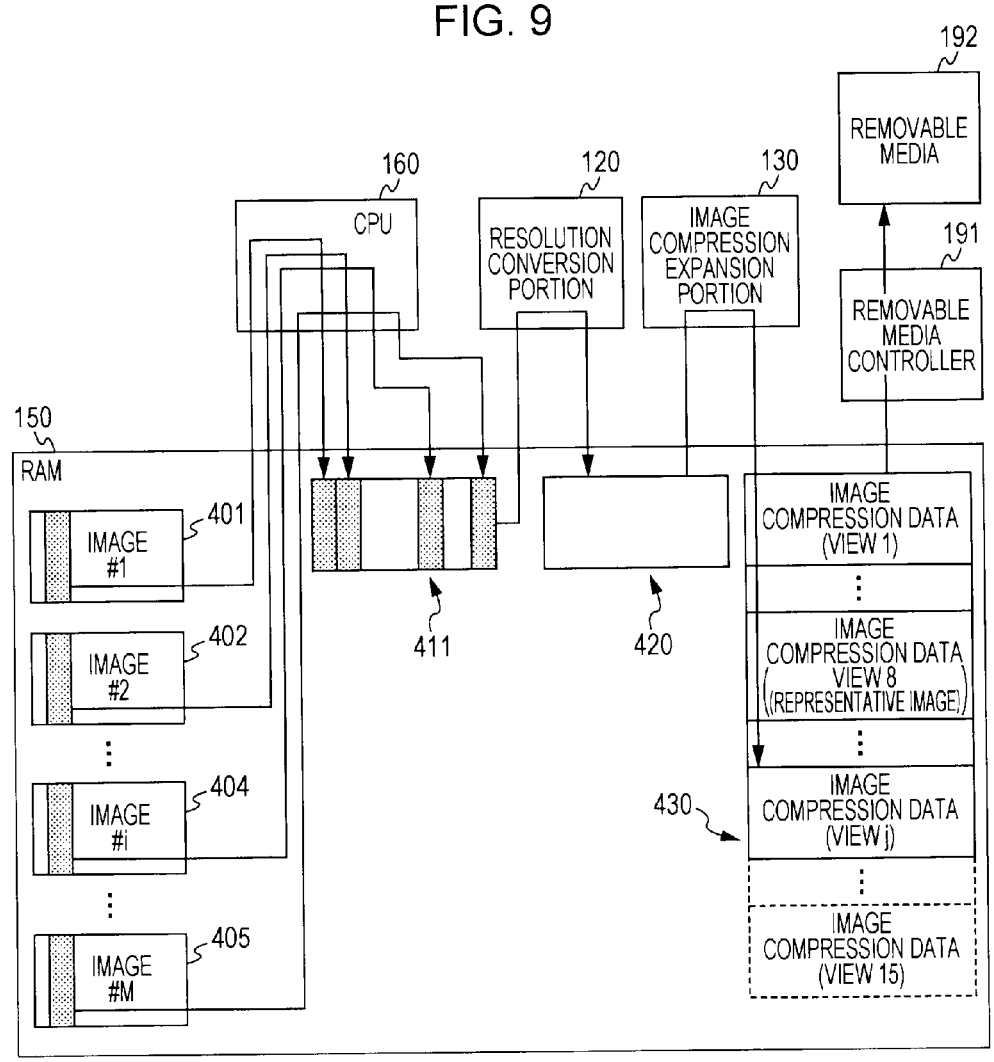

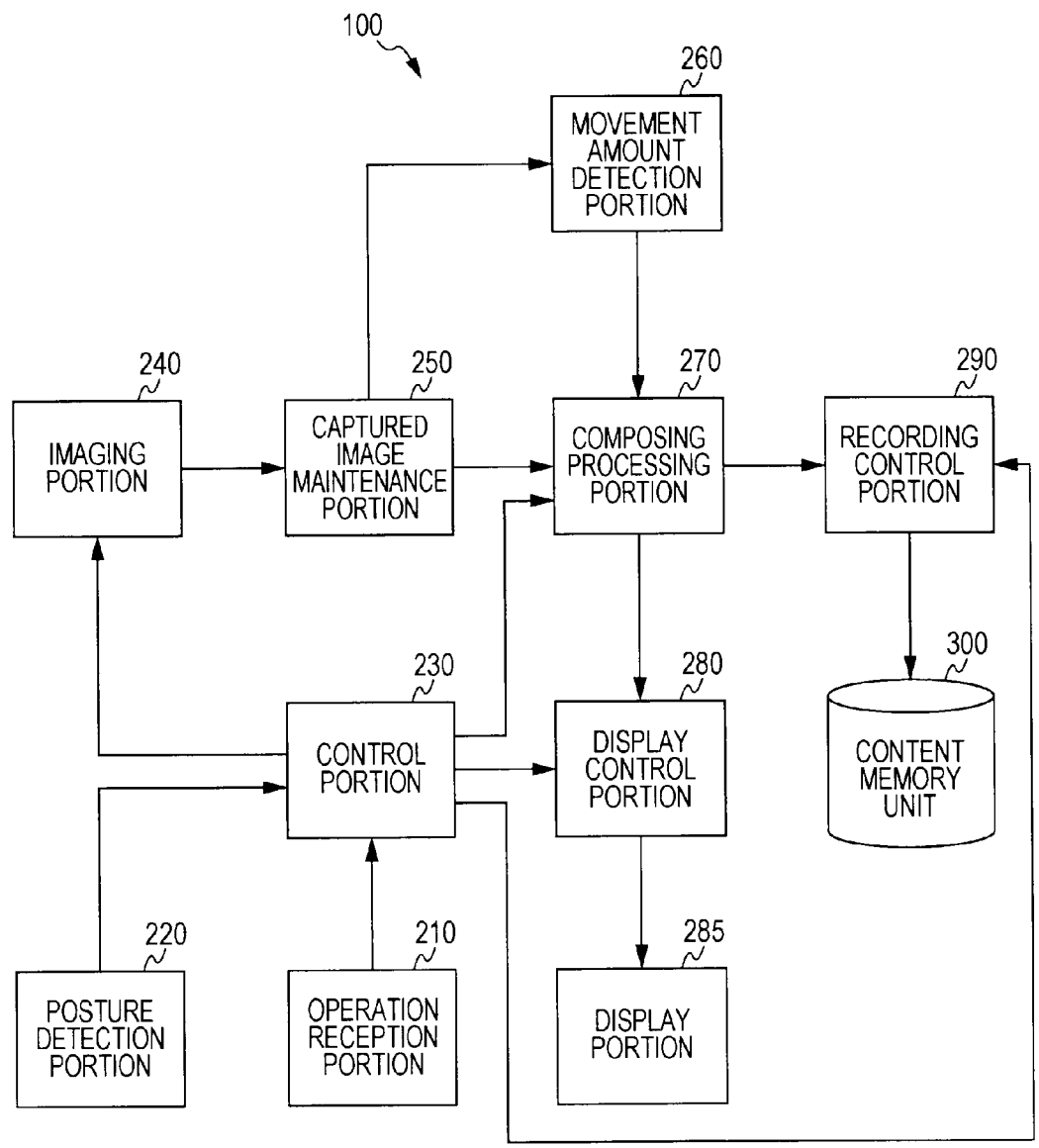

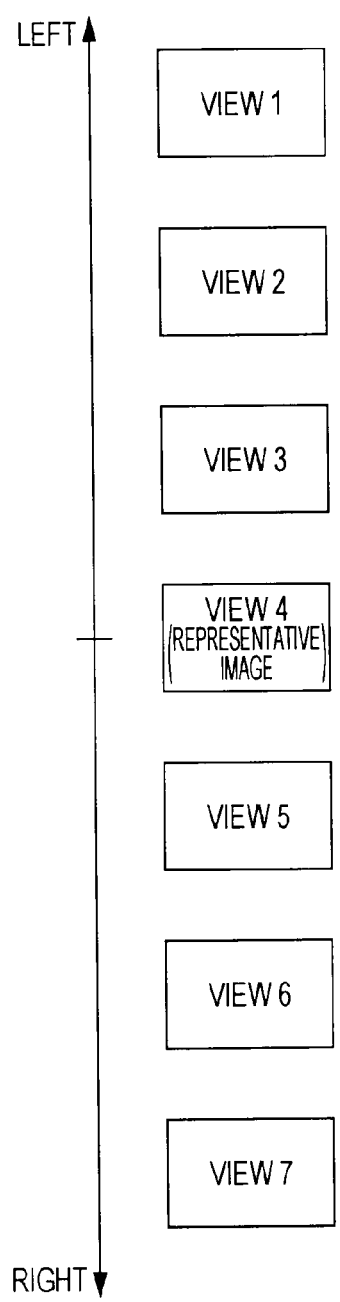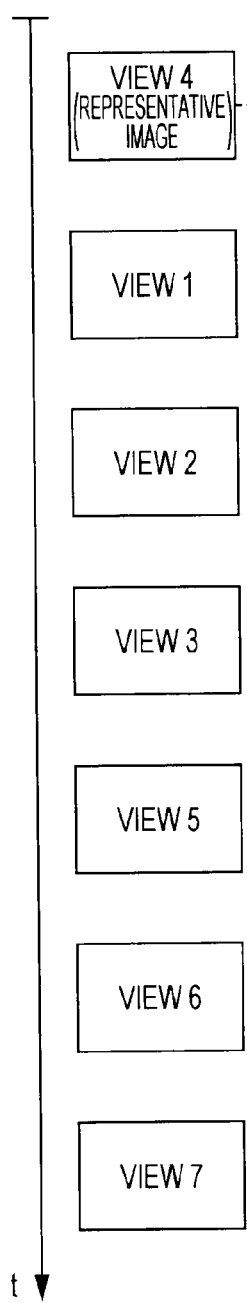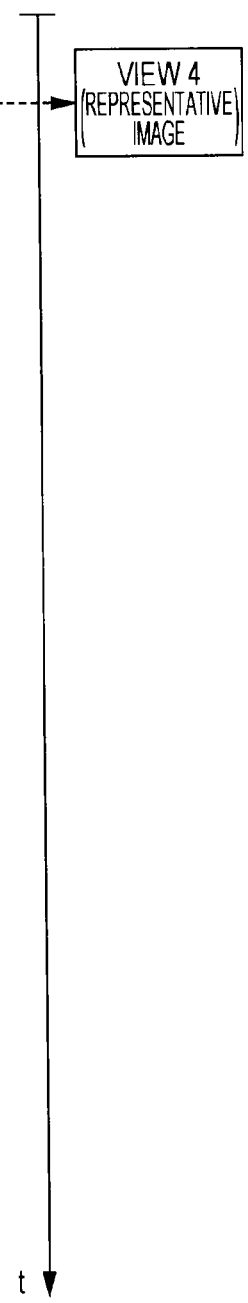

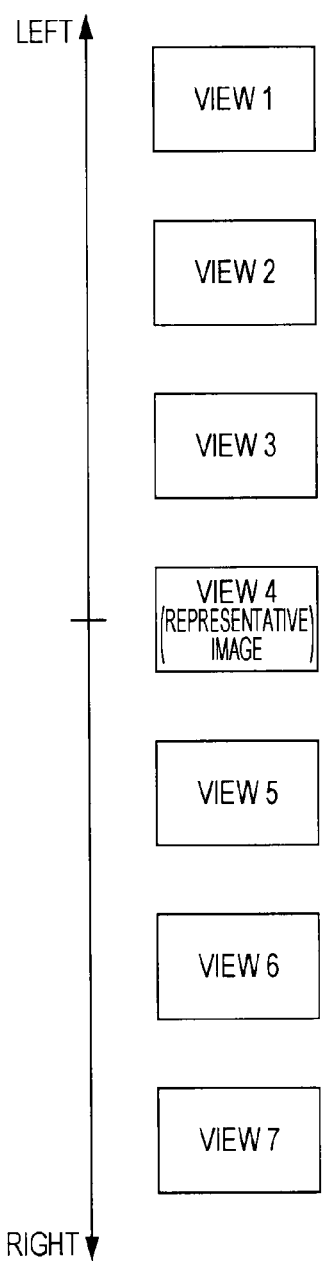
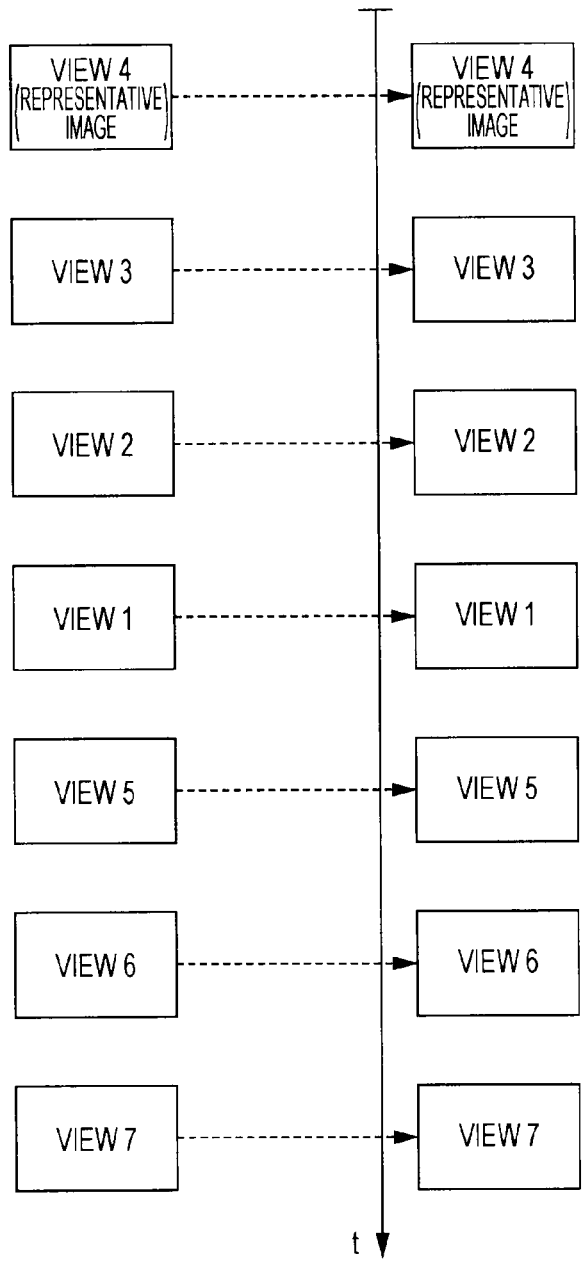
FIG. 13A  FIG. 13B  FIG. 13C

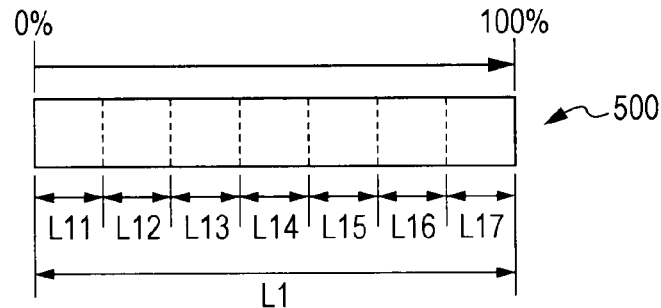
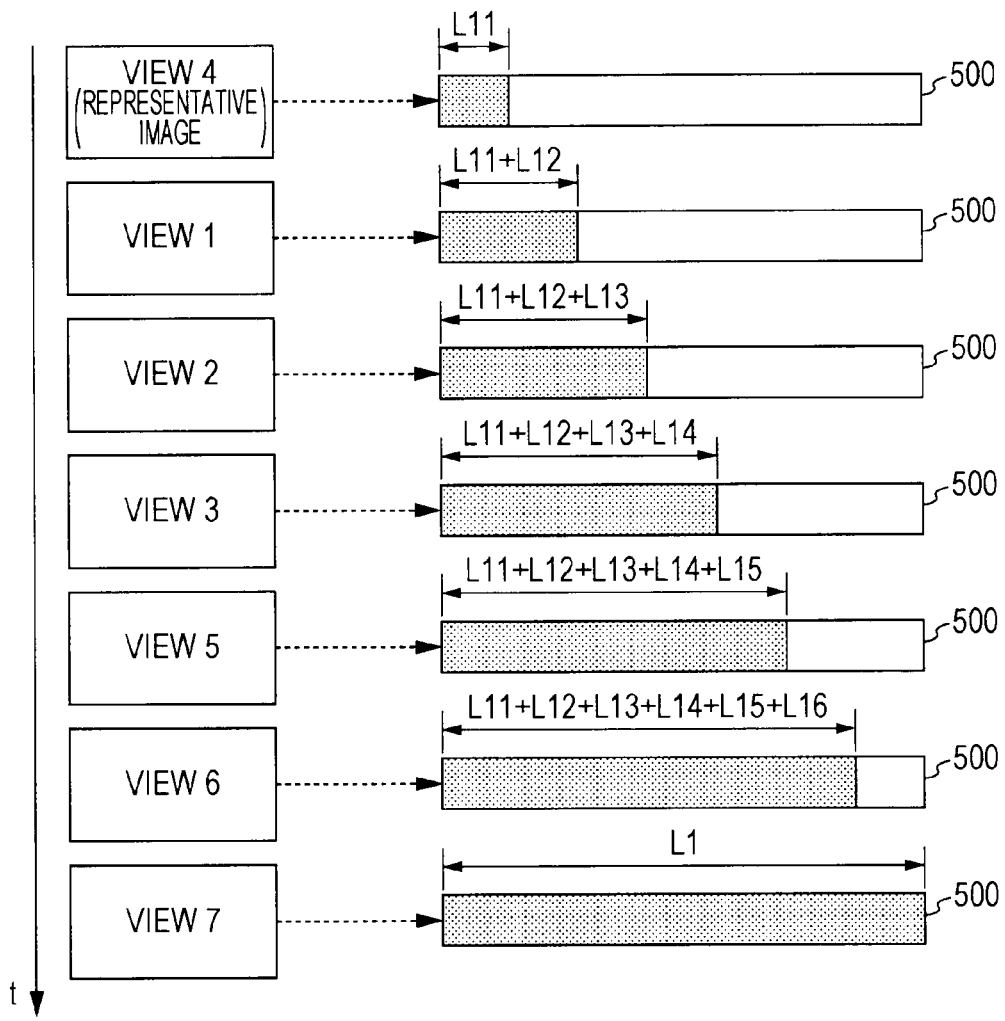

TILTING TO THE RIGHT SIDE BY γ° OR MORE

⬇ TILTING TO THE RIGHT SIDE BY $\gamma°$ OR MORE

IMAGING DEVICE, DISPLAY CONTROL METHOD AND PROGRAM

CROSS REFERENCE TO RELATED APPLICATION

This application claims the benefit of priority under 35 U.S.C. §119 to Japanese Patent Application No. JP 2010-090117, filed on Apr. 9, 2010, the entire contents of which is incorporated herein by reference.

BACKGROUND OF THE INVENTION

1. Field of the Invention

The present invention relates to an imaging device, particularly an imaging device that displays an image, a display control method, and a program that executes the method in a computer.

2. Description of the Related Art

Recently, an imaging device such as a digital still camera or a digital video camera (e.g., a recorder equipped with a camera) has been propagated which images a subject such as a person or an animal to create image data and records the image data as image content. Furthermore, an imaging device has been suggested which can confirm the image content by displaying an image becoming a recording target on a display portion at the time of the end of an imaging operation (so-called review display).

Furthermore, an imaging device exists which creates a plurality of images by a series of imaging operations, relates the plurality of created images to each other, and records the images. For example, an imaging device exists which relates the plurality of images created by a continuous imaging to each other and records the images. When the plurality of recorded images is reproduced in this manner, for example, a representative image to be set in a continuous imaging unit is displayed in a list and a desired representative image among the representative images displayed in a list is selected. Moreover, a plurality of images corresponding to the selected representative image can be displayed.

For example, an image display device is suggested in which a display size of each continuous image is adjusted depending on the number of the continuous image becoming the target of the list display and the plurality of continuous images is displayed in a list by the display size after the adjustment (e.g., see Japanese Unexamined Patent Application Publication No. 2009-296380 (FIG. 6)).

SUMMARY OF THE INVENTION

According to the aforementioned related art, since the plurality of continuous images is displayed in a list by the display size after the adjustment, each of the continuous images can concurrently be displayed in a list.

Herein, a case is supposed where an imaging operation is performed using an imaging device which relates and records a plurality of images created by a series of imaging operations. In a case of performing a series of imaging operations using the imaging device, after the end of the imaging operation, when the plurality of images created by the imaging operation is confirmed, it is considered that at least a part of the respective images is review-displayed.

Herein, for example, when the imaging is performed at a tourist attraction by a traveler, since each person moves, an imaging timing is important. For this reason, it is important to rapidly confirm a composition thereof and a desired subject after the end of a series of imaging operations. Thus, for example, in regard to a plurality of images created by the imaging operation, since the image processing is performed according to the imaging sequence and the recoding processing is performed, after the end of the imaging operation, it is decided to review-display an initially created image.

However, when the reproduction of the plurality of images created by the series of imaging operations is instructed, a user selects a desired representative image from the representative images displayed in a list in many cases. For this reason, when an image to be review-displayed for confirmation after the end of the imaging operation is different from the representative image, the image confirmed during the imaging operation is different from the image viewed as a selection target during reproduction, whereby an incompatibility may occur in the selection target image at the time of the reproduction.

Thus, it is desirable to easily confirm a representative image of a plurality of images after an imaging operation when a plurality of images is created by a series of imaging operations.

According to one embodiment, the disclosure is directed to an image processing apparatus that includes an image acquiring unit that acquires a plurality of images, a processing unit that creates a plurality of composite images having a sequential relationship based on a predetermined rule using at least a portion of each of the acquired images, and selects a representative image corresponding to the plurality of composite images.

According to the embodiment of the invention, a superior effect is obtained in which, when a plurality of images is created by a series of imaging operations, a representative image of the plurality of images can easily be confirmed after the imaging operation.

BRIEF DESCRIPTION OF THE DRAWINGS

FIG. 1 is a block diagram that shows an inner configuration example of an imaging device according to a first embodiment of the present invention;

FIGS. 2A to 2C are diagrams that schematically show image files stored in a removable media in the first embodiment of the invention;

FIG. 9 is a diagram that schematically shows a flow until the multi-view image created by the imaging device in the first embodiment of the invention is recorded on a removable media;

FIG. 11 is a block diagram that shows a functional configuration example of the imaging device in the first embodiment of the invention;

FIGS. 12A to 12C are diagrams that show display examples of a representative image displayed on a display portion in the first embodiment of the invention;

FIGS. 13A to 13C are diagrams that show display transition examples of a multi-view image displayed on a display portion in the first embodiment of the invention;

FIGS. 17A to 17C are diagrams that schematically show a state of progress notification information of a composition processing of a multi-view image displayed on a display portion in the first embodiment of the invention;

DESCRIPTION OF THE PREFERRED EMBODIMENTS

Figure 3A:
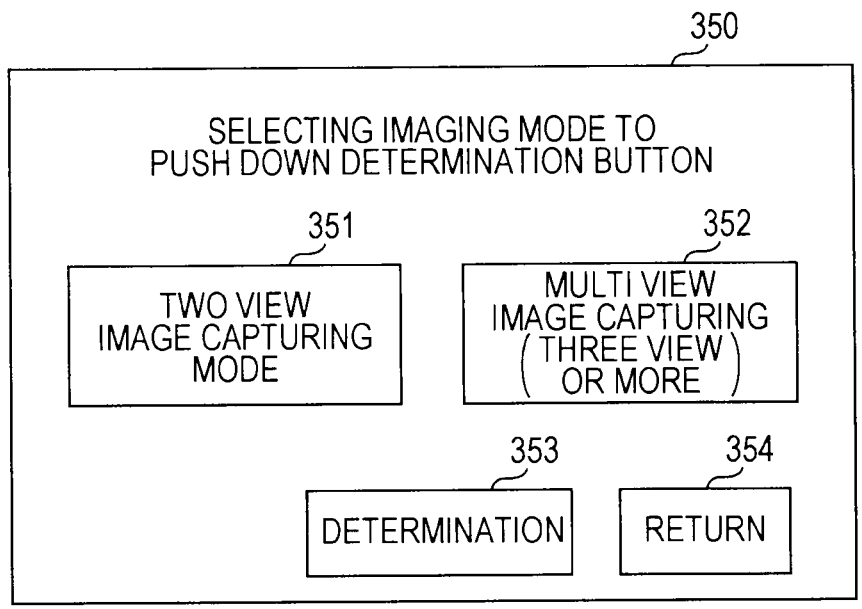
FIGS. 3A and 3B are diagrams that show display examples of a setting screen which sets an imaging mode of a multi-view image according to the imaging device in the first embodiment of the invention.

Hereinafter, embodiments (hereinafter, referred to as embodiment) for carrying out the invention will be described. The description will be made in the following order:

1. First Embodiment (display control: an example that displays a representative image and state of progress notification information after an imaging operation of a multi-view is finished)

2. Second Embodiment (display control: an example that sequentially review-displays a representative image candidate of a multi-view image depending on a change in posture of a device to determine a representative image)

1. First Embodiment

Configuration Example of Imaging Device

FIG. 1 is a block diagram that shows an inner configuration of an imaging device 100 in a first embodiment of the invention. The imaging device 100 includes an imaging portion 110, a gyro sensor 115, a resolution conversion portion 120, and an image compression expansion portion 130. Furthermore, the imaging device 100 includes a ROM (Read Only Memory) 140, a RAM (Random Access Memory) 150, and a CPU (Central Processing Unit) 160. Furthermore, the imaging device 100 includes a LCD (Liquid Crystal Display)

controller 171, a LCD 172, an input control portion 181, an operation portion 182, a removable media controller 191, and a removable media 192. In addition, an exchange performed between the respective portions constituting the imaging device 100 is performed via a bus 101. The imaging device 100, for example, images a subject to create a plurality of image data (captured images) and can be realized by a digital still camera capable of performing various image processing in regard to the plurality of image data.

The imaging portion 110 converts an incident light from the subject to create the image data (captured images) based on the control of the CPU 160, and supplies the created image data to the RAM 150. Specifically, the imaging portion 110 includes an optical unit 112 (shown in FIG. 7), an imaging element 111 (shown in FIG. 7), and a signal processing portion (not shown). The optical unit includes a plurality of lens (a zoom lens, a focus lens or the like) which concentrates light from the subject, and light from the subject incident via the lens and an iris is supplied to the imaging element. In addition, an optical image of the subject, which was incident via the optical unit, is imaged on an imaging surface of the imaging element, and the imaging element performs the imaging processing in this state, thereby outputting the imaging signal to the signal processing portion. Moreover, the signal processing portion performs the signal processing with respect to the imaging signal, whereby the image data is created, and the created image data is sequentially supplied to the RAM 150 and is temporarily maintained. In addition, as the imaging element, for example, a CCD (Charge Coupled Device) sensor, CMOS (Complementary Metal Oxide Semiconductor) sensor or the like can be used.

The gyro sensor 115 detects an angular velocity of the imaging device 100 and outputs the detected angular velocity to the CPU 160. In addition, an acceleration, a movement, a tilt or the like of the imaging device 100 may be detected using another sensor (e.g., an accelerator sensor) other than the gyro sensor, and the CPU 160 can detect a change in posture of the imaging device 100 based on the detection result.

The resolution conversion portion 120 converts various input image data to the resolution suitable for various image processing based on the control signal from the CPU 160.

The image compression expansion portion 130 compresses or expands various input image data depending on various image processing based on the control signal from the CPU 160. The image compression expansion portion 130, for example, compresses or expands various input image data to JPEG (Joint Photographic Experts Group) type of image data.

The ROM 140 is a read dedicated memory and stores various control programs or the like.

The RAM 150 is a memory used in a main memory (a main memory unit) of the CPU 160, includes a working area or the like of the program executed in the CPU 160, and temporarily stores the program or the data necessary for performing various processing by the CPU 160. Furthermore, the RAM 150 includes an image conservation area for various image processing.

The CPU 160 controls the respective portions of the imaging device 100 based on various control programs stored in the ROM 140. Moreover, the CPU 160 controls the respective portions of the imaging device 100 based on an operation input or the like received by the operation portion 182.

The LCD controller 171 displays various image data on a LCD 172 based on the control signal from the CPU 160.

The LCD 172 is a display portion that displays the image corresponding to various image data supplied from the LCD controller 171. The LCD 172, for example, sequentially displays the captured image corresponding to the image data created by the imaging portion 110 (so-called monitoring display). Furthermore, the LCD 172, for example, displays the image corresponding to the image file stored in the removable media 192. Instead of the LCD 172, a display panel, for example, an organic EL (Electro Luminescence) panel or the like may be used. Furthermore, as the display panel, a touch panel may be used by which a user can perform the operation input of the intent thereof by contacting or approaching a display surface with fingers.

The input control portion 181 performs the control relating to the operation input received by the operation portion 182 based on the instruction from the CPU 160.

The operation portion 182 is an operation portion which receives the operation input operated by a user and outputs the signal depending on the received operation input to the CPU 160. For example, in a multi-view image capturing mode for recording the multi-view image, an operation member such as a shutter button 183 (shown in FIG. 4A or the like) for instructing an imaging operation start and an imaging operation end of the captured image for creating the multi-view image is included in the imaging device 100. In addition, the multi-view image created in the first embodiment of the invention is a stereoscopic image of a multi-view (e.g., a stereoscopic image of a panorama shape). Furthermore, the operation portion 182 and the LCD 172 may be integrally configured by the touch panel.

The removable media controller 191 is connected to the removable media 192 and performs the reading and writing data to the removable media 192 based on the control signal from the CPU 160. For example, the removable media controller 191 records various image data such as image data created by the imaging portion 110 on the removable media 192 as the image file (the image content). Furthermore, the removable media controller 191 reads the content such as the image file from the removable media 192 and outputs the content to the RAM 150 or the like via the bus 101.

The removable media 192 is a recording device (a recording medium) that records the image data supplied from the removable media controller 191. In the removable media 192, for example, various data such as image data of a JPEG type are recorded. As the removable media 192, for example, a tape (e.g., a magnetic tape) and an optical disc (e.g., a recordable DVD (Digital Versatile Disc) can be used. Furthermore, as the removable media 192, for example, a magnetic disk (e.g., a hard disk), a semiconductor memory (e.g., a memory card), and an optical magnetic disc (e.g., MD (MiniDisc)) may be used.

Configuration Example of Image File

FIGS. 2A to 2C are diagrams that schematically show an image file stored in the removable media 192 in the first embodiment of the invention. FIGS. 2A to 2C show an example of a file structure of a still image file in accordance with a MP (Multi Picture) format that records a plurality of still images as a file (extension: MPO). That is, the MP file (see "CIPA DC-007-2009 multi picture format") is a file that can record one or a plurality of images subsequent to a head image.

FIG. 2A shows an example of a file structure of a two view image (a left eye image and a right eye image for displaying the stereoscopic image), and FIG. 2B shows an example of a file structure of a two view image with which a monitor display image (so-called screen nail image) is related. Furthermore, FIG. 2C shows an example of a file structure of a multi-view image (a multi-view image of a three view or more).

In the respective file structures shown in FIG. 2A to 2C, a SOI (Start Of Image) is a segment which means the start of the image, and is disposed at the head of the JPEG image or the monitor display image. Furthermore, an EOI (End OF Image) is a segment which means the end of the image, and is disposed at the last of the JPEG image or the monitor display image.

Furthermore, an APP (Application Segment) 1, an APP 2 and JPEG image data are disposed between the SOI and the EOI. The APP1 and the APP2 are application marker segments that house an attachment information relative to the JPEG image data. In addition, in front of the compression image data, marker segments of DQT, DHF, SOF, SOS (Start Of Scan) are inserted, but they are omitted. Furthermore, the recording sequence of DQT (Define Quantization Table), DHF (Define Huffman Table), and SOF (Start Of Frame) is arbitrary. Furthermore, monitor display images 304 and 305 shown in FIG. 2B hardly record the APP2 including the MP format attachment information. However, the intent is recorded in which the monitor display image is subordinate to the APP2 of the main image (an original image). In addition, the monitor display image has an aspect ratio identical to the main image, and, for example, the width is 1,920 image pixels and the length can be matched to the aspect ratio of this image.

In addition, the APP2 (301 to 303) which is at the top of the file structure has an important role showing the file structure, and information such as the image position (an offset address) of each view, the bite size and whether or not the representative image is recorded therein.

Herein, the recording of the multi-view image will be simply explained with reference to "6.2.2.2 stereoscopic image" and "the selection of A.2.1.2.3 representative image" of "CIPA DC-007-2009 multi picture format". In "6.2.2.2 stereoscopic image", the following (1) is described, and in "the selection of A.2.1.2.3 representative image", the following (2) is described.

(1) In the stereoscopic image, the view number should give the number so as to be an ascension sequence from a left view to a right view toward the subject.

(2) When the stereoscopic image is recorded, the image used as the representative image, it is recommended that, in the case of the view number being an even number, the image used as the representative image uses the image (image near the center of the whole view) of the view number represented by (view number/2) or (view number/2)+1), and in the case of the view number being an odd number, the image uses the image of the view number represented by (view number/2+0.5).

In the case according to the rule, since it is packed on the upper address on the file by the left view image, normally, the sequence of the composition processing, encoding or the like is performed in advance by the left view image. In this case, for example, when the representative image which is the center image is review-displayed, it is difficult to perform the review display of the representative image, until the composition processing of the center image is finished. Thus, in the first embodiment of the invention, an example is shown in which the representative image is rapidly displayed after the imaging operation is finished. However, it is possible to appropriately change the display timing of the representative image depending on the preference of a user or the like. In addition, the review display is a display operation in which, when the recording instruction operation of the still image is performed in the state in which the imaging mode of the still image is set, after the imaging processing of the captured image by the recording instruction operation is finished, for a certain period of time, the captured image created by the imaging processing is automatically displayed.

Selection Example of Recording Target Image

Figure 3B:
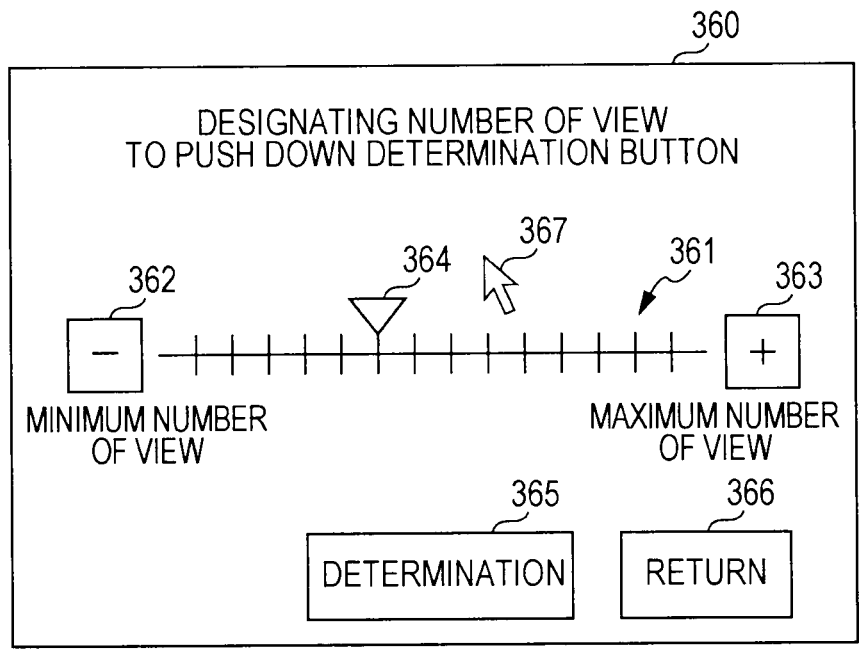

FIGS. 3A and 3B are diagrams that show display examples of setting screens which set imaging modes of a multi-view image by the imaging device 100 in the first embodiment of the invention. The respective setting screens, for example, are displayed on the LCD 172 depending on the user operation from the operation portion 182.

FIG. 3A shows a display example of a setting screen 350 for setting any one of the two view image capturing mode and the multi-view image capturing mode as the capturing mode. In the setting screen 350, a two view image capturing mode selection button 351, a multi-view image capturing mode selection button 352, a determination button 353, and a return button 354 are provided.

The two view image capturing mode selection button 351 is a button that is pressed down when the two view image capturing mode is set as the capturing mode of the multi-view image. The two view image capturing mode is a capturing mode for capturing the two view image. Furthermore, when the two view image capturing mode is set depending on the press-down operation of the two view image capturing mode selection button 351, the image created by the imaging portion 110 is recorded as the image file of the two view image shown in FIG. 2A or 2B.

The multi-view image capturing mode selection button 352 is a button that is pressed down when the multi-view image capturing mode is set as the capturing mode of the multi-view image. The multi-view image capturing mode is a capturing mode for capturing multi-view image of equal to or more than three view images, may set the view number becoming the recording target in advance, and can change the view number becoming the recording target by the user operation. The change example is shown in FIG. 3B. Furthermore, when the multi-view image capturing mode is set depending on the press-down operation of the multi-view image capturing mode selection button 352, the image created by the imaging portion 110 is recorded as the image file of the multi-view image shown in FIG. 2C.

The determination button 353 is a button that is pressed down after the press-down operation selecting the two view image capturing mode or the multi-view image capturing mode is performed, when the selection thereof is determined. The return button 354, for example, is a button that is pressed down when returning to the display screen displayed just before that.

FIG. 3B is a display example of a setting screen 360 for setting the view number becoming the recording target by the user operation when the multi-view image capturing mode is set. In the setting screen 360 shown in FIG. 3B, a view number axis 361, a minus display area 362, a plus display area 363, a designation position marker 364, a determination button 365, and a return button 366 are provided.

The view number axis 361 is an axis displaying the view number becoming the designation target by the user operation, and the respective gradations on the view number axis 361 correspond to the values of the view. For example, the gradation proximate to the minus display area 362 among the respective gradations on the view number axis 361 corresponds to the three view image. Furthermore, the gradation proximate to the plus display area 363 among the respective gradations on the view number axis 361 corresponds to the maximum view (e.g., 15 view).

The designation position marker 364 is a marker for designating the view number designated by the user operation. For example, by the operation using a cursor 367 or the touch operation (in the case of including the touch panel), a user can move the designation position marker 364 to a position on a desired view number axis 361, thereby designating the view number becoming the recording object.

The determination button 365 is a button which is pressed down, after the designation position marker 364 is moved to the position on the view number axis 361 desired by a user, when the designation is determined. The return button 366 is a button which is pressed down, for example, when returning to the display screen displayed immediately before that.

Figure 4A:
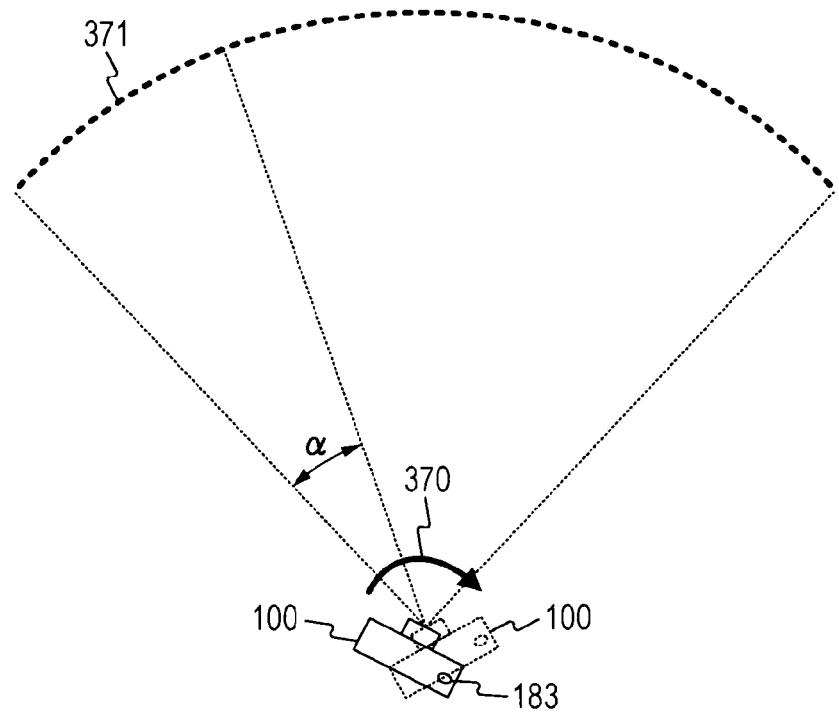
FIGS. 4A and 4B are diagrams that schematically show an imaging operation when the multi-view image is created using the imaging device in the first embodiment of the invention, and a notification example of a state of progress of the imaging operation.
Figure 4B:
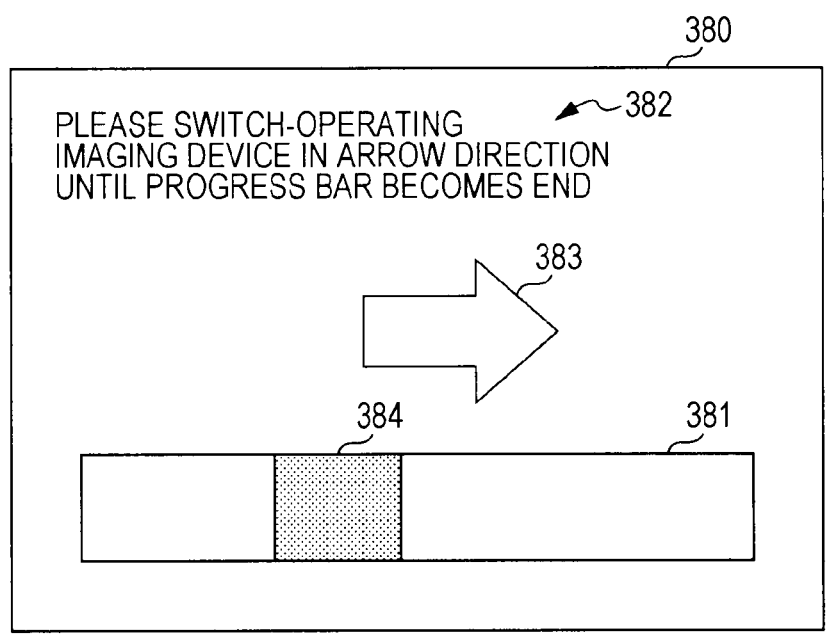

Imaging Operation Example of Multi-View Image and Notification Example of the State of Progress FIGS. 4A and 4B are diagrams that schematically show an imaging operation when the multi-view image is created using the imaging device 100 in the first embodiment of the invention and a notification example of the state of progress of the imaging operation.

FIG. 4A schematically shows a case where the imaging operation in the case of creating the multi-view image using the imaging device 100 is viewed from the upper surface. That is, FIG. 4A shows an example in which a user performs the operation (so-called panning (a swing operation)) of moving the imaging device 100 in a horizontal direction (the direction of arrow 370) based on the imaging position of the imaging device 100, thereby creating the multi-view image. An image angle (an angle of view of a horizontal direction) of the imaging device 100 in this case is a, and the range (the imaging range) becoming the imaging target by a series of panning operations is schematically shown by thick dotted lines 371.

FIG. 4B shows a display example of a state of progress notification screen 380 displayed on the LCD 172 when the multi-view image capturing mode (three view or more) is set. In the state of progress notification screen 380, a progress bar 381 for notifying the state of progress of the imaging operation of the multi-view image, and operational support information 382 and 383 are provided.

The progress bar 381 is a bar-shaped graph for notifying the state of progress of the user operation (the panning operation of the imaging device 100) in a case where the multi-view image capturing mode is set to the user. Specifically, the progress bar 381 indicates that the current operation amount (a gray portion 384) relative to the whole operation amount (e.g., the rotation angle of the panning operation) necessary in the multi-view image capturing mode progresses by a certain ratio. In addition, in regard to the progress bar 381, based on the detection result of the movement amount between the adjacent captured images in the time axis and the movement direction, the CPU 160 calculates the current operation amount, thereby changing the display state based on the current operation amount. As the movement amount and the movement direction, for example, motion vector (GMV (Global Motion Vector)) corresponding to the movement of all the captured image generated due to the movement of the imaging device 100 is detected. In addition, based on the angular velocity detected by the gyro sensor 115, the CPU 160 may calculate the current operation amount. Furthermore, the CPU 160 may calculate the current operation amount using the detection results of the movement amount and the movement direction, and the angular velocity detected by the gyro sensor 115. In this manner, a user can easily understand that a certain panning operation may be performed by displaying the progress bar 381 during imaging of the multi-view image.

The operational support information 382 and 383 are information for supporting the user operation (the panning operation of the imaging device 100) in a case where the multi-view image capturing mode is set. As the operational support information 382, for example, a message for supporting the user operation is displayed. Furthermore, as the operational support information 383, for example, an arrow (an arrow indicating the operation direction thereof) for supporting the user operation is displayed.

Figure 5A:
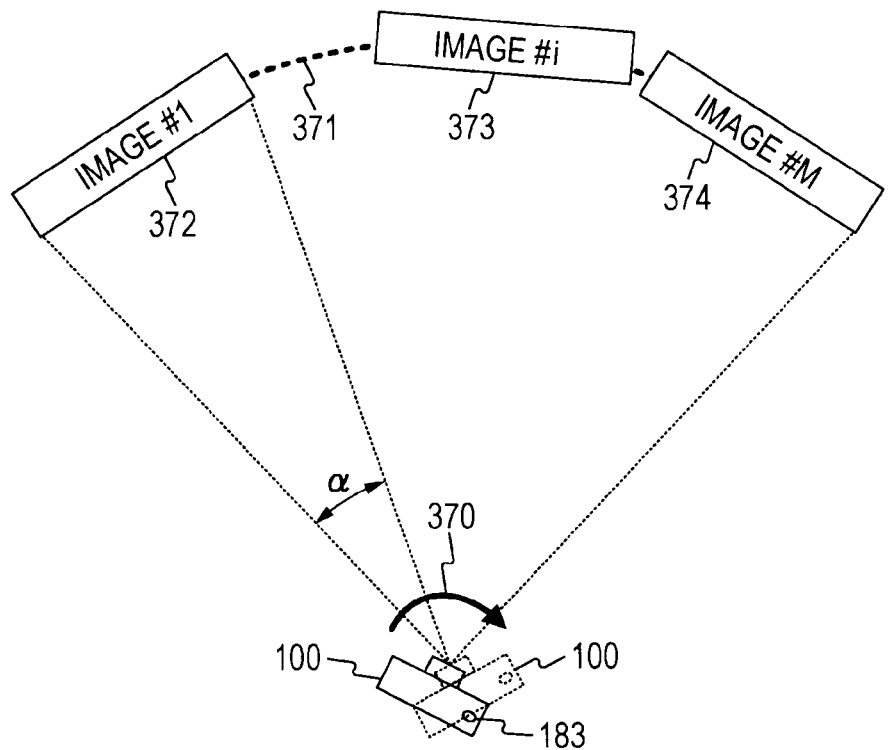
FIGS. 5A and 5B are diagrams that schematically show an imaging operation example at the time of the creation of the multi-view image by the imaging device in the first embodiment of the invention, and an example of a flow of a plurality of captured images created thereby.
Figure 5B:
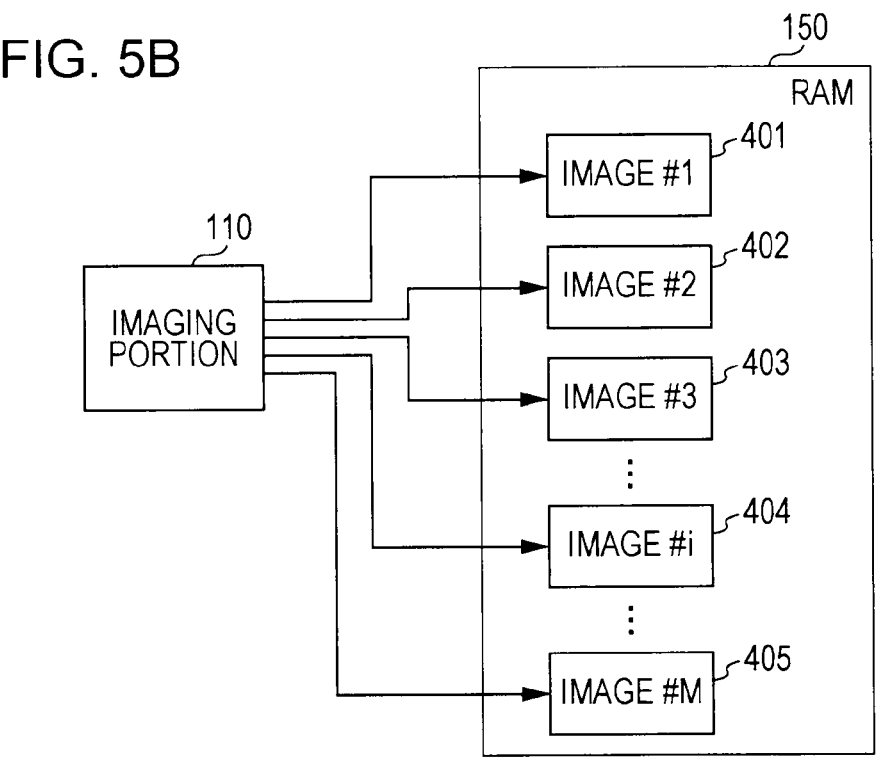

Imaging Operation Example of Multi-View Image and Recording Example of Captured Image Created Thereby FIGS. 5A and 5B are diagrams that schematically show an imaging operation at the time of the creation of the multi-view image by the imaging device 100 in the first embodiment of the present invention and an example of a flow of a plurality of captured images created thereby.

FIG. 5A schematically shows a case where the imaging operation is viewed from the upper surface when the multi-view image is created using the imaging device 100. In addition, FIG. 5A is identical to the example shown in FIG. 4A except that rectangles 372 to 374 are added. That is, in FIG. 5A, the captured images (images (#1) 401, (#i) 404 and (#M) 405) shown in FIG. 5B are imaginarily disposed on the circle (on the dotted lines 371) and the positional relationship when the imaging range is viewed from the upper surface is schematically shown by rectangles 372 to 374. In addition, in the rectangles 372 to 374, the corresponding numbers (#1, #i, and #M) are given. The plurality of captured images thus generated is the captured image which is created by performing the imaging operation so that the same subject is included in an area of at least a part in the horizontal direction.

FIG. 5B schematically shows the state in which the captured images (the images (#1) 401 to (#M) 405) created by the panning operation shown in FIG. 5A are maintained in the RAM 150. That is, as shown in FIG. 5A, during a panning operation of the imaging device 100 by a user, the imaging portion 110 sequentially creates the images (#1) 401 to (#M) 405. Herein, the images (#1) 401 to (#M) 405 are a plurality of captured images having offsets in the horizontal direction, and the upper limit number thereof can be about 70 to 100. In addition, in regard to the images (#1) 401 to (#M) 405, the number is given in a time series. In this manner, when the recording instruction operation of the multi-view image is performed in the imaging device 100, the plurality of captured images created during the imaging operation is sequentially recorded in the RAM 150. In addition, the recording instruction operation of the multi-view image can be performed by maintaining the state of pressing down the shutter button 183 in a state in which the multi-view image capturing mode is set.

Creation Example of Multi-View Image

FIGS. 6A to 8C are diagrams that schematically show creation methods when the multi-view image is created by the imaging device 100 in the first embodiment of the invention. In the example, an example is shown in which, as the multi-view image, an image constituted from 15 views is created.

Figure 6A:
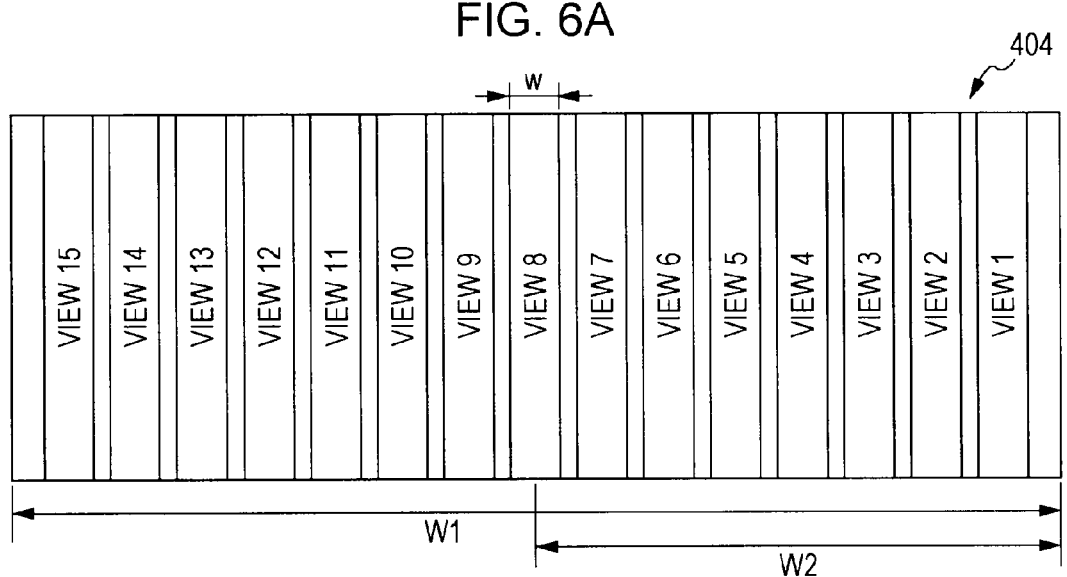
FIGS. 6A and 6B are diagrams that schematically show creation methods when the multi-view image is created by the imaging device in the first embodiment of the present invention.

FIG. 6A schematically shows the image (#i) 404 created by the imaging portion 110 by means of a rectangle. In FIG. 6A, in the image (#i) 404, a take-out area (an image area for each view becoming the composition subject) of the image used upon creating the multi-view image is shown by the view numbers (views 1 to 15) the corresponding multi-view image. Herein, the length of the horizontal direction in the image (#i) 404 is W1 and the length of the horizontal direction in the take-out area (short area) used in the composition of the center image (the multi-view image of view 8) is w. In this case, the take-out area of the center area is determined in the center of the horizontal direction in the image (#i) 404 (that is, $W1=W2\times2$). Furthermore, the length of the horizontal direction in the take-out area of each view in the image (#i) 404 is identical (that is, w). Herein, the length w of the horizontal direction in the take-out area of each view greatly depends on the movement amount between the respective images of the image (#1) 401 to (#M) 405 created by the imaging portion 110. Thus, the calculation method of the length w of the horizontal direction in the take-out areas of the respective views and the positions of the take-out areas of the respective views in the images (#1) 401 to (#M) 405 will be described in detail with reference to FIGS. 7 to 8C.

Figure 6B:
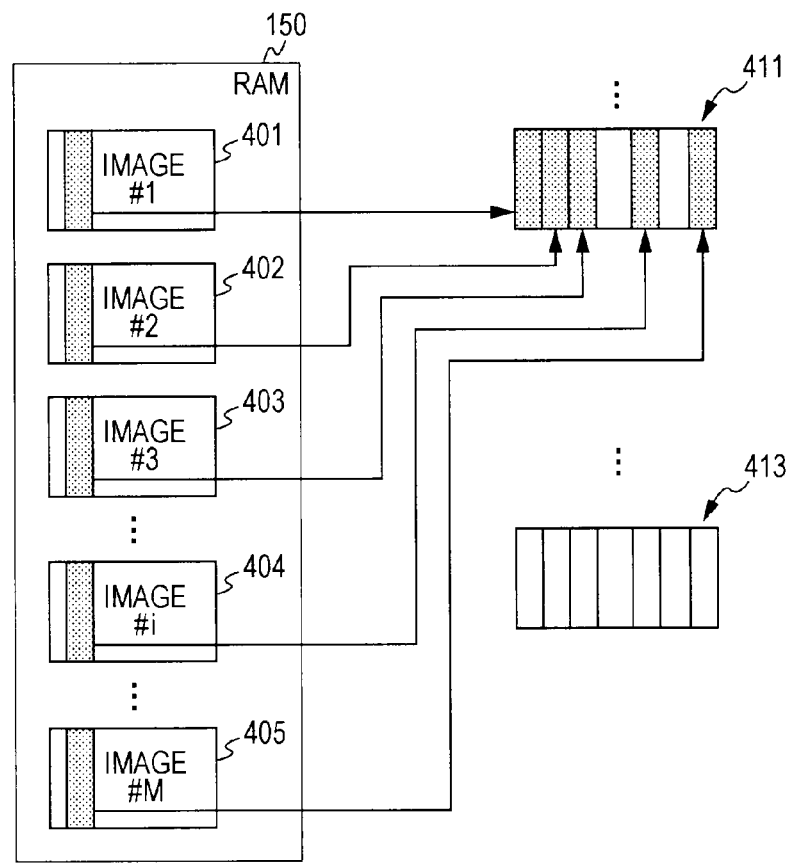

FIG. 6B schematically shows a creation method of creating the multi-view image using the images (#1) 401 to (#M) 405 maintained in the RAM 150. FIG. 6B shows an example of creating a view j image 411 using the images (#1) 401 to (#M) 405 maintained in the RAM 150. In FIG. 6B, among the images (#1) 401 to (#M) 405 maintained in the RAM 150, the image area becoming the composition target of the view j image is shown by gray. In this manner, in regard to each of the images (#1) 401 to (#M) 405 maintained in the RAM 150, the multi-view image is created using the image area of at least a part.

Next, a setting method of setting the take-out area in the images (#1) 401 to (#M) 405 maintained in the RAM 150 will be described.

Figure 7:
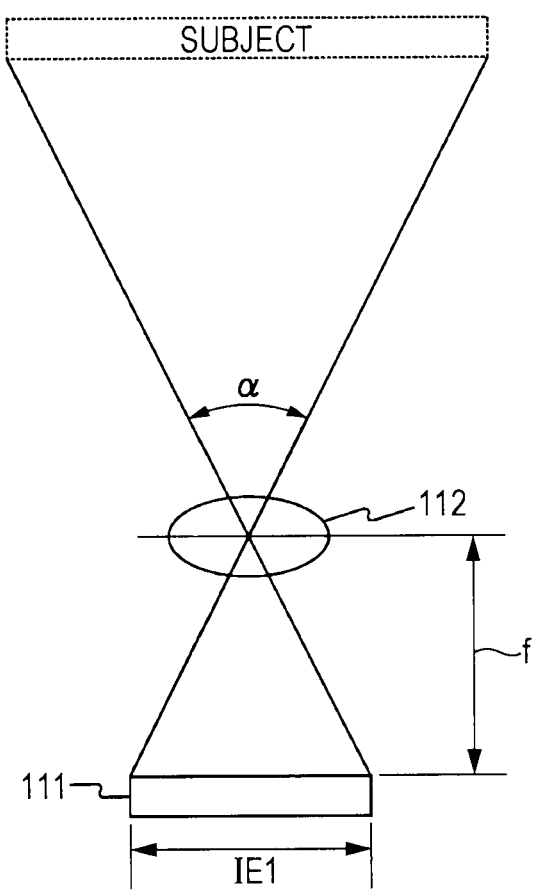
FIG. 7 is a diagram that schematically shows a creation method when the multi-view image is created by the imaging device in the first embodiment of the present invention.

FIG. 7 is a diagram that schematically shows the relationship between the imaging element 111, the focus distance and the angle of view in the first embodiment of the invention. In addition, the imaging element 111 and the optical unit 112 are included in the imaging portion 110. Herein, the width of the imaging element 111 is a width IE1 [mm] of the imaging element. In this case, the width IE1 of the imaging element can be obtained by the following equation 1.

$$IE1 = p \times h \qquad \text{equation 1}$$

In addition, p [um] is a value that indicates a pixel pitch of the imaging element 111, and h [pixel] is a value that indicates the horizontal pixel number of the imaging element 111.

Furthermore, the angle of the imaging device 100 in the example shown in FIG. 7 is α[deg]. In this case, the angle α can be obtained the following equation 2.

$$\alpha = (180/\pi) \times 2 \times \tan^{-1}((p \times h \times 10^{-3})/(2 \times f)) \qquad \text{equation 2}$$

In addition, f [mm] is a value that shows a focus distance in the imaging device 100.

By using the angle α thus calculated, an angle of view (a pixel density)μ[deg/pixel] near one pixel constituting the imaging element 111 can be obtained the following equation 3.

$$\mu = \alpha/h \qquad \text{equation 3}$$

Herein, when the multi-view image capturing mode is set in the imaging device 100, the continuous speed (that is, a frame number per one second) of the image in the multi-view image capturing mode is s [fps]. In this case, a length (a width of a take-out area) w [pixel] of a take-out area of one view (a maximum take-out area) on one captured area can be obtained the following equation 4 of the horizontal direction.

$$w = (d/s) \times (1 \times \mu) \qquad \text{equation 4}$$

In addition, d [deg/sec] is a value that shows a vibration angular velocity of a user who operates the imaging device 100. In this manner, by using the vibration angular velocity d of a user who operates the imaging device 100, the width (the width of the maximum take-out area) w of the take-out area can be obtained.

Figure 8A:
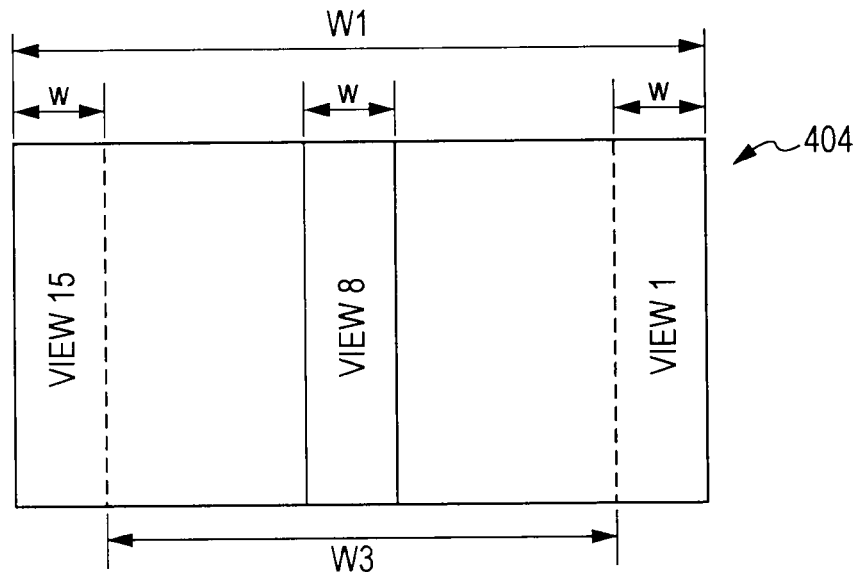
FIGS. 8A to 8C are diagrams that schematically show creation methods when the multi-view image is created by the imaging device in the first embodiment of the present invention.
Figure 8B:
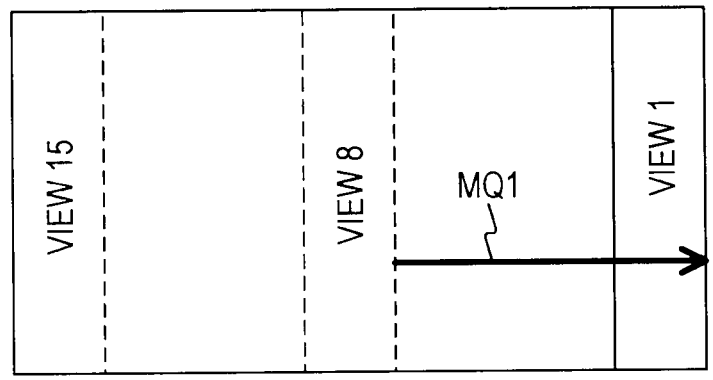
Figure 8C:
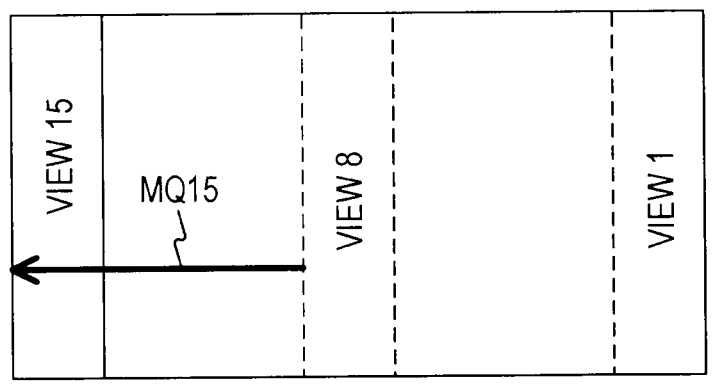

FIGS. 8A to 8C show calculation methods of a shifting amount of the take-out area becoming the composition target of the multi-view image in the captured image (image (#i) 404) maintained in the RAM 150. FIG. 8A shows the take-out area of the center image (the multi-view image of view 8). FIG. 8B shows the take-out area of the leftmost view image (the multi-view image of the view 1). FIG. 8C shows the take-out areas of the rightmost view image (the multi-view image of the view 15).

As mentioned above, when the composition processing of the multi-view image is performed, the image (the elongated image) becoming the composition target of the multi-view image is taken out from each of the respective captured images (#1) 401 to (#M) 405 that are created by the imaging portion 110 and are maintained in the RAM 150. That is, the image (the elongated image) becoming the composition target is taken out while shifting the position of the take-out area (the elongated area) in one captured image maintained in the RAM 150. In this case, based on the inter-relationship between the respective images, each image is overlapped with the taken-out image and is composed. Specifically, the movement amount and the movement direction (i.e., a relative displacement between the adjacent captured images) between two adjacent captured images in the time axis are detected. Moreover, based on the detected movement amount and the movement direction (the movement amount and the movement direction between the adjacent images), each of the taken-out images are composed so that overlap areas are overlapped with each other, whereby the multi-view image is created.

Herein, a calculation method of the size and the position of the take-out area (the elongated area) in one captured image maintained in the RAM 150 and a shifting amount of a view j will be described.

After the imaging processing by the imaging portion 110 and the recording processing to the RAM 150 are finished, it is calculated which area is the take-out area in each of the plurality of captured images maintained in the RAM 150. Specifically, as shown in equation 4, the width of the take-out area is calculated, and the position of the horizontal direction in the take-out area used in the composition of the center image (the multi-view image of the view 8) is a position of the center of each captured image maintained in the RAM 150.

Herein, the position of the horizontal direction in the take-out area used in the composition of another multi-view image other than the center image (the multi-view image of the view 8) is calculated on the basis of the position of the horizontal direction in the take-out area used in the composition of the center image (the multi-view image of the view 8). Specifically, the position shifted from the initial position (the middle position) is calculated depending on a difference in view number between the center view (view 8) and the view j. That is, the shifting amount MQj of the view j can be obtained by the following equation 5.

$$MQj = (CV - OVj) \times \beta \qquad \text{equation 5}$$

In addition, the CV is a value that shows the center view among the multi-view image, and the OVj is a value that shows another view (view j) other than the center view among the multi-view image. Furthermore, β is a value that shows a shifting amount (an elongated position shifting amount) of the position of the take-out area per one view. In addition, the size (the elongated size) of the take-out area does not change.

Herein, the calculation method of the elongated position shifting amount β will be described. The elongated position shifting amount β can be obtained by the following equation 6.

$$\beta = (W1 - w \times 2)/VN \qquad \text{equation 6}$$

In addition, W1 is a value that shows the horizontal size per one captured image maintained in the RAM 150, w is a value that shows the width (the width of the maximum take-out area) of the take-out area, and VN is a value that shows the view number of the multi-view image. That is, a value, in which W3 (=W1−w×2) shown in FIG. 8A is divided by the view number (15), is calculated as the elongated position shifting amount β.

In this manner, the elongated position shifting amount β is calculated so that the image (the elongated image) taken out at the time of the composition processing of the leftmost view image or the rightmost view image is disposed at least in a left and a right end among the captured image maintained in the RAM 150.

In addition, in the case of performing the composition processing of the plane image (a two-dimensional image) of a panorama shape, the middle elongated image (the image corresponding to the view 8) corresponding to the width (the width of the maximum take-out area) w of the take-out area is sequentially taken out and composed. Furthermore, in the case of performing the composition processing of the two view image, two take-out areas are set so that a shifting amount (the offset amount) OF from the middle elongated image is identical to the left view and the right view. In this case, the offset amount (the minimum elongated offset amount) $OF_{min}$ [pixel] which is allowable in the vibration angular velocity d of a user who operates the imaging device 100 can be obtained by the following equation 7

$$OF_{min}=w/2 \quad \text{equation 7}$$

In addition, the minimum elongation offset amount $OF_{min}$ is a minimum permitted elongated offset amount in which an overlap of the left eye elongated image and the right eye elongated image is not generated (not overlapped).

Furthermore, the maximum permitted elongated offset amount (the maximum elongated offset amount) $OF_{max}$ for setting so that the take-out area used in the composition processing of the two view image does not come out to the outside of the imaging area of the captured image maintained in the RAM 150 can be obtained by the following equation 8.

$$OF_{max}=(t-OF_{min})/2 \quad \text{equation 8}$$

Herein, t [pixel] is a horizontal effective size of one image created by the imaging portion 110. The horizontal effective size t corresponds to the horizontal pixel number which is the transverse width of the captured image maintained in the RAM 150.

Recording Processing Example of Multi-View Image

FIG. 9 is a diagram that schematically shows a flow until the multi-view image created by the imaging device 100 in the first embodiment of the invention is recorded on a removable media 192. FIG. 9 shows an example of a flow of the data on the RAM 150 when the view j image 411 created using the images (#1) 401 to (#M) 405 maintained in the RAM 150 is recorded as the MP file 430 (extension: .MPO). In addition, the images (#1) 401 to (#M) 405 shown in FIG. 9 is the same as FIG. 6A.

As mentioned above, the images (#1) 401 to (#M) 405 created by the imaging portion 110 are sequentially recorded on the RAM 150. Next, in regard to each of the images (#1) 401 to (#M) 405 maintained in the RAM 150, the CPU 160 calculates the take-out area of the view j, thereby acquiring the image included in the take-out area. Next, using the image acquired from the respective take-out areas of the images (#1) 401 to (#M) 405, the CPU 160 creates the composite image (the view j image 411) of the view j. In addition, in the present example, there is shown an example in which the CPU 160 creates the composite image of the multi-view image, but a hardware or a software (an accelerator) for the image composition may be separately provided, thereby creating the composite image of the multi-view image.

Next, the resolution conversion portion 120 performs the resolution conversion in the view j image 411 and set the same as the final image (the view j image 420) of the view j. Next, the image compression expansion portion 130 compresses the view j image 420 to the image data of the JPEG type. Next, the CPU 160 performs the packing processing (a packing processing such as a header addition) of the view j image 420 which is compressed to the JPEG type to the MP file 430. Furthermore, the same is also true for the creation of other multi-view images. Moreover, when the composition processing of the whole multi-view image is finished, the removable media controller 191 records the MP file 430 on the removable media 192 based on the control of the CPU 160.

In addition, FIG. 9 schematically shows the state in which the recording of the multi-view image of the view j among the MP file 430 is finished. That is, in the MP file 430, an area of the multi-view image where the recording is finished is shown by a solid line, and an area of the multi-view image where the recording is not finished is shown by a dotted line.

Display Processing Example of Representative Image of Multi-View Image

Figure 10:
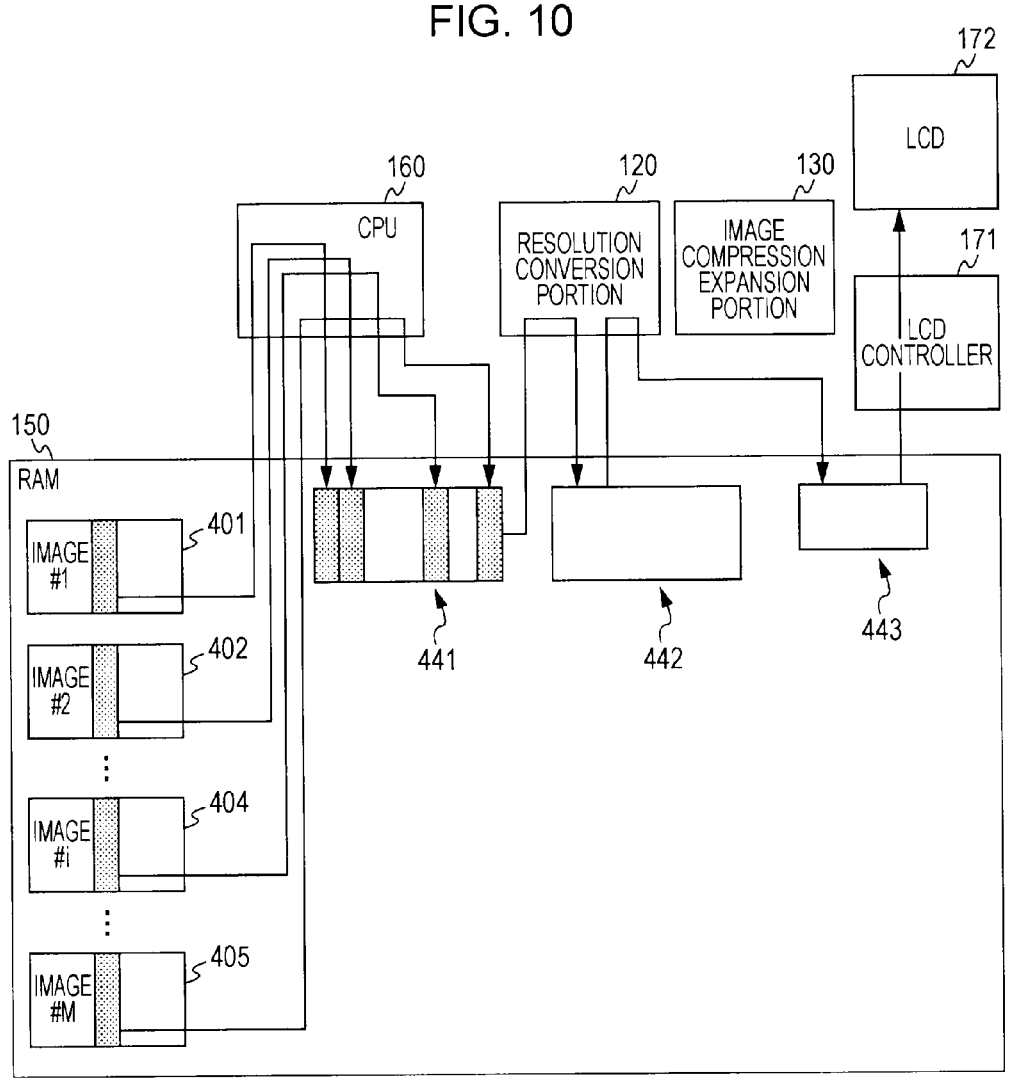
FIG. 10 is a diagram that schematically shows a flow until a representative image among the multi-view image created by the imaging device in the first embodiment of the invention is displayed.

FIG. 10 is a diagram that schematically shows a flow until the representative image of the multi-view image created by the imaging device 100 in the first embodiment of the invention is displayed. FIG. 10 shows an example of a flow of the data on the RAM 150 when the view 8 image created using the images (#1) 401 to (#M) 405 maintained in the RAM 150 is recorded on the LCD 172 as the representative image. In addition, the images (#1) 401 to (#M) 405 shown in FIG. 10 is the same as FIG. 6A.

In addition, since the creation of the composite image (the representative image 441) of the view 8 and the final image (the representative image 442) of the view 8 are identical to the example shown in FIG. 9, the description thereof will be omitted.

After the representative image 442 is created, the resolution conversion portion 120 performs the resolution conversion in regard to the representative image 442 so as to be the image size optimum in the display and sets the same as the display image (the representative image 443) of the view 8. Next, the LCD controller 171 displays the representative image 443 on the LCD 172 based on the control of the CPU 160. That is, the representative image 443 is review-displayed, even after the review display is performed in this manner, the created representative image 443 is maintained in the RAM 150 until being subjected to the packing processing to the MP file 430 shown in FIG. 9. As a result, it is possible to reduce the overhead at the time of the composition processing without performing the composition processing of the representative image 442 again.

In this manner, the multi-view image is created using the plurality of images created by the imaging portion 110. Furthermore, the representative image of the created multi-view image is initially displayed on the LCD 172.

Functional Configuration Example of Imaging Device

FIG. 11 is a block diagram that shows a functional configuration of the imaging device 100 in the first embodiment of the invention. The imaging device 100 includes an operation reception portion 210, a posture detection portion 220, a control portion 230, an imaging portion 240, a captured image maintenance portion 250, a movement amount detection portion 260, a composition portion 270, a display control portion 280, a display portion 285, a recording control portion 290, and a content memory unit 300.

The operation reception portion 210 is an operation reception portion which receives the operation content operated by a user, and supplies the operation signal depending on the received operation content to the control portion 230. For example, the operation reception portion 210 corresponds to the input control portion 181 and the operation portion 182 shown in FIG. 1.

The posture detection portion 220 detects a change in posture of the imaging device 100 by detecting the acceleration, the movement, the tilt or the like of the imaging device 100, and outputs the posture change information relating to the change of the detected posture to the control portion 230. In addition, the posture detection portion 220 corresponds to the gyro sensor 115 shown in FIG. 1. Furthermore, the posture detection portion 220 is an example of the detection portion described in the claims.

The control portion 230 controls the respective portions of the imaging device 100 based on the operation content from the operation reception portion 210. For example, when the setting operation of the capturing mode is received by the operation reception portion 210, the control portion 230 sets the capturing mode depending on the setting operation thereof. Furthermore, for example, the control portion 230 interprets a change amount (the movement direction, the movement amount or the like) of the posture of the imaging device 100 based on the posture change information, which is output from the posture detection portion 220, and outputs the interpretation result to the composition portion 270 and the display control portion 280. Furthermore, for example, the control portion 230 performs a control in which, after the creation processing of the plurality of captured images by the imaging portion 240 is finished, the multi-view image becoming a predetermined sequence (e.g., the middle view) among the plurality of multi-view images becoming the creation target by the composition portion 270 is displayed on the display portion 285 as the representative image. In this manner, after displaying the representative image, the control portion 230 performs a control in which, for example, at least a part of the created multi-view image is sequentially displayed on the display device 285 according to a predetermined rule (e.g., each of the views). Furthermore, for example, after the creation processing of the plurality of captured images by the imaging portion 240 is finished, the control portion 230 performs a control in which information (e.g., the progress bar 521 shown in FIGS. 19 and 21) relating to the progress of the creation of the multi-view image by the composition portion 270 is displayed on the display portion 285. In this case, immediately after the creation processing of the plurality of captured images by the imaging portion 240 is finished, the control portion 230 performs a control in which the progress information is displayed on the display portion 285. In addition, the control portion 230 corresponds to the CPU 160 shown in FIG. 1.

The imaging portion 240 images the subject to create the captured image based on the control of the control portion 230, and supplies the created captured imaged to the captured image maintenance portion 250. Furthermore, when the two view image capturing mode or the multi-view image capturing mode is set, the imaging portion 240 images the subject to create a plurality of captured images that continues in a time series and supplies the created captured image to the captured image maintenance portion 250. In addition, the imaging portion 240 corresponds to the imaging portion 110 shown in FIG. 1.

The captured image maintenance portion 250 is an image memory, which maintains the captured image created by the imaging portion 240, and supplies the maintained captured image to the composition portion 270. In addition, the captured image maintenance portion 250 corresponds to the RAM 150 shown in FIG. 1.

The movement amount detection portion 260 detects the movement amount and the movement direction between the adjacent captured images in the time axis in regard to the captured image maintained in the captured image maintenance portion 250, and outputs the detected movement amount and movement direction to the composition portion 270. For example, the movement amount detection portion 260 performs a matching processing (that is, a matching processing of distinguishing the imaging area of the same subject) between the pixels constituting the adjacent two captured images, and calculates the pixel number moved between the respective captured images. In the matching processing, basically, a processing is performed in which the subject is supposed to be stopped. In addition, when a moving body is included in the subject, a motion vector different from a motion vector of the whole captured image is detected, but the motion vector corresponding to the moving body is out of the detection target, whereby the processing is performed. That is, only the motion vector (GMV: global motion vector) corresponding to the motion of the whole captured image generated due to the movement of the imaging device 100 is detected. In addition, the movement amount detection portion 260 corresponds to the CPU 160 shown in FIG. 1.

The composition portion 270 creates the multi-view image using the plurality of captured images maintained in the captured image maintenance portion 250 based on the control of the control portion 230, and supplies the created multi-view image to the display control portion 280 and the recording control portion 290. That is, the composition portion 270 calculates the take-out area in each of the plurality of captured images maintained in the captured image maintenance portion 250 based on the interpretation result (the interpretation result of the change amount of the posture of the imaging device 100) output from the control portion 230. Moreover, the composition portion 270 takes the image (the elongated image) out of the take-out area in each of the plurality of captured images and composes the taken-out image to create the multi-view image. In this case, the composition portion 270 composes the taken-out image in an overlapped manner to create the multi-view image based on the movement amount and the movement direction output from the movement amount detection portion 260. The multi-view images thus created are the plurality composite images having the sequence relationship (the respective views) based on a predetermined rule. Furthermore, for example, the composition portion 270 initially creates the representative image immediately after the creation processing of the plurality of captured images by the imaging portion 240. In addition, the initially created image may be changed by a user operation or the setting content is finished. In addition, the composition portion 270 corresponds to the resolution conversion portion 120, the RAM 150 and the CPU 160 shown in FIG. 1.

The display control portion 280 displays the multi-view image created by the composition portion 270 on the display portion 285 based on the control of the control portion 230. For example, the display control portion 280 displays the multi-view image becoming the predetermined sequence (e.g., the middle view) among the plurality of multi-view images becoming the creation target by the composition portion 270 on the display portion 285 as the representative image, after the creation processing of the plurality of captured images by the imaging portion 240 is finished. As a result, after displaying the representative image, the display control portion 280, for example, sequentially displays at least a part of the created multi-view image on the display portion 285 according to the predetermined rule (e.g., the respective views). In addition, for example, the display control portion 280 displays the information (e.g., the progress bar 521 shown in FIGS. 19 to 21) relating to the progress of the creation of the multi-view image by the composition portion 270 on the display portion 285, after the creation processing of the plurality of captured images by the imaging portion 240 is finished. The display examples will be explained in detail with reference to FIGS. 12A to 21D. In addition, the display control portion 280 corresponds to the resolution conversion portion 120 and the LCD controller 171 shown in FIG. 1.

The display portion 285 is a display portion that displays the image supplied from the display control portion 280. Furthermore, various menu screens or various images are displayed on the display portion 285. In addition, the display portion 285 corresponds to the LCD 172 shown in FIG. 1.

The recording control portion 290 performs a control which records the multi-view image created by the composition portion 270 on the content memory unit 300 based on the control of the control portion 230. That is, the recording control portion 290 relates the representative image information showing the representative image of the multi-view image and the sequence relationship (e.g., the view number) of the multi-view image to the created multi-view image, thereby recording the multi-view image on the recording medium as the MP file. In addition, the recording control portion 290 corresponds to the image compression expansion portion 130 and the removable media controller 191 shown in FIG. 1.

The content memory unit 300 stores the multi-view image created by the composition portion 270 as the image file (the image content). In addition, the content memory portion 300 corresponds to the removable media 192 shown in FIG. 1.

Display Example of Representative Image

FIGS. 12A to 12C are diagrams that show display examples of the representative image displayed on the display portion 285 in the first embodiment of the invention. FIGS. 12A to 12C show examples in which the multi-view images of seven views are created and the respective images are related to each other and are stored in the content memory unit 300. Furthermore, in FIGS. 12A to 12C, in regard to the multi-view images of the seven views, from the left view (view 1) to the right view (view 7) toward the subject, the view numbers are given so as to be an ascending sequence and the view numbers are shown in the rectangle indicating the image. Furthermore, in FIGS. 12A to 12C, an example is shown in which the middle image (the multi-view images of the view 4) is the representative image among the multi-view images of the seven views. In addition, as the representative image, for example, the image adjoining or approaching the middle image may be used.

FIG. 12A shows an example of the multi-view image becoming the recording target to the content memory unit 300. In addition, in FIG. 12A, each of the images are shown in parallel in the sequence of the view number.

FIG. 12B shows the multi-view images of the views 1 to 7 created by the composition processing in a line in the creation sequence thereof after the imaging operation for creating the multi-view images of the views 1 to 7 shown in FIG. 12A is finished. That is, the representative image (the multi-view image of the view 4) initially displayed on the display portion 285 becomes the target of the initial composition processing. After the composition processing of the representative image (the multi-view image of the view 4) is finished, the composition processing of other multi-view images is performed.

For example, the composition processing is performed in the sequence (the sequence of the views 1 to 3 and 5 to 7) of view numbers.

FIG. 12C shows an example in which the representative image is displayed as the image initially displayed on the display portion 285 during composition processing shown in FIG. 12B. In this manner, by initially displaying the representative image, it is possible to rapidly and easily confirm the representative image of the multi-view image.

As mentioned above, a case has been shown in which, in the case of recording the multi-view images of three views or more, only the representative image is review-displayed. However, other multi-view images other than the representative image may be displayed depending on the preference of a user. Thus, hereinafter, an example will be shown which sequentially review-displays other multi-view images other than the representative image.

FIGS. 13A to 16C show diagrams that show display transition examples of the multi-view images displayed on the display portion 285 in the first embodiment of the invention. In FIGS. 13A to 16C, examples are shown in which, similarly to FIGS. 12A to 12C, when the multi-view images of the seven views are related to each other and are recorded in the content memory unit 300, the middle image (the multi-view image of the view 4) is set as the representative image. Furthermore, in FIG. 13A to 16C, similarly to FIGS. 12A and 12C, in regard to the multi-view images of the seven views, from the left view (view 1) to the right view (view 7) toward the subject, the view numbers are given so as to be an ascending sequence and the view numbers are shown in the rectangle indicating the image.

FIGS. 13A, 14A, 15A, and 16A show an example of the multi-view image becoming the recording target to the content memory unit 300. In addition, FIGS. 13A, 14A, 15A, and 16A are the same as the example shown in FIG. 12A.

Figure 14A:
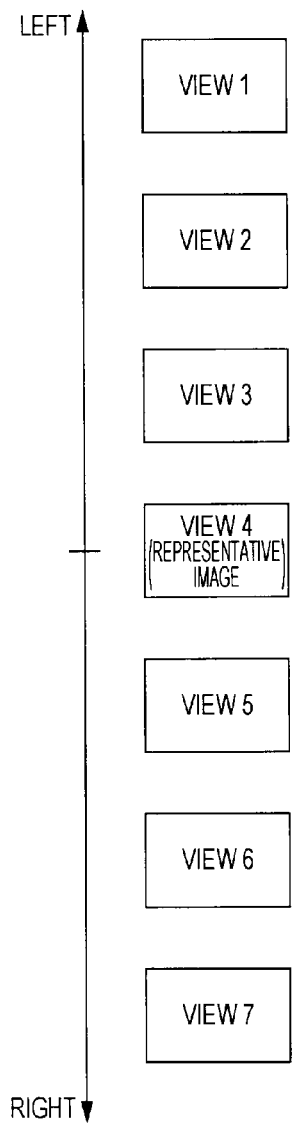
FIGS. 14A to 14C are diagrams that show display transition examples of a multi-view image displayed on a display portion in the first embodiment of the invention.
Figure 14B:
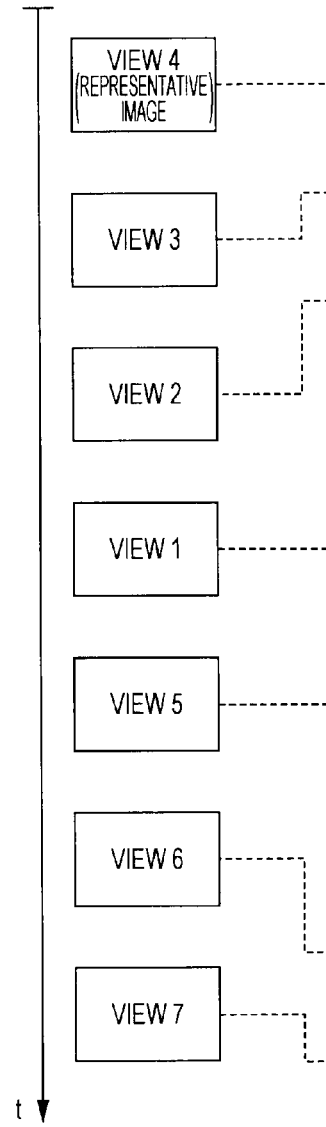

FIGS. 13B and 14B shows the multi-view images of the view 1 to view 7 created by the composition processing in a creation sequence in a line after the imaging operation for creating the multi-view images of the view 1 to view 7 shown in FIG. 12A is finished. FIGS. 13B and 14B are identical to the example shown in FIG. 12B.

FIG. 13C shows the display transition example of the multi-view image displayed on the display portion 285 during composition processing shown in FIG. 13B. That is, FIG. 13C shows an example in which, after the imaging operation for creating the multi-view image is finished, the multi-view image created by the composition processing is sequentially review-displayed depending on the creation sequence.

Figure 14C:
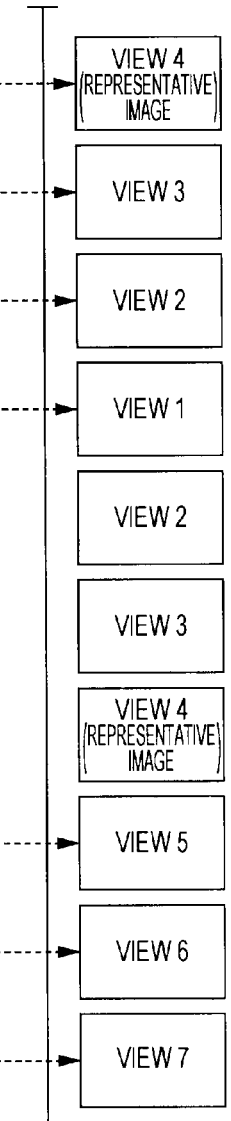

FIG. 14C shows the display transition example of the multi-view image displayed on the display portion 285 during composition processing shown in FIG. 14B. That is, FIG. 14C shows an example in which, after the imaging operation for creating the multi-view image is finished, the multi-view image created by the composition processing is sequentially review-displayed in a descending sequence of the view number from the representative image, and, after the display, the multi-view image is review-displayed in an ascending sequence of the view number.

In this manner, it is possible to initially review-display the representative image, and when the display of the representative image, sequentially review-display the multi-view image created by the composition processing according to a predetermined rule. As a result, initially, the representative image of the multi-view image can be rapidly confirmed, and after confirmation, another multi-view image can be easily confirmed.

Herein, when reproducing the multi-view image, the representative image of the multi-view image is displayed in a list on the selection screen for selecting a desired multi-view image in many cases. Thus, immediately after the imaging processing by the imaging portion 240 is finished, the representative image is review-displayed. For that reason, it is possible to easily confirm the same image as the representative image, which is displayed in a list at the time of the reproduction, at the time of the review-display. As a result, it is possible to reduce disharmony at the time of the reproduction.

Furthermore, immediately after the imaging processing by the imaging portion 240 is finished, by initially synthesizing and review-displaying the representative image of the multi-view image, a user does not have to have the time until the representative image is composed from the left view image. For that reason, a user can make the timing of confirming the multi-view image becoming the recording target faster. As a result, for example, after confirmation of the multi-view image becoming the recording target, it is possible to solve the disadvantage that the cancel timing of the imaging is delayed. In addition, the display sequence of the multi-view image may be changed depending on the preference of a user. Next, the display transition example thereof will be shown.

Figure 15A:
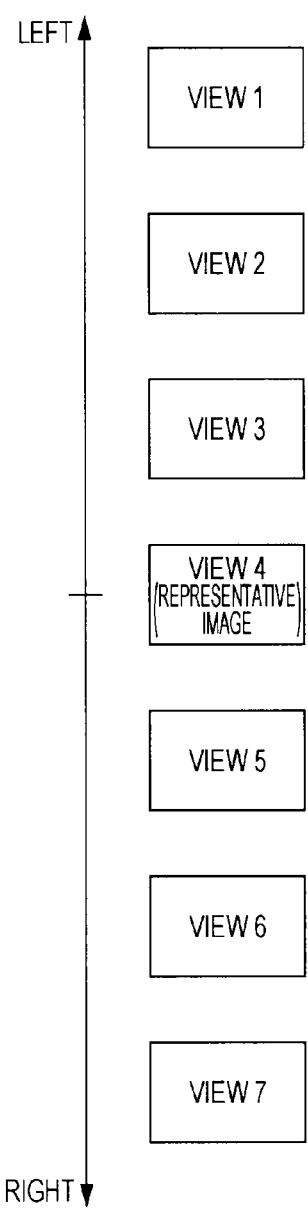
FIGS. 15A to 15C are diagrams that show display transition examples of a multi-view image displayed on a display portion in the first embodiment of the invention.
Figure 15B:
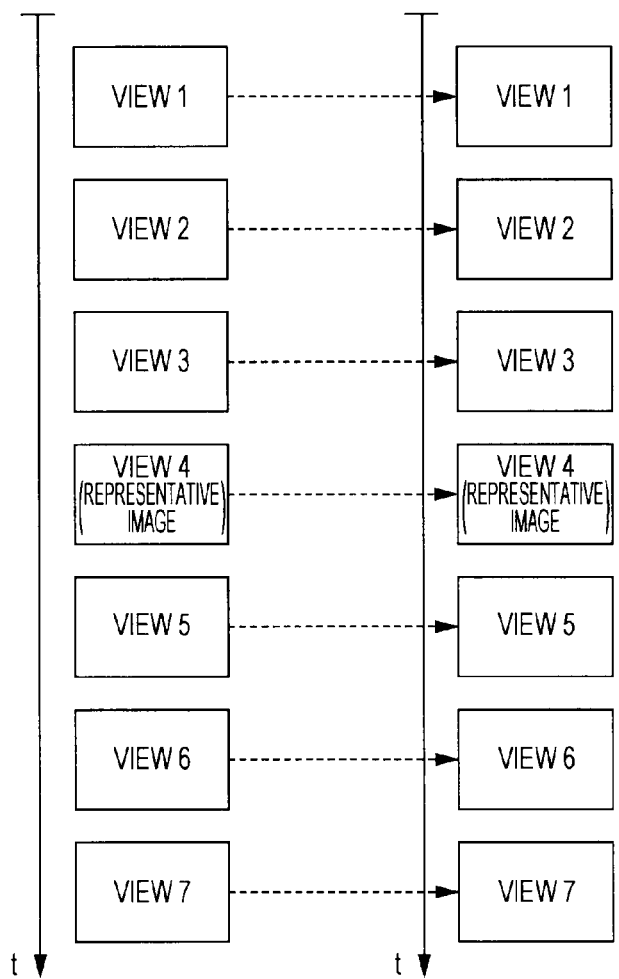
Figure 16A:
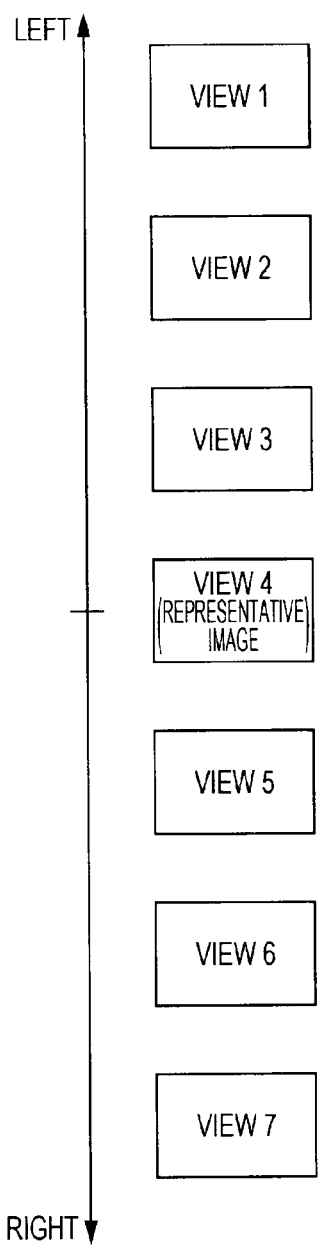
FIGS. 16A to 16C are diagrams that show display transition examples of a multi-view image displayed on a display portion in the first embodiment of the invention.
Figures 16B, 16C:
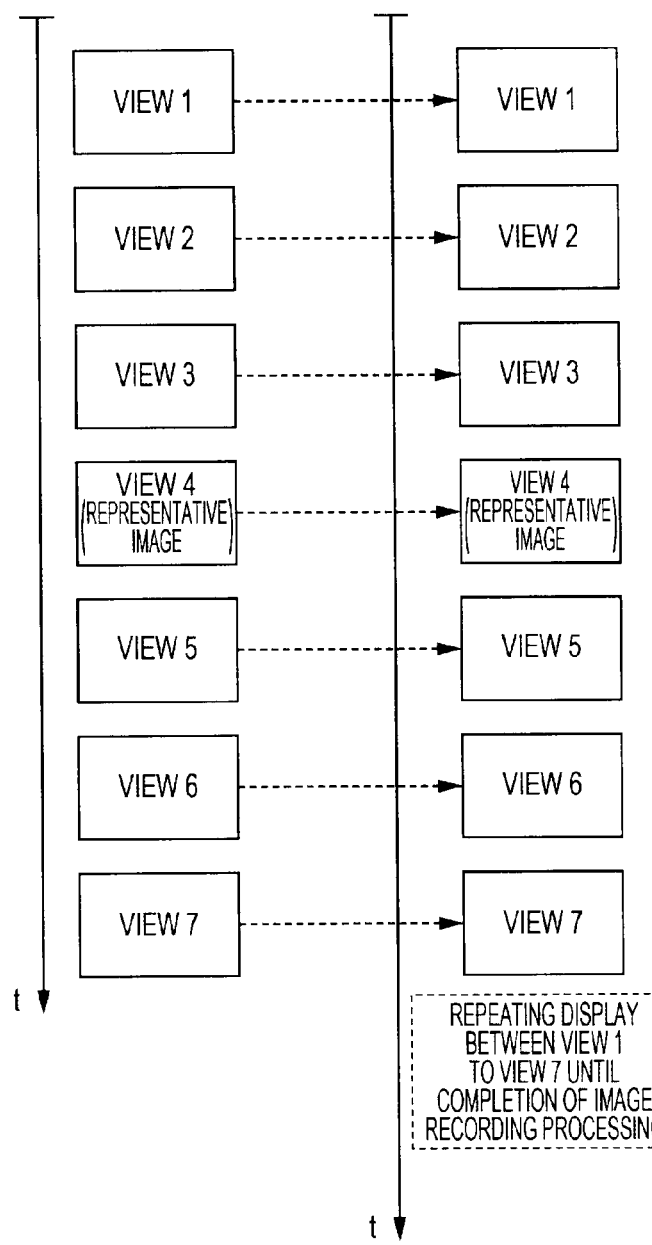

FIGS. 15B and 16B show the multi-view images of the view 1 to view 7 created by the composition processing in a creation sequence in a line after the imaging operation for creating the multi-view images of the view 1 to view 7 shown in FIG. 12A is finished. In the example, the composition processing of the multi-view image is performed so as to be the ascending sequence from the left view (view 1) to the right view (view 7) toward the subject.

Figure 15C:
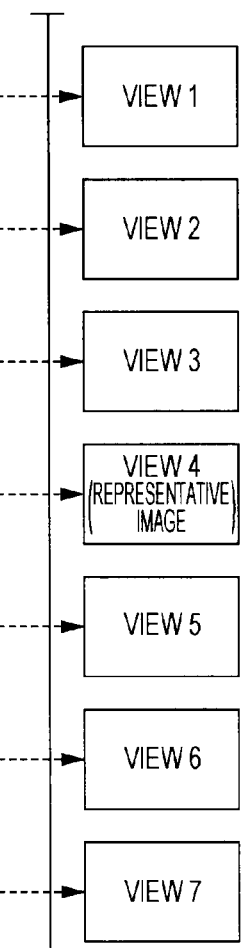

FIG. 15C shows the display transition example of the multi-view image displayed on the display portion 285 during composition processing shown in FIG. 15B. That is, FIG. 15C shows an example in which, after the imaging operation for creating the multi-view image is finished, the multi-view image created by the composition processing is sequentially review-displayed depending on the creation sequence.

FIG. 16C shows the display transition example of the multi-view image displayed on the display portion 285 during composition processing shown in FIG. 16B. That is, similarly to the example shown in FIG. 15C, FIG. 16C shows an example in which, after the multi-view image is review-displayed in the ascending sequence of the view number, the multi-view image is further sequentially review-displayed in a descending sequence of the view number. That is, in the example shown in FIG. 16C, during the time until the recording processing to the content memory unit 300 of the created multi-view image is finished, a display operation of sequentially review-displaying the multi-view image in the ascending sequence of the view number is repeatedly performed. In addition, in the examples shown in FIGS. 15A to 16C, the examples have been shown in which the multi-view image is sequentially review-displayed in the ascending sequence of the view number, but the multi-view image may be review-displayed in the descending sequence of the view number.

In this manner, the composition processing of the multi-view image is performed so as to be the ascending sequence of the view number, and the multi-view image created by the composition processing can be sequentially review-displayed. As a result, it is possible to easily confirm the representative image of the multi-view image and other multi-view images in the ascending sequence or the descending sequence of the view number of the multi-view image. In this manner, by performing the review-display in the ascending sequence or the descending sequence of the view number, it is possible to easily perform confirmation of the multi-view image depending on the reproduction sequence of the multi-view image.

In addition, FIGS. 15A to 16C show examples in which the review-display is performed in the ascending sequence or the descending sequence of the view number, but at a point of time when the composition processing of the multi-view image is finished, it is desirable to review-display the representative image. That is, it is desirable to set the image, which is review-displayed at last, as the representative image.

State of Progress Notification Example of Composition Processing of Multi-View Image FIGS. 17A to 17C are diagrams that schematically show a state of progress notification information of a composition processing of the multi-view image displayed on the display portion 285 in the first embodiment of the invention. FIGS. 17A to 17C show examples in which, as the state of progress notification information (progress information) of the composition processing of the multi-view image, progress bars are displayed. The progress bars display how the composition processing of the multi-view image is progressing through a certain degree of ratio using rod shaped graphs. Furthermore, the examples shown in FIGS. 17A to 17C show examples in which the seven view images are created as the multi-view image.

FIG. 17A schematically shows the display method when displaying the progress bar 500. For example, while the composition processing of the multi-view image is performed, a state of progress notification screen (e.g., a state of progress notification screen 520 shown in FIGS. 19A to 19D) provided with the progress bar 500 is displayed on the display portion 285. The progress bar 500 has a length of L1 in a horizontal direction.

Herein, in the case of creating the seven view images as the multi-view image, the display control portion 280 calculates a value, in which the length of the horizontal direction in the progress bar 500 is divided by 7, and sets seven rectangular areas in the progress bar 500 by the calculated value. That is, as the value in which the length of the horizontal direction in the progress bar 500 is divided by 7, a length L11 (=L12 to L17) is calculated, and seven rectangular areas corresponding to the lengths L11 to L17 is set. The rectangular area is an area which becomes a unit for sequentially changing the display state when the composition processing of one multi-view image is finished.

FIG. 17B shows a transition of the composition processing of the multi-view image. FIG. 17B schematically shows the multi-view image, in which the composition processing is finished, in a line along the time axis. Furthermore, FIG. 17C shows the display transition of the progress bar 500 which is changed depending on the composition processing shown in FIG. 17B. Furthermore, in the examples shown in FIGS. 17B and 17C, in regard to the transition of the composition processing of the multi-view image shown in FIG. 17B and the display transition of the progress bar 500 which is changed depending on the composition processing shown in FIG. 17C, the composition processing shown in FIG. 17C, the corresponding relationship is shown in a series left to right.

For example, immediately after the imaging operation of the multi-view image is finished, the state of progress notification screen (e.g., the state of progress notification screen 520 shown in FIGS. 19A to 19D) is displayed on the display portion 285. Immediately after the state of progress notification screen is displayed, the progress bar 500 is displayed as a single color (e.g., white). Next, when the composition processing of the multi-view image is started and the composition processing of one multi-view image is finished, as shown in FIG. 17C, the display control portion 280 changes the display state of the rectangular area (a rectangular area corresponding to the length L11) of the left end (e.g., changes to gray color).

Furthermore, as shown in FIG. 17C, whenever the composition processing of the multi-view image is finished, the display control portion 280 sequentially changes the display state of the rectangular area (the rectangular area corresponding to the length L12 to L16) from the left end by the number the multi-view image in which the composition processing is finished. Moreover, when the composition processing of the whole multi-view image is finished, the display state of the respective rectangular areas (that is, all of the progress bars 500) is changed.

In this manner, whenever the composition processing of the multi-view image is finished, by changing the display state of the progress bar 500 to notify the state of progress of the composition processing of the multi-view image, a user can easily understand the situation of the composition processing thereof.

In addition, an example has been shown in which, whenever the composition processing of the multi-view image is finished, the display state of the progress bar 500 is changed. However, for example, when the number of the multi-view image becoming the composition target is large, the plurality of multi-view images is set as one unit, and whenever the composition processing of the respective multi-view images is finished, the display state of the progress bar 500 may be changed. For example, when five multi-view images are set as one unit, whenever the composition processing of the fifth multi-view image is finished, the display state of the progress bar 500 is changed. As a result, it is possible to frequently not renew the display state of the progress bar 500, and a user can easily view.

Figure 18A:
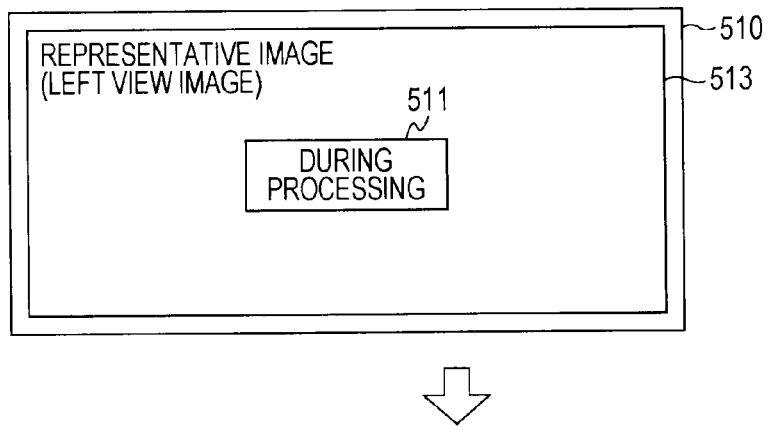
FIGS. 18A and 18B are diagrams that show display transition examples of a state of progress notification screen displayed on a display portion in the first embodiment of the invention.
Figure 18B:
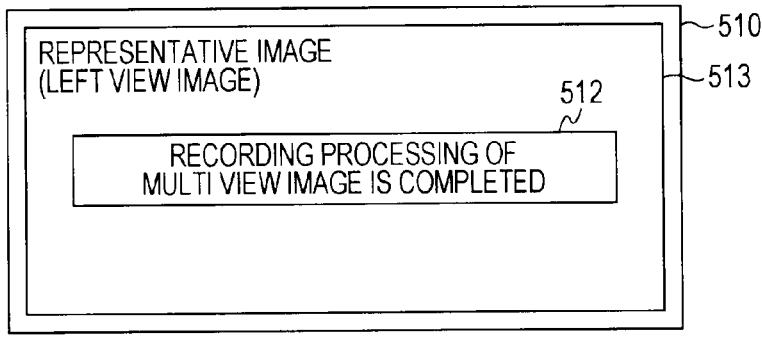

Display Example of the State of Progress Notification Screen of Composition Processing of Two View Image FIGS. 18A and 18B are diagrams that show display transition examples of the state of progress notification screen displayed on the display portion 285 in the first embodiment of the invention. FIGS. 18A and 18B show an example of the state of progress notification screen in the case of recording of two view image as the multi-view image.

FIG. 18A shows the state of progress notification screen 510 which is displayed on the display portion 285 immediately after the imaging operation of two view image is finished. The representative image (e.g., the left view image) 513 among two view image is displayed on the state of progress notification screen 510, and an under-processing message 511 is displayed to be overlapped with the representative image 513. In addition, the representative image 513 shown in FIGS. 18A and 18B is simply shown by giving a character of the representative image (the left view image) in the corresponding rectangle. Furthermore, similarly, the display images shown in FIGS. 19A to 21D are simply shown by giving characters indicating the respective images image in the corresponding rectangle.

The under-processing message 511 is a character that shows the composition processing of two view image is implementing. In addition, on the state of progress notification screen 510, during the time until the composition processing of the representative image among two view image is finished, only the under-processing message 511 is displayed.

FIG. 18B shows the state of progress notification screen 510 displayed on the display portion 285 immediately after the recording processing of two view image is finished. On the state of progress notification screen 510, the representative image (e.g., the left view image) 513 among two view image is displayed, and the processing finish message 512 is displayed so as to be overlapped with the representative image 513. The processing finish message 512 is a character showing that the recording processing of two view image is finished.

In this manner, when the recording processing of two view image is performed, since the number of the image becoming the composition target is small, it is supposed that the composition processing is relatively delayed and finished. For that reason, it is possible to display the progress bar notifying the state of progress on the state of progress notification screen which is displayed when the recording processing of two view image is performed. In addition, the progress bar may be displayed depending on the preference of a user.

Display Example of the State of Progress Notification Screen of Composition Processing of Multi-View Image (Three View or More)

FIGS. 19A to 19D are diagrams that show display transition examples of the state of progress notification screen which are displayed on the display portion 285 in the first embodiment of the invention. FIGS. 19A to 19D show an example of the state of progress notification screen in the case of recording of three or more multi-view image.

Figure 19A:
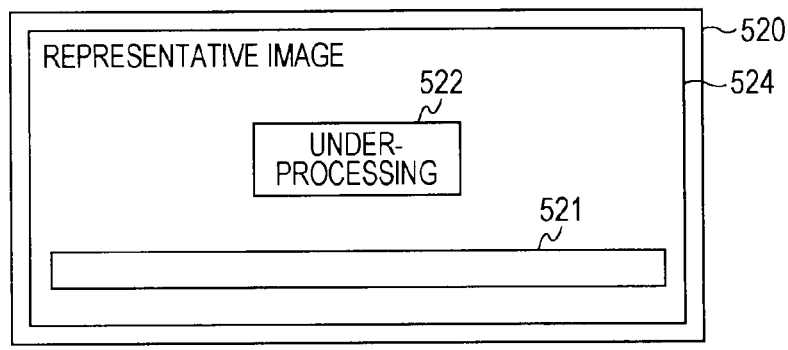
FIGS. 19A to 19D are diagrams that show display transition examples of a state of progress notification screen displayed on a display portion in the first embodiment of the invention.

FIG. 19A shows the state of progress notification screen 520 which is displayed on the display portion 285 immediately after the imaging operation of the multi-view image is finished. The representative image 524 among the multi-view image is displayed on the state of progress notification screen 520, and the progress bar 521 and an under-processing message 522 are displayed so as to be overlapped with the representative image 524. In addition, the progress bar 521 is the same as the progress bar 500 shown in FIGS. 17A to 17C. Furthermore, the under-processing message 522 is a character that shows the composition processing of the multi-view image is implementing. In addition, on the state of progress notification screen 520, during the time until the composition processing of the representative image among the multi-view image is finished, only the progress bar 521 and the under-processing message 522 are displayed.

Figure 19B:
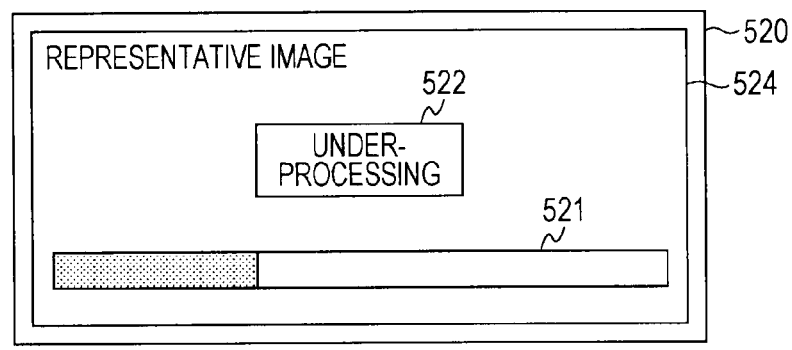
Figure 19C:
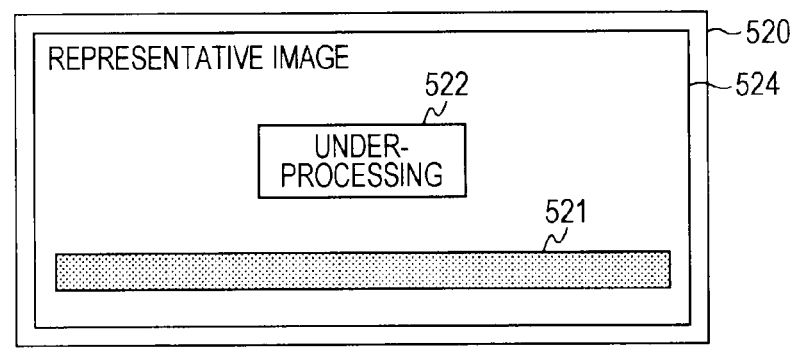

FIGS. 19B and 19C show a state of progress notification screen 520 displayed on the display portion 285 while the composition processing of the multi-view image is performed. On the state of progress notification screen 520, similarly to FIG. 19A, the representative image 524, the progress bar 521 and the under-processing message 522 are displayed. Herein, as shown in FIG. 17C, the display state of the progress bar 521 is changed depending on the number of the multi-view image in which the processing is finished. In addition, FIG. 19C shows the state of progress notification screen 520 displayed on the display portion 285 immediately after the composition processing of the whole multi-view image is finished.

Figure 19D:
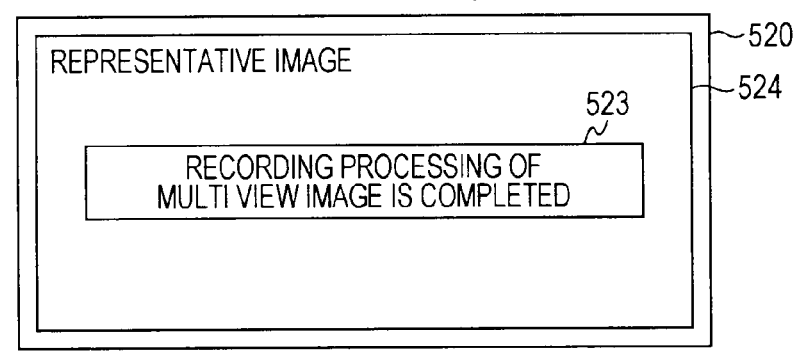

FIG. 19D shows the state of progress notification screen 520 displayed on the display portion 285 immediately after the recording processing of the multi-view image is finished. On the state of progress notification screen 520, the representative image 524 among the multi-view image is displayed, and the processing finish message 523 is displayed so as to be overlapped with the representative image 524. The processing finish message 523 is a character showing that the recording processing of the multi-view image is finished.

As mentioned above, an example has been shown in which, while the composition processing of the multi-view image is performed, the representative image of the multi-view image and the progress bar are displayed. However, as shown in FIGS. 13A to 16C, while the composition processing of the multi-view image is performed, other images other than the representative image among the multi-view image may be sequentially displayed. Furthermore, by other display states other than the progress bar, the state of progress notification information of the composition processing of the multi-view image may be performed. Hereinafter, the display examples will be shown.

FIGS. 20A to 20D are diagrams that show display transition examples of the state of progress notification screen which are displayed on the display portion 285 in the first embodiment of the invention. FIGS. 20A to 20D show an example of the state of progress notification screen in the case of recording of three or more multi-view image. Furthermore, the examples shown in FIGS. 20A to 20D are modified examples of FIGS. 19A to 19D, and the portions common to FIGS. 19A to 19D will be denoted by the identical reference numerals and a part of the description thereof will be omitted.

Figure 20A:
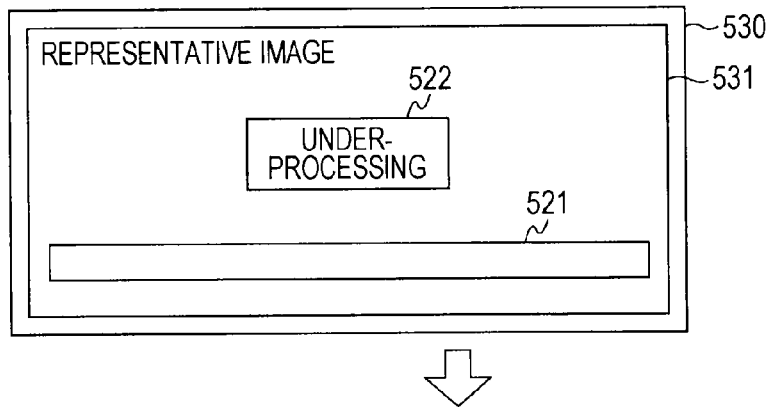
FIGS. 20A to 20D are diagrams that show display transition examples of a state of progress notification screen displayed on a display portion in the first embodiment of the invention.

FIG. 20A shows the state of progress notification screen 530 which is displayed on the display portion 285 immediately after the imaging operation of the multi-view image is finished. Similarly to FIG. 20A, the representative image 531, the progress bar 521 and an under-processing message 522 are displayed on the state of progress notification screen 530.

Figure 20B:
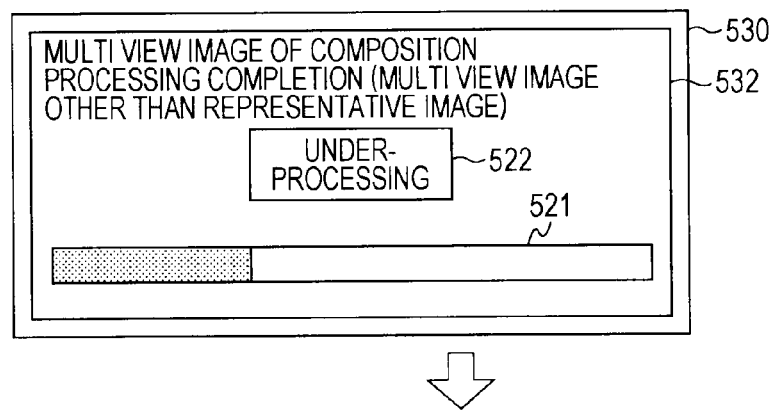
Figure 20C:
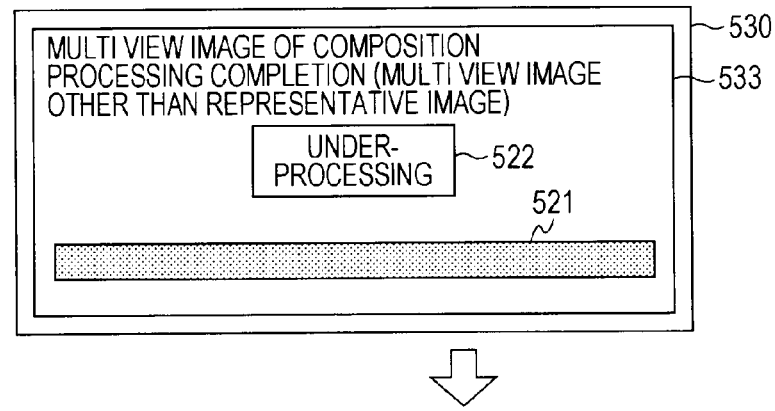

FIGS. 20B and 20C show a state of progress notification screen 530 displayed on the display portion 285 while the composition processing of the multi-view image is performed. On the state of progress notification screen 530, similarly to FIGS. 19B and 19C, the progress bar 521 and the under-processing message 522 are displayed. However, it is different from FIGS. 19B and 19C in that the multi-view images 532 and 533, in which the composition processing is completed, are displayed in the background thereof. In addition, the multi-view images 532 and 533, in which the composition processing is completed, are the multi-view image other than the representative image among the multi-view image, and can be displayed by the sequence shown in FIGS. 13A to 13C or 14A to 14C.

Figure 20D:
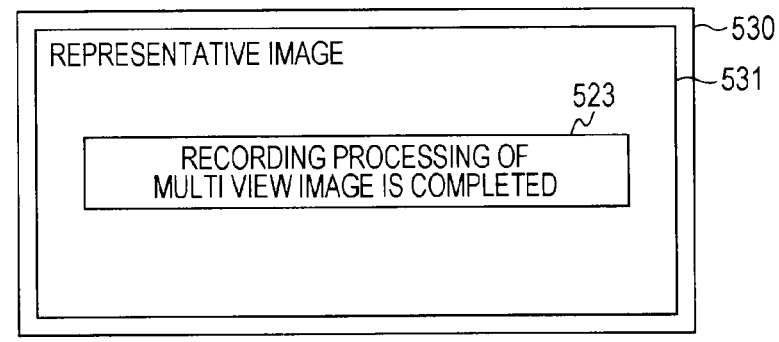

FIG. 20D shows the state of progress notification screen 530 displayed on the display portion 285 immediately after the recording processing of the multi-view image is finished. On the state of progress notification screen 520, similarly to FIG. 19D, the representative image 531 and the processing finish message 523 are displayed. In this manner, it is desirable to display the representative image immediately after the recording processing of the multi-view image is finished.

FIGS. 21A to 21D are diagrams that show display transition examples of the state of progress notification screen which are displayed on the display portion 285 in the first embodiment of the invention. FIGS. 21A to 21D show an example of the state of progress notification screen in the case of recording of three or more multi-view image. Furthermore, the examples shown in FIGS. 21A to 21D are modified examples of FIGS. 19A to 19D, and the portions common to FIGS. 19A to 19D will be denoted by the identical reference numerals and a part of the description thereof will be omitted.

Figure 21A:
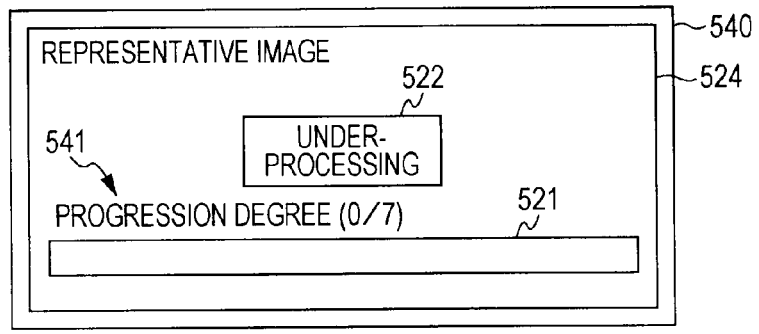
FIGS. 21A to 21D are diagrams that show display transition examples of a state of progress notification screen displayed on a display portion in the first embodiment of the invention.

FIG. 21A shows the state of progress notification screen 540 which is displayed on the display portion 285 immediately after the imaging operation of the multi-view image is finished. Similarly to FIG. 19A, the representative image 524, the progress bar 521 and an under-processing message 522 are displayed on the state of progress notification screen 540. However, it is different from FIG. 19A in that other state of progress notification information (the state of progress notification information 541) is displayed so as to be overlapped with the representative image 524. The state of progress notification information 541 is the information that notifies the state of progress of the composition processing of the state of progress notification screen, and displays that the composition processing of the multi-view image progresses by a certain degree of ratio by a numerical value. The examples shown in FIGS. 21A to 21D show the state of progress notification information 541 which notifies the state of progress, by a fraction in which the whole number of the multi-view image becoming the target of the composition processing is the denominator and the number of the multi-view image, in which the composition processing is completed, is the numerator.

Since the state of progress notification screen 540 shown in FIG. 21A is displayed immediately the imaging operation of the multi-view image is finished, none of the composition processing of the multi-view image is finished. For that reason, as the state of progress notification information 541, "progress degree (0/7)" is displayed.

Figure 21B:
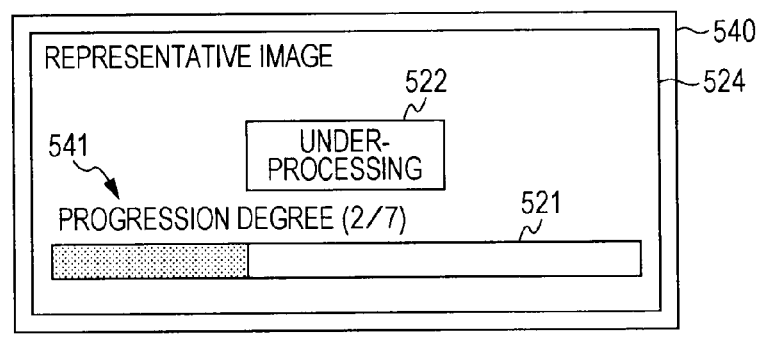
Figure 21C:
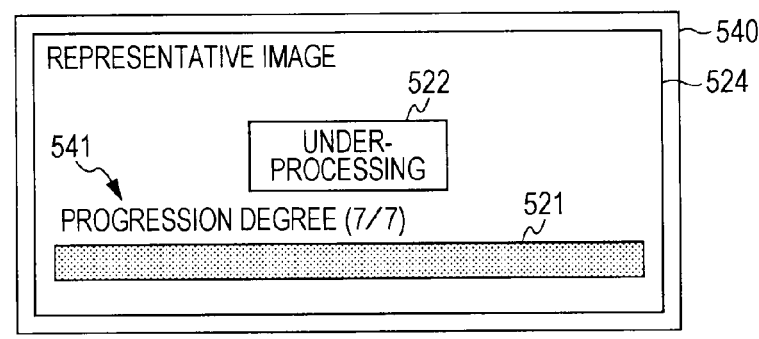

FIGS. 21B and 21C show a state of progress notification information 540 displayed on the display portion 285 while the composition processing of the multi-view image is performed. On the state of progress notification screen 540, similarly to FIGS. 19B and 19C, the progress bar 521 and the under-processing message 522 are displayed. However, it is different from FIGS. 19B and 19C in that the state of progress notification information 541 is displayed. In addition, the progress bar 521 displayed while the composition processing of the multi-view image is performed, and the state of progress notification information 541 correspond to each other.

Figure 21D:
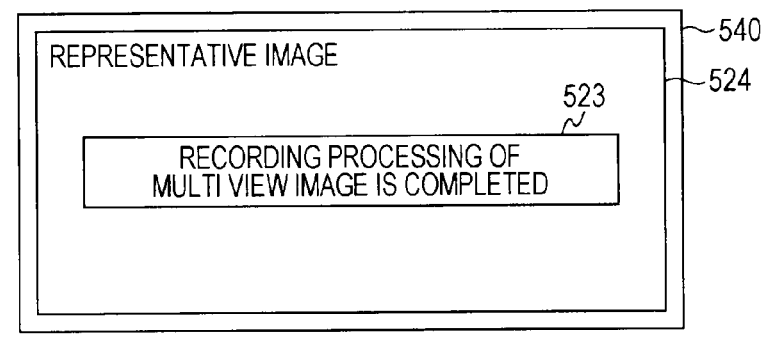

FIG. 21D shows the state of progress notification screen 540 which is displayed on the display portion 285 immediately after the recording processing of the multi-view image is finished. On the state of progress notification screen 520, similarly to FIG. 19D, the representative image 531 and the processing finish message 523 are displayed.

In this manner, while the composition processing of the multi-view image is performed, by displaying the progress bar 521 and the state of progress notification information 541, the state of progress thereof can be further easily understood. In addition, in the embodiment, an example has been shown in which the progress bar 521 and the state of progress notification information 541 are concurrently displayed, but only the state of progress notification information 541 may be displayed. Furthermore, other state of progress notification information (the state of progress notification information of the composition processing of the multi-view image) indicating that the composition processing of the multi-view image progresses by a certain ratio may be displayed. As other state of progress notification information, for example, it is possible to display the ratio by a numerical value (%) or a circle graph.

Furthermore, FIGS. 21A to 21D show examples in which the whole number of the multi-view image becoming the target of the composition processing is the denominator, but when the number of the denominator is great, the rouging is performed, and the numerical number after the rouging is set as the denominator, whereby the state of progress notification information may be displayed. For example, when the denominator is 100, the denominator can be displayed as 10 by performing the rouging. In this case, the value of the numerator is also changed depending on the rouging.

Operation Example of Imaging Device

Figure 22:
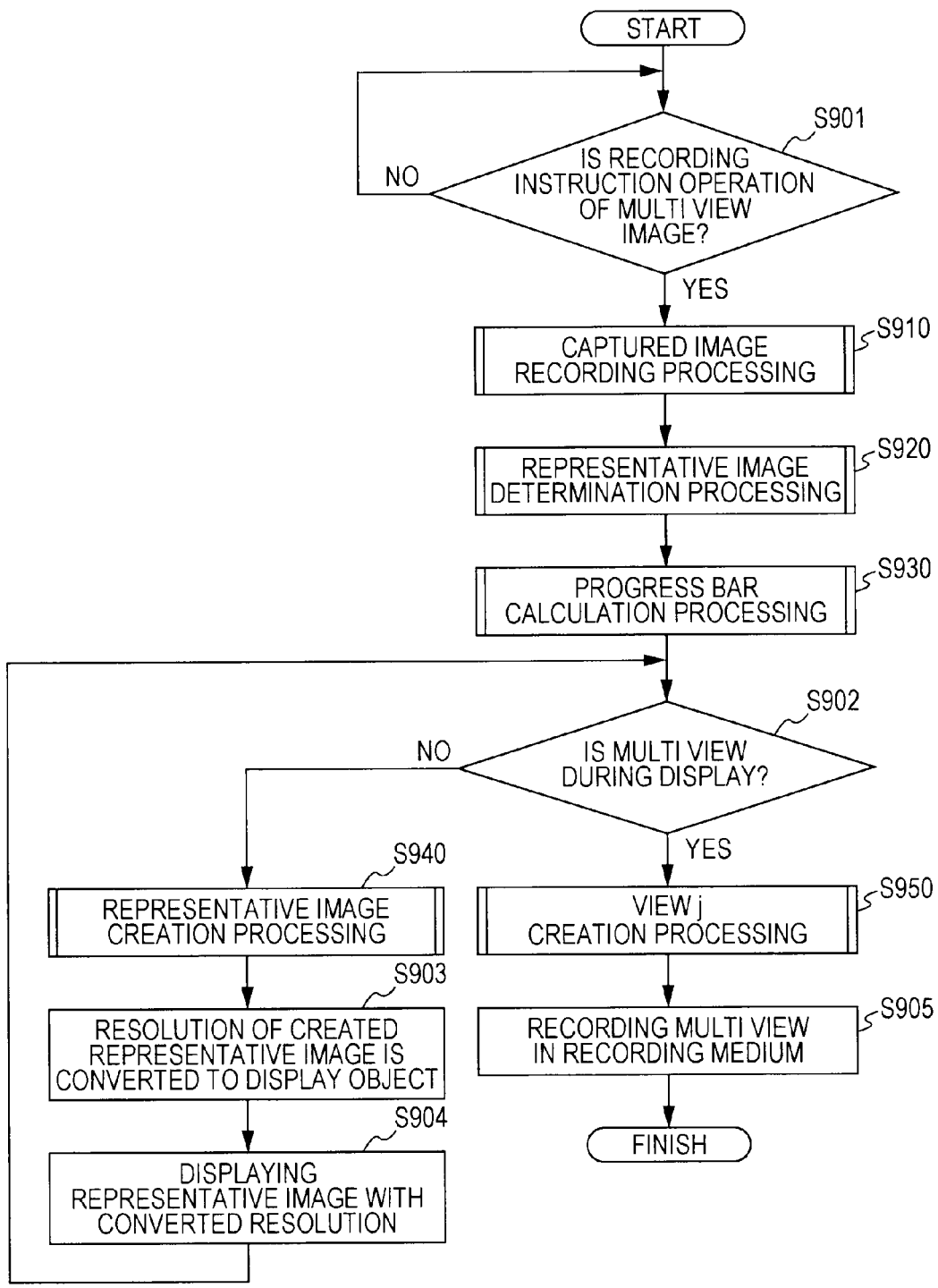
FIG. 22 is a flow chart that shows an example of a processing sequence of a multi-view image recording processing according to an imaging device in the first embodiment of the invention.

FIG. 22 is a flow chart that shows an example of the processing sequence of the multi-view image recording processing by the imaging device 100 in the first embodiment of the invention.

Firstly, it is decided whether or not the recoding instruction operation of the multi-view image is performed (step S901), and, when the recording instruction operation is not performed, the monitoring is continuously performed. On the other hand, when the recording instruction operation is performed (step S901), the captured image recording processing is performed (step S910). The captured image recording processing will be described in detail with reference to FIG. 23. In addition, step S910 is an example of the imaging sequence described in the claims.

Next, a representative image determination processing is performed (step S920). The representative image determination processing will be described in detail with reference to FIG. 24. Next, a progress bar calculation processing is performed (step S930). The progress bar calculation processing will be described in detail with reference to FIG. 25.

Next, it is decided whether or not the multi-view image is displayed on the display portion 285 (step S902), and, when the multi-view image is displayed on the display portion 285, a view j image creation processing is performed (step S950). The view j image creation processing will be described in detail with reference to FIG. 27. On the other hand, when the multi-view image is not displayed on the display portion 285 (step S902), the representative image creation processing is performed (step S940). The representative image creation processing will be described in detail with reference to FIG. 26. In addition, steps S940 and S950 are an example of the composition sequence described in the claims.

Next, the display control portion 280 converts the resolution of the representative image created by the composition portion 270 to the display purpose (step S903) and displays the representative image of the display purpose with the resolution thereof changed on the display portion 285 (step S904). In addition, the step S904 is an example of the control sequence described in the claims.

Furthermore, after the view j image creation processing is performed (step S950), the recording control portion 290 records a plurality of multi-view images created by the view j image creation processing in the content memory unit 300 as the MP file (step S905).

Figure 23:
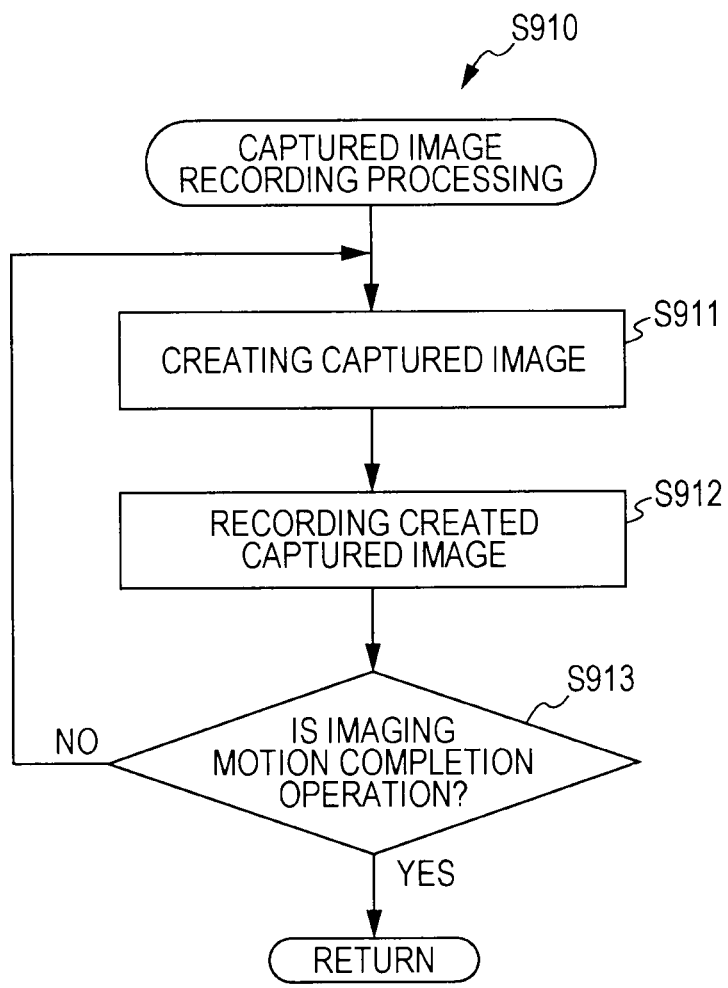
FIG. 23 is a flow chart that shows an example of a captured image recording processing among a processing sequence of a multi-view image recording processing according to an imaging device in the first embodiment of the invention.

FIG. 23 is a flow chart that shows an example of the captured image recording processing (the processing sequence of step S910 shown in FIG. 22) among the processing sequence of the multi-view image recording processing by the imaging device 100 in the first embodiment of the invention.

Firstly, the imaging portion 240 creates the captured image (step S911) and sequentially records the created captured image on the captured image maintenance portion 250 (step S912). Next, it is decided whether or not the instruction operation of imaging operation end is performed (step S913), and, when the instruction operation of the imaging operation end is performed, the operation of the captured image recording processing is finished. On the other hand, when the instruction operation of the imaging operation end is not performed (step S913), the process returns to step S911.

Figure 24:
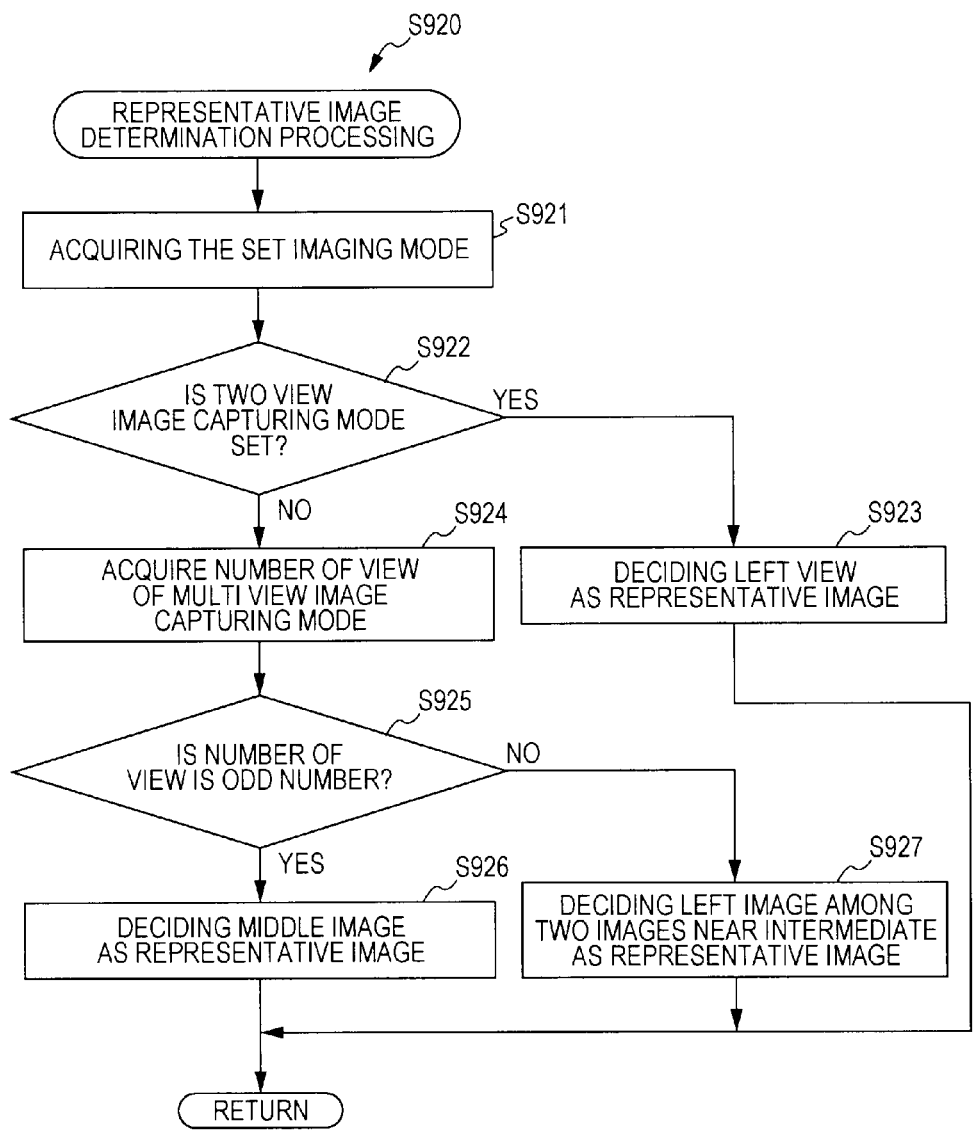
FIG. 24 is a flow chart that shows an example of a representative image determination processing among a processing sequence of a multi-view image recording processing according to an imaging device in the first embodiment of the invention.

FIG. 24 is a flow chart that shows an example of the representative image determination processing (the processing sequence of step S920 shown in FIG. 22) among the processing sequence of the multi-view image recording processing of the imaging device 100 in the first embodiment of the invention.

Firstly, the capturing mode set by the user operation is acquired (step S921). Moreover, it is decided whether or not two view image capturing mode is set (step S922), and, when the two view image capturing mode is set, the control portion 230 determines the left view image as the representative image (step S923).

On the other hand, when the two view image capturing mode is not set (that is, when the multi-view image capturing mode of three view or more is set) (step S922), the control portion 230 acquires the view number of the set multi-view image capturing mode (step S924). Next, it is decided whether or not the acquired view number is an odd number (step S925), and, when the acquired view number is the odd number, the control portion 230 determines the middle image as the representative image (step S926).

On the other hand, when the acquired view number is an even number (step S925), the control portion 230 determines the left image among two images near the middle as the representative image (step S927).

Figure 25:
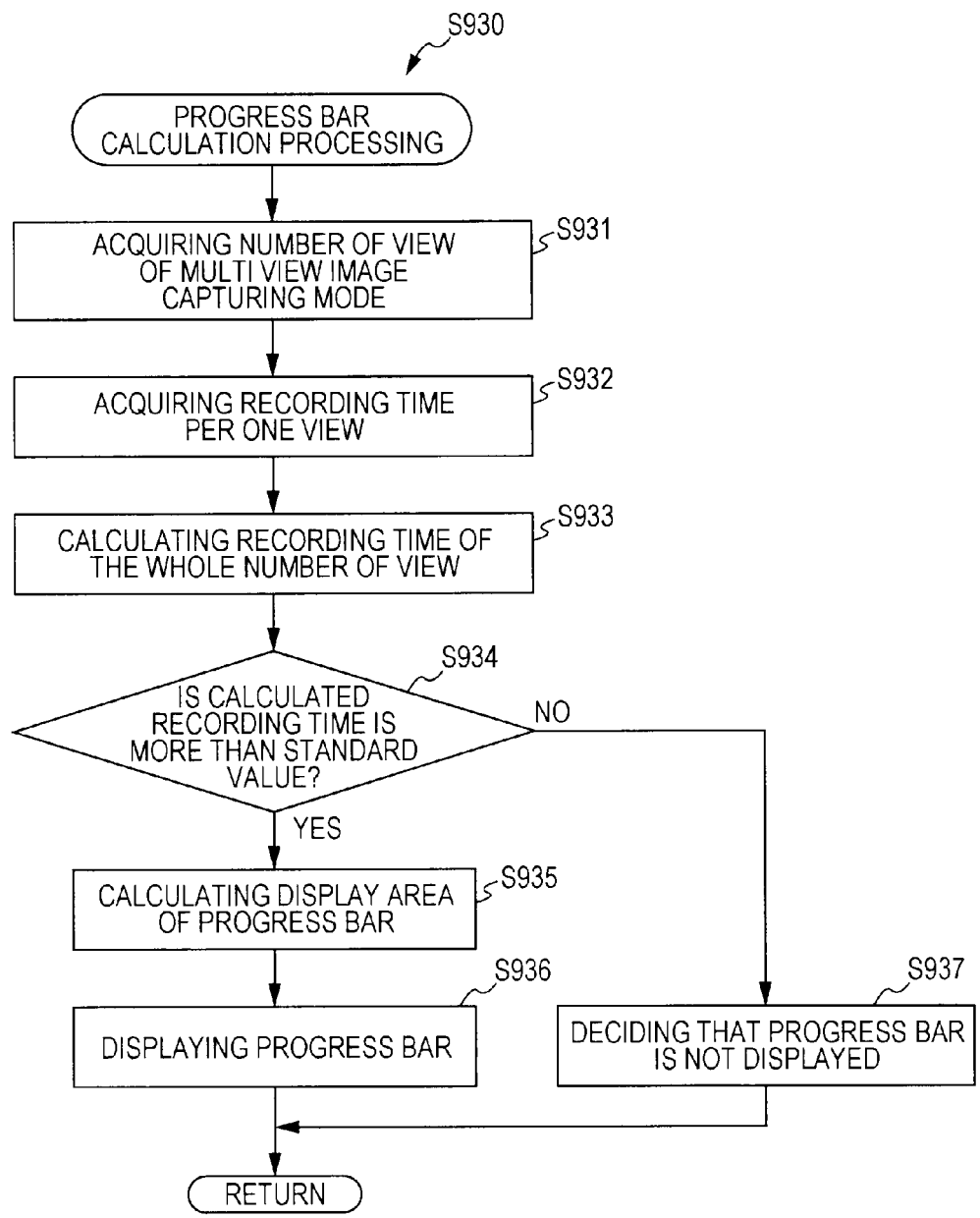
FIG. 25 is a flow chart that shows an example of a progress bar calculation processing among a processing sequence of a multi-view image recording processing according to an imaging device in the first embodiment of the invention.

FIG. 25 is a flow chart that shows a progress bar calculation processing (the processing sequence of step S930 shown in FIG. 22) among the processing sequences of the multi-view image recording processing by the imaging device 100 of the first embodiment of the invention.

Firstly, the control portion 230 acquires the view number of the set multi-view image capturing mode (step S931) and acquires the recording time per one view (step S932). Next, the control portion 230 calculates the recording time of the whole view numbers based on the acquired view number and the recording time per one view (step S933).

Next, it is decided whether or not the recording time of the whole calculated view numbers is equal to or greater than a regulated time (step S934). When the recording time of the whole calculated view number is equal to or greater than a regulated time (step S934), the control portion 230 calculates the display area of the progress bar based on the acquired view number (step S935). In this case, for example, when the number of the multi-view image becoming the composition target is great, the plurality of multi-view image is set as one unit, and whenever the composition processing of the respective multi-view images corresponding to the respective units is finished, the setting is performed in which the display state of the progress bar is changed. Next, the display control portion 280 displays the progress bar on the display portion 285 (step S936).

Furthermore, when the recording time of the whole calculated view number is less than the regulated value (step S934), the control portion 230 determines that the progress bar is not displayed (step S937). In this case, the progress bar is not displayed on the display portion 285.

Figure 26:
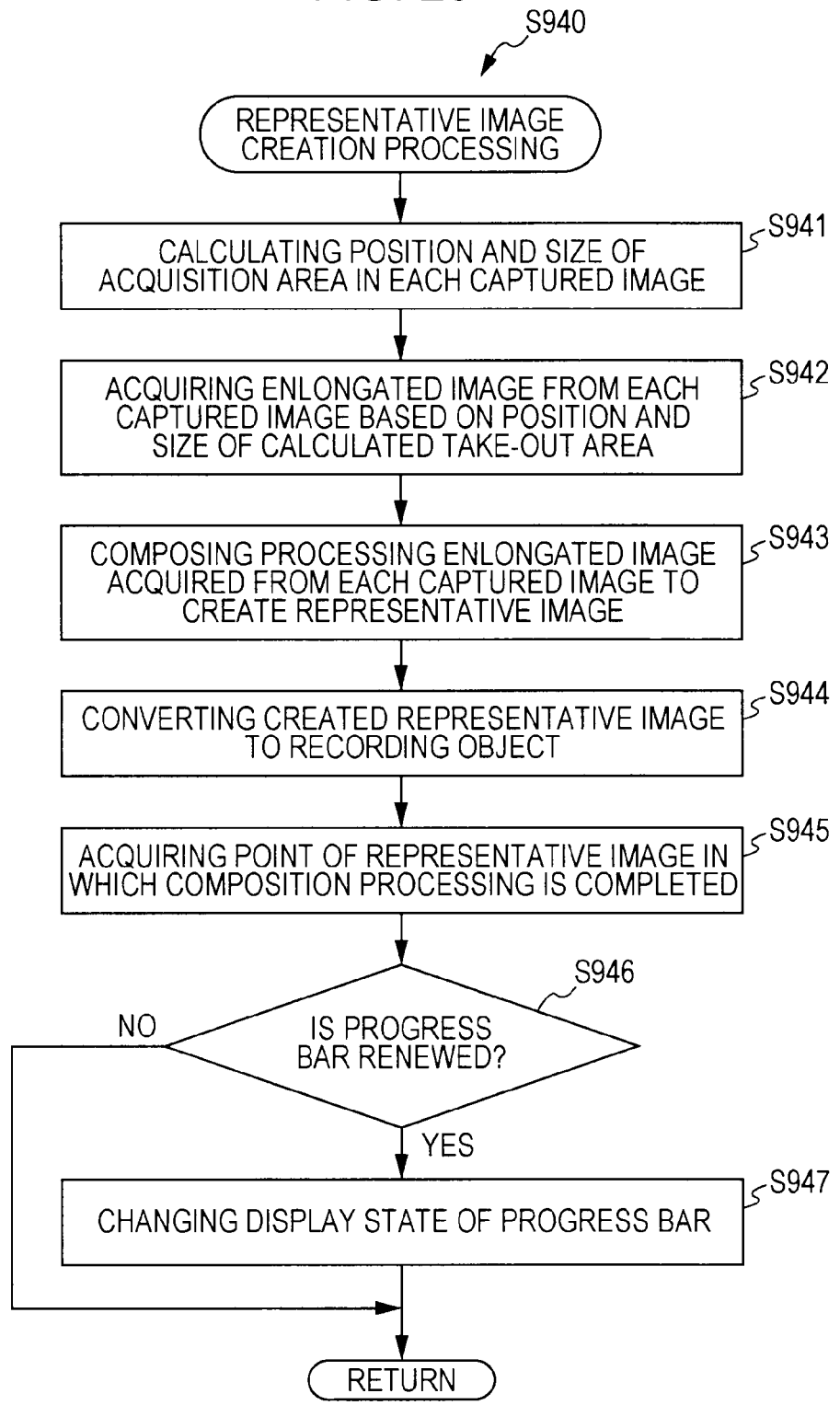
FIG. 26 is a flow chart that shows an example of a representative image creation processing among a processing sequence of a multi-view image recording processing according to an imaging device in the first embodiment of the invention.

FIG. 26 is a flow chart that shows an example of a representative image creation processing (the processing sequence of step S940 shown in FIG. 22) among the processing sequence of the multi-view image recording processing by the imaging device 100 in the first embodiment of the invention.

Firstly, the composition portion 270 calculates the position and the size of the take-out area (the elongated area) in the respective captured images maintained in the captured image maintenance portion 250 based on the interpretation result output from the control portion 230 (step S941). Next, the composition portion 270 acquires the elongated image from the respective captured images maintained in the captured image maintenance portion 250 based on the position and the size of the calculated take-out area (step S942).

Next, the composition portion 270 composes the elongated image acquired from the respective captured images to create the representative image (step S943). In this case, the composition portion 270 composes the acquired image in an overlapped manner based on the movement amount and the movement direction output from the movement amount detection portion 260 to create the representative image.

Next, the composition portion 270 converts the created representative image to the recording resolution (step S944), and acquires the view number of the representative image in which the composition processing is finished (step S945). Next, it is decided whether or not the renewal of the progress bar is necessary (step S946). For example, when a setting is performed in which the plurality of multi-view images is set as one unit and the display state of the progress bar is changed, during the time until the composition processing of the respective multi-view images corresponding to the respective units is finished, it is decided that the renewal of the progress bar is unnecessary. Moreover, when the renewal of the progress bar is necessary (step S946), the display control portion 280 changes the display state of the progress bar (step S947), and the operation of the representative image creation processing is finished. On the other hand, when the renewal of the progress bar is unnecessary (step S946), the operation of the representative image creation processing is finished.

Figure 27:
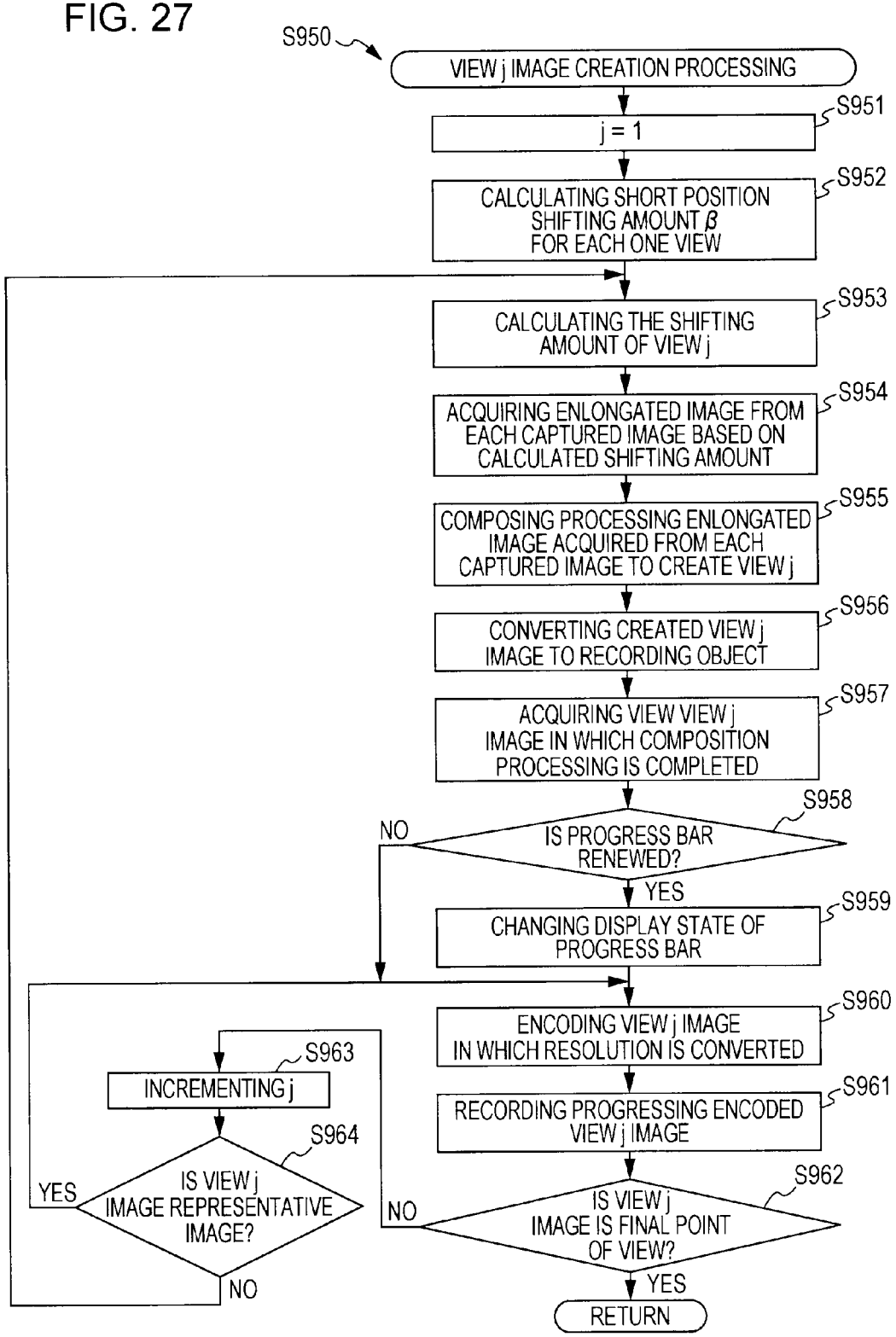
FIG. 27 is a flow chart that shows an example of a view j image creation processing among a processing sequence of a multi-view image recording processing according to an imaging device in the first embodiment of the invention.

FIG. 27 is a flow chart that shows an example of a view j image creation processing (the processing sequence of step S950 shown in FIG. 22) among the processing sequence of the multi-view image recording processing by the imaging device 100 in the first embodiment of the invention.

Firstly, j=1 (step S951). Next, the composition portion 270 calculates an elongated position shifting amount β using the size of the take-out area (the elongated area) calculated in step S941 (step S952). Next, the composition portion 270 calculates a shifting amount (e.g., MQj shown in equation 5) of the view j using the calculated elongated position shifting amount β (step S953).

Next, the composition portion 270 acquires the elongated image from the respective captured image maintained in the captured image maintenance portion 250 based on the shifting amount of the calculated view j, and the position and the size of the take-out area (step S954).

Next, the composition portion 270 composes the elongated image acquired from the respective captured images to create the view j image (the multi-view image) (step S955). In this case, the composition portion 270 composes the acquired images in an overlapped manner to created the view j image based on the movement amount and the movement direction that are output from the movement amount detection portion 260.

Next, the composition portion 270 convert the created view j image to the recording resolution (step S956), and acquires the view number of the view j image in which the composition processing is finished (step S957). Next, it is decided whether or not the renewal of the progress bar is necessary (step S958), and, when the renewal of the progress bar is necessary, the display control portion 280 changes the display state of the progress bar (step S959). Meanwhile, when the renewal of the progress bar is unnecessary (step S958), the process progresses to step S960.

Next, the recording control portion 290 encodes the view j image in which the resolution is changed (step S960) and records the encoded view j image on the MP file (step S961). Next, it is decided whether or not the view j is the final view (step S962), and, when the view j is the final view, the operation of the view j image creation processing is performed. On the other hand, when the view j is not the final view (step S962), j is incremented (step S963), and it is decided whether or not the view j image is the representative image (step S964). When the view j image is the representative image (step S964), the process returns to step S960, and, when the view j image is not the representative image, the process returns to step S953.

2. Second Embodiment

In the first embodiment of the invention, an example has been shown in which the plurality of images created by a series of imaging operations is displayed based on a predetermined rule. Herein, when the multi-view image which is created by the imaging operation after the imaging operation of the multi-view image in the multi-view image capturing mode is finished, it is supposed that a user desires the display of the multi-view image of a particular point of time. Thus, in the second embodiment of the invention, an example is shown in which, after the imaging operation of the multi-view image is finished, the image becoming the display target is changed depending on the posture of the imaging device and is displayed. In addition, the configuration of the imaging device in the second embodiment of the invention is approximately the same as the examples shown in FIGS. 1 and 11 except that an input and output panel 710 is provided instead of the LCD 172. For that reason, the portions common to the first embodiment of the invention will be denoted by the identical reference numerals and a part of the description thereof will be omitted.

Exterior Configuration Example of Imaging Device and Using Example Thereof

Figure 28A:
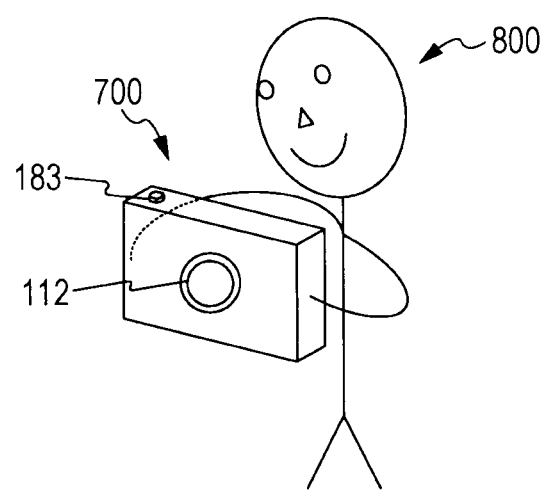
FIGS. 28A and 28B are diagrams that show an exterior configuration of an imaging device in a second embodiment of the invention and an example of a posture at the time of using thereof.
Figure 28B:
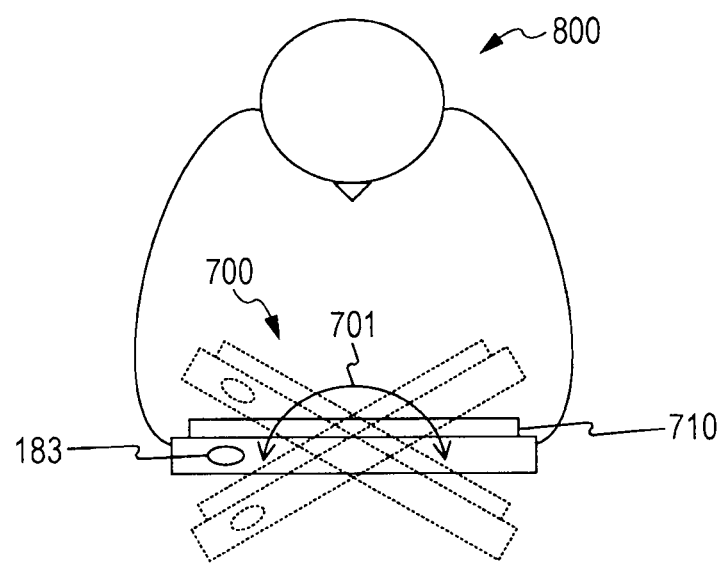

FIGS. 28A and 28B are a diagram that shows an exterior configuration example of an imaging device 700 in the second embodiment of the invention and an example of the posture at the time of using thereof. The imaging device 700 includes an input and output panel 710.

The input and output panel 710 displays various images and receives the operation input from a user by detecting the contact operation in the input and output panel 710. That is, the input and output panel 710 includes a touch panel, and the touch panel is, for example, disposed on the display panel in an overlapped manner so as to transmit the screen of the display panel, and receives the operation input from a user by detecting the object coming into contact with the display surface.

In addition, the imaging device 700 includes another operation member such as an electric power switch and a mode switch-over switch, a lens portion or the like, but for the convenience of description, showing and description thereof will be omitted. Furthermore, a part of the optical unit 112 is built in the imaging device 700.

FIG. 28A shows an example of the posture of the imaging device 700 when the review-display of the multi-view image is performed using the imaging device 700. For example, when a person 800 displays the multi-view image using the imaging device 700 after the end of the imaging operation of the multi-view image, the person 800 can see the image displayed on the input and output panel 710 in the state of grasping the imaging device 700 with both hands.

FIG. 28B shows a transition example when the posture of the imaging device 700 is changed. FIG. 28B is an example which simply shows a case where the state shown in FIG. 28A is viewed from the upper surface.

Herein, a change in posture of the imaging device 700 will be described. For example, a user can change a rotation angle around the intersecting three axes (i.e., a yaw angle, a pitch angle, and a roll angle) in the state of grasping the imaging device 700 with both hands. For example, in the state of the imaging device 700 shown in FIG. 28B, the posture of the imaging device 700 can be changed (a change in yaw angle) in an arrow direction 701 which sets the vertical direction as an axis. Furthermore, for example, in the state of the imaging device 700 shown in FIG. 28B, the posture of the imaging device 700 can be changed (a change in pitch angle) in the rotation direction which sets the horizontal direction as an axis. Furthermore, for example, in the state of the imaging device 700 shown in FIG. 28B, the posture of the imaging device 700 can be changed (a change in roll angle) in a rotation arrow direction which sets the front to rear direction of the person 800 as an axis.

In addition, in the second embodiment of the invention, an example is shown in which, by changing the posture of the imaging device 700 as shown in FIG. 28B, the image review-displayed on the input and output panel 710 is sequentially changed. That is, an example is shown in which the image review displayed on the input and output panel 710 is sequentially changed by the gesture operation by a user.

Relation Example to Rotation Angle

Figures 29A, 29B:
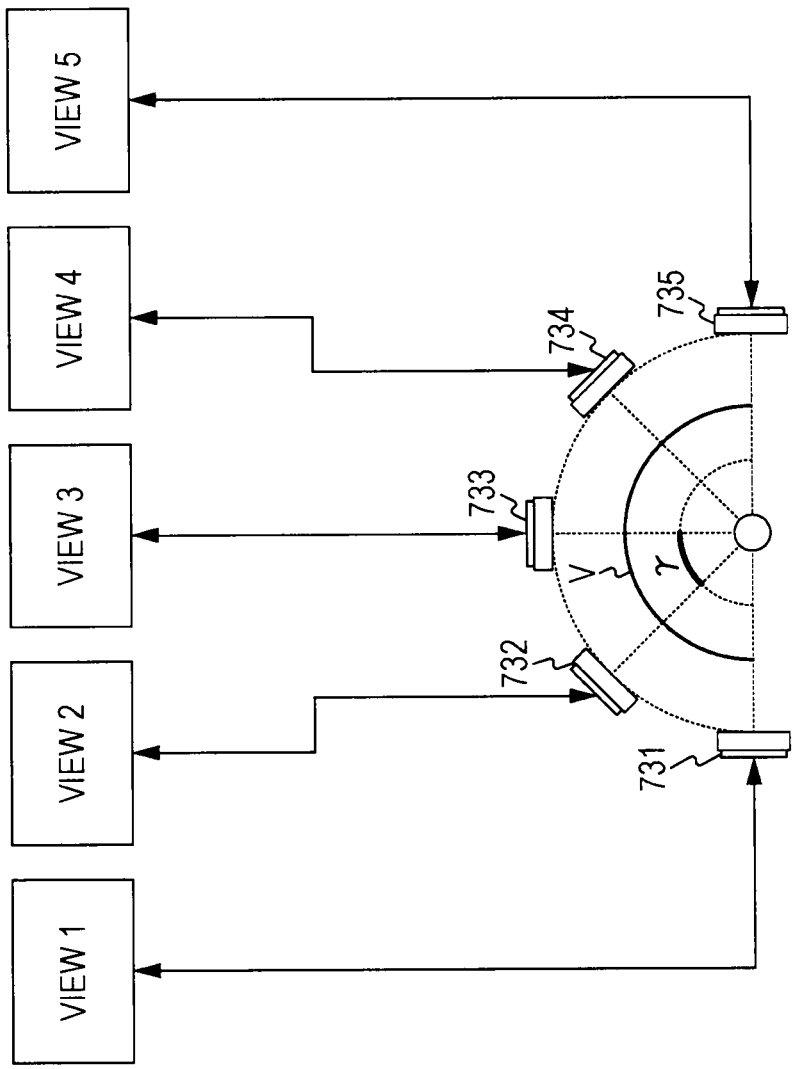
FIGS. 29A and 29B are diagrams that schematically show a relationship between a plurality of multi-view images created using an imaging device in the second embodiment of the invention and a tilt angle of an imaging device when the plurality of multi-view images are review-displayed.

FIGS. 29A and 29B schematically show a relationship between a plurality of multi-view images created using the imaging device 700 in the second embodiment of the invention and a slop angle of the imaging device 700 when they are review displayed. In the example, a case will be explained where the multi-view image of five views is created as an example.

FIG. 29A simply shows the plurality of multi-view images (view 1 to view 5) created using the imaging device 700.

FIG. 29B shows a transition example of the imaging device 700 when the respective multi-view images are review-displayed after the imaging operation of the plurality of multi-view images (view 1 to view 5) shown in FIG. 29A is finished. FIG. 29B shows an exterior of a bottom surface (that is, a surface opposite to the surface on which the shutter button 183 is provided) of the imaging device 700.

Furthermore, FIG. 29B schematically shows an operation range (the whole range (angle V) of the rotation angle) of the imaging device 700 corresponding to the transition of the imaging device 700. In addition, preferably, the angle V is an angle by which a user can see the display screen, and the angle can be 180°.

Furthermore, FIG. 29B shows an example in which the display state of the multi-view image is changed by rotating the imaging device 700 in the arrow 701 direction shown in FIG. 28B to change the posture. A tilt angle (a standard angle), which becomes the standard upon changing the display state of the multi-view image in this case, is represented by γ. The tilt angle γ may be suitably set depending on the number of the multi-view image and may be set by the user operation depending on the preference of a user. The tilt angle γ can be, for example, 45°.

Furthermore, the multi-view image (view 1 to view 5) shown in FIG. 29A and the imaging device 700 (the imaging device 700 of the sloped states 731 to 735 in the tilt angle γ unit) shown in FIG. 29B are shown so as to be connected by arrows and related to each other. In this manner, the created multi-view images (views 1 to 5) are suitably divided in the respective state of tilting by the tilt angle γ unit. In addition, the operation, in which the display state of the multi-view image is changed by tilting the imaging device 700, will be described in detail with reference to FIG. 30.

Figure 30A:
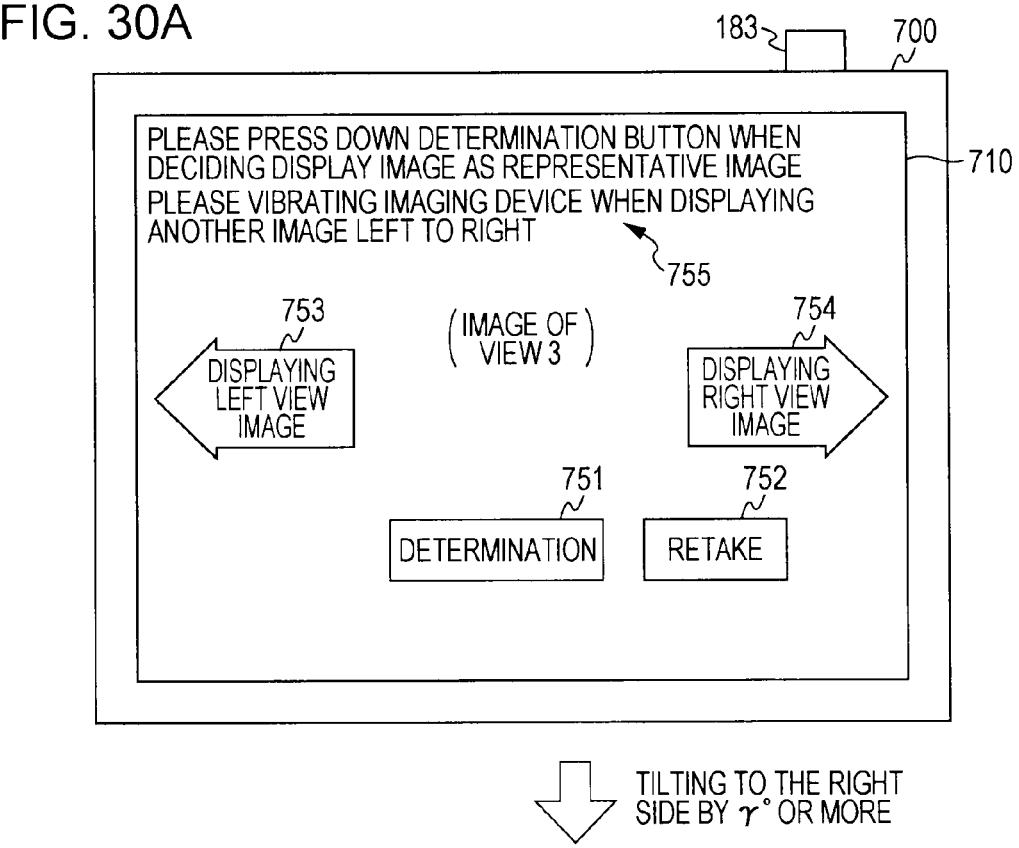
FIGS. 30A and 30B are diagrams that show a display transition example of an image displayed on an input and output panel in the second embodiment of the invention.

FIG. 30 is a diagram that shows a display transition example of the image displayed on the input and output panel 710 in the second embodiment of the invention. FIG. 30A shows a display example of the input and output panel 710 immediately after the imaging operation of the multi-view image (view 1 to view 5) shown in FIG. 29A is finished. For example, as shown in the first embodiment of the invention, immediately after the imaging operation of the multi-view image (view 1 to view 5) is finished, the multi-view image of the view 3 is displayed on the input and output panel 710 as the representative image.

Figure 30B:
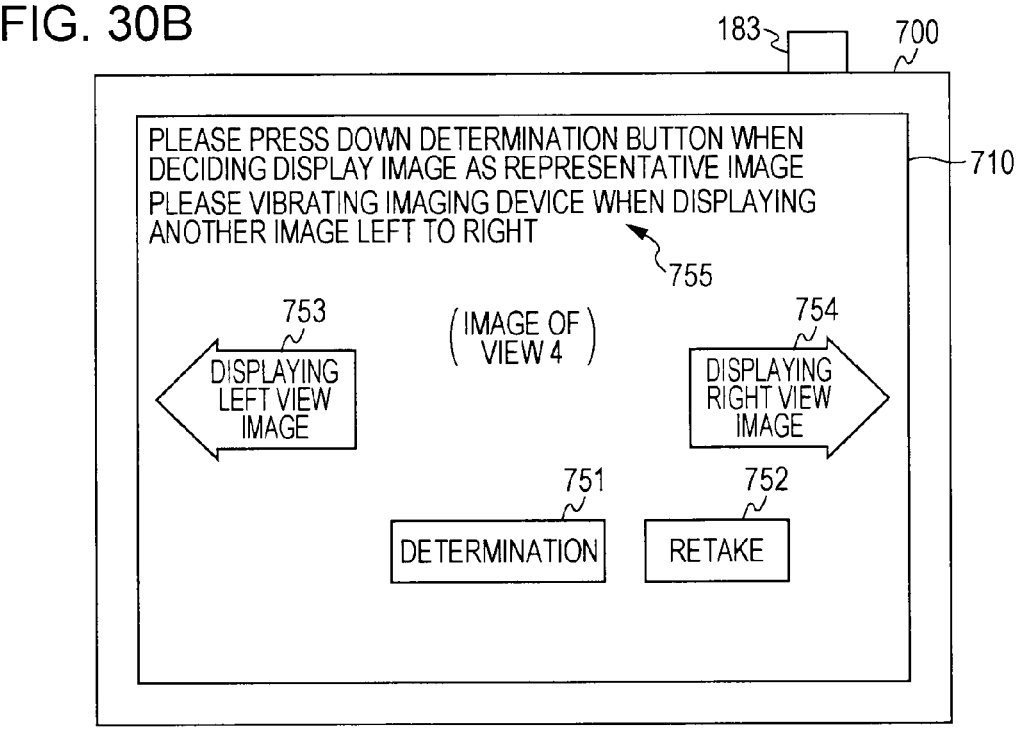

On the display screen shown in FIG. 30A, the multi-view image of the view 3 is displayed, and a determination button 751, a retake button 752, an operational support information 753 and 754, and a message 755 are displayed so as to be overlapped with the multi-view image. In addition, the multi-view images, which are displayed on the display screen shown in FIGS. 30A and 30B, are simply shown by putting the corresponding characters in parenthesis.

The determination button 751 is a button which is pressed down when the multi-view image (the representative image candidate) displayed on the input and output panel 710 is newly determined as the representative image. That is when the determination button 751 is pressed down, the multi-view image displayed on the input and output panel 710 at the time of press-down operation is determined as the representative image. Moreover, the recording control portion 290 relates to the representative image information showing the determined representative image and the sequence relationship (e.g., the view number) of the multi-view image to the created multi-view image and records the multi-view image on the recording medium as the MP file.

The retake button 752 is, for example, a button which is pressed down when the imaging operation of the multi-view image is newly performed. That is, after confirming the multi-view image displayed on the input and output panel 710, when a user decides whether there is a necessity to perform the retaking of the multi-view image, by pushing down the retake button 752, the retaking can be rapidly performed.

The operational support information 753 and 754 is an operation guide for supporting the operation for changing the multi-view image that is displayed on the input and output panel 710. The message 755 is an operation guide for supporting the operation thereof and the determination operation of the representative image.

FIG. 30B shows a display example of the input and output panel 710 when the person 800 tilts the imaging device 700 to the right side by an angle greater than or equal to the tilt angle γ from the state shown in FIG. 30A.

For example, as shown in FIG. 30A, in the state in which the multi-view image of three views is review-displayed on the input and output panel 710, it is considered that the person 800 desires the display of another multi-view image. For example, in the state in which the multi-view image of the view 3 is review-displayed on the input and output panel 710, when the person 800 tilts the imaging device 700 to the right side by an angle greater than or equal to the tilt angle γ, as shown in FIG. 30B, the multi-view image of the view 4 is review-displayed on the input and output panel 710. Moreover, for example, in the state in which the multi-view image of the view 4 is review-displayed on the input and output panel 710, when the person 800 tilts the imaging device 700 to the right side by an angle greater than or equal to the tilt angle γ, the multi-view image of the view 5 is review-displayed on the input and output panel 710.

Furthermore, for example, in the state in which the multi-view image of the view 3 is review-displayed on the input and output panel 710, when the person 800 tilts the imaging device 700 to the left side by an angle greater than or equal to the tilt angle γ, the multi-view image of the view 2 is review-displayed on the input and output panel 710. Moreover, for example, in the state in which the multi-view image of the view 2 is review-displayed on the input and output panel 710, when the person 800 tilts the imaging device 700 to the left side by an angle greater than or equal to the tilt angle γ, the multi-view image of the view 1 is review-displayed on the input and output panel 710. In this manner, it is possible to review-display the multi-view image other than the representative image on the input and output panel 710 as the representative image candidate by the operation of tilting the imaging device 700.

Furthermore, in the state in which the representative image candidate is review-displayed on the input and output panel 710 by the operation of tilting the imaging device 700, when the determination button 751 is pressed down, the representative image candidate is determined as a new representative image. For example, in the state in which the multi-view image of the view 2 is review-displayed on the input and output panel 710 by the operation of tilting the imaging device 700, when the determination button 751 is pressed down, instead of the multi-view image of the view 3, the multi-view image of the view 2 is determined as a new representative image.

Herein, in the state in which the multi-view image of the view 3 is review-displayed on the input and output panel 710, when the person 800 tilts the imaging device 700 in any direction by an angle greater than or equal to the tilt angle γ, another multi-view image is review-displayed. In this case, it is supposed that the composition portion 270 does not finish the composition processing of the multi-view image becoming the display target. Thus, when the display target image is changed by the operation of tilting the imaging device 700, in a case where the composition processing of the multi-view image becoming the display target is not finished, the composition processing of the multi-view image becoming the display target is performed in preference to other multi-view images. That is, when the change of the display target image is not performed by the operation of tilting the imaging device 700, the composition processing is sequentially performed in the same sequence as the first embodiment of the invention. On the other hand, when the display target image is changed by the operation of tilting the imaging device 700 and the composition processing of the multi-view image becoming the display target is finished, the composition portion 270 preferentially performs the composition processing of the multi-view image becoming the display target.

As a result, a user can easily and rapidly review-display a desired multi-view image depending on the tilt of the imaging device 700. For this reason, when a user confirms the multi-view image, it is possible to easily perform the confirmation. Furthermore, by pressing down the determination button 751, a desired multi-view image can be determined as the representative image.

In addition, the examples shown in FIGS. 30A and 30B show display examples in which the display of the progress bar is omitted, but the progress bar may be displayed simultaneously with the multi-view image. In this manner, an example, in which the multi-view image and the progress bar are displayed, is shown in FIGS. 31A and 31B.

Figure 31A:
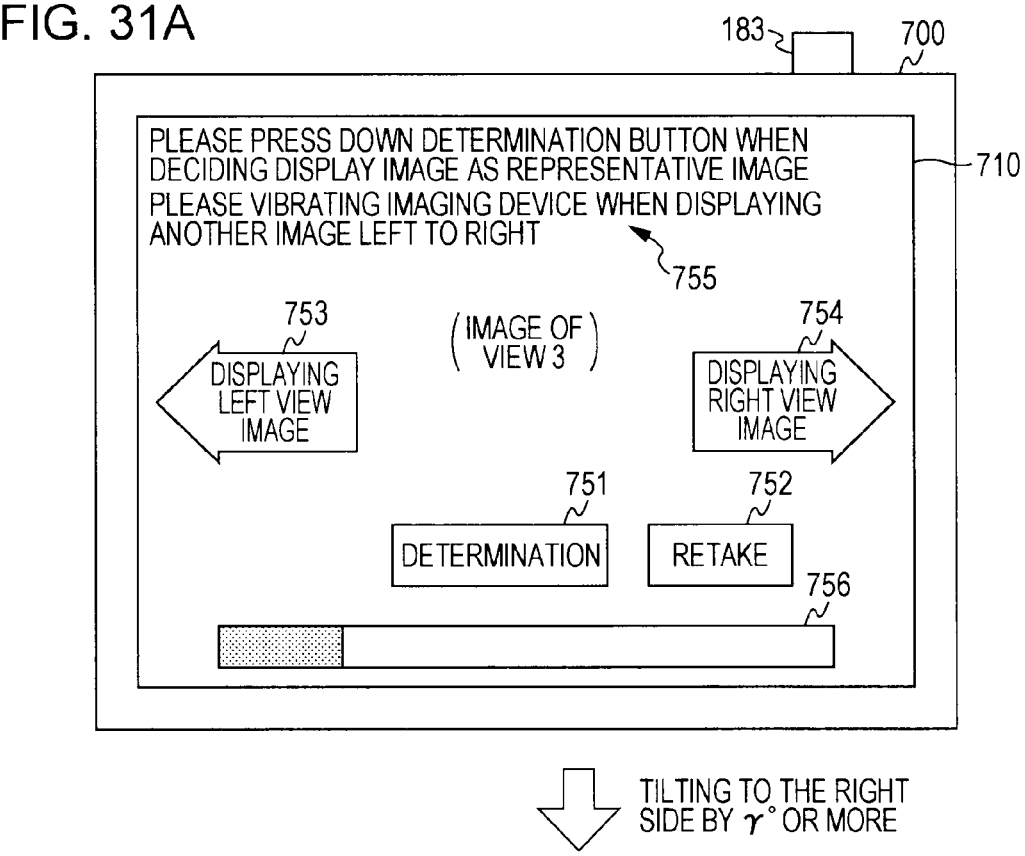
FIGS. 31A and 31B are diagrams that show a display transition example of an image displayed on an input and output panel in the second embodiment of the invention.
Figure 31B:
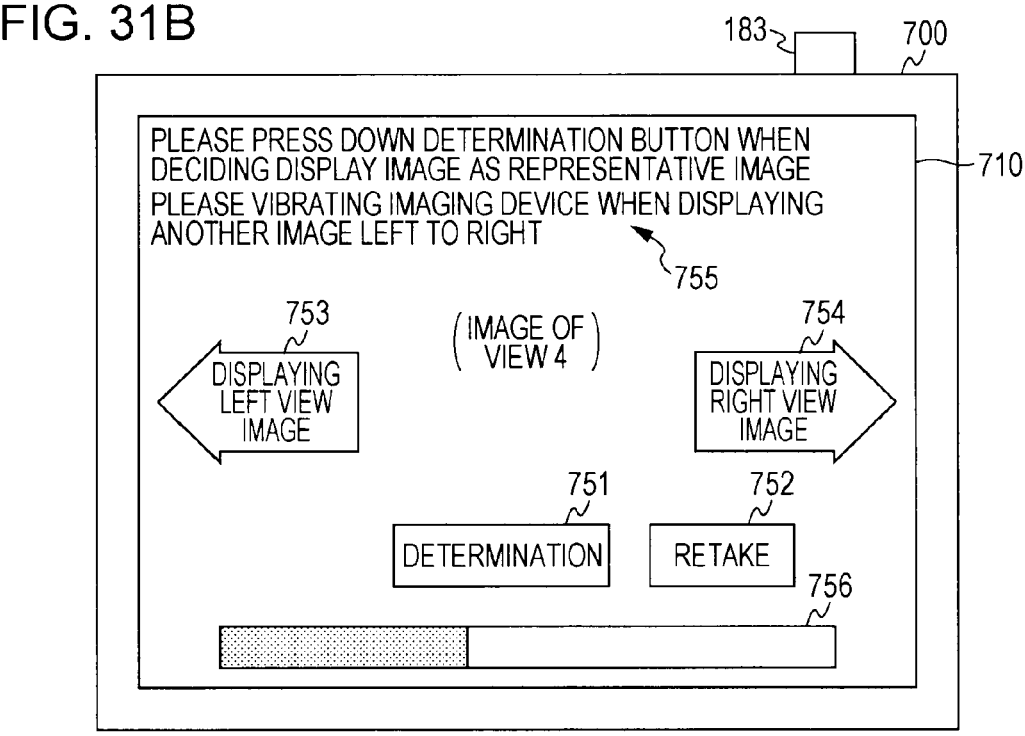

FIGS. 31A and 31B are diagrams that show display transition examples displayed on the input and output panel 710 in the second embodiment of the invention. FIGS. 31A and 31B are examples in which a progress bar 756 is provided on the respective display screens shown in FIGS. 30A and 30B and are the same as the examples shown in FIGS. 30A and 30B except that another progress bar 756 is provided. In addition, a change in display state in the progress bar 756 or the like is the same as the display state in the first embodiment of the invention.

That is, the posture detection portion 220 detects a change in posture of the imaging device 700 based on the posture of the imaging device 700 when the representative image is displayed on the input and output panel 710. Moreover, the control portion 230 performs a control which sequentially displays the multi-view image (the representative image candidate) on the input and output panel 710 based on the detected posture change and a predetermined rule after displaying the representative image on the input and output panel 710. Herein, the predetermined rule means, for example, the relation of the multi-view image (views 1 to 5) shown in FIG. 29A and the states 731 to 735 (states 731 to 735 tilted by the tilt angle γ unit) shown in FIG. 29B.

In addition, the second embodiment of the invention shows an example in which the representative image is initially displayed on the input and output panel 710, but the multi-view image to be initially displayed may be determined based on a change in posture immediately after the creation processing of the plurality of captured images by the imaging portion 240 is finished. That is, the posture detection portion 220 detects the change in posture of the imaging device 700 based on the posture of the imaging device 700 immediately after the creation processing of the plurality of captured images by the imaging portion 240 is finished. Moreover, the control portion 230 may display the multi-view image corresponding to the sequence (the view) depending on the change of the detected posture on the input and output panel 710 as the representative image. In this case, when the composition processing of the multi-view image becoming the display target is not finished, the composition portion 270 preferentially performs the composition processing of the multi-view image becoming the display target.

Furthermore, the second embodiment of the invention shows an example which uses the operation method of tilting the imaging device 700 as the operation method for displaying the representative image candidate, but the representative image candidate may be displayed using an operation member such as a key button.

Moreover, the second embodiment of the invention showed an example in which the representative image candidate is displayed by the user operation to determine the representative image. However, as shown in the first embodiment of the invention, when the multi-view image is automatically and sequentially displayed, the representative image may be determined from the displayed multi-view image by the user operation. In this case, for example, when a desired multi-view image is displayed, the determination of the representative image can be performed by the determination operation using an operation member such as a determination button.

Operation Example of Imaging Device

Figure 32:
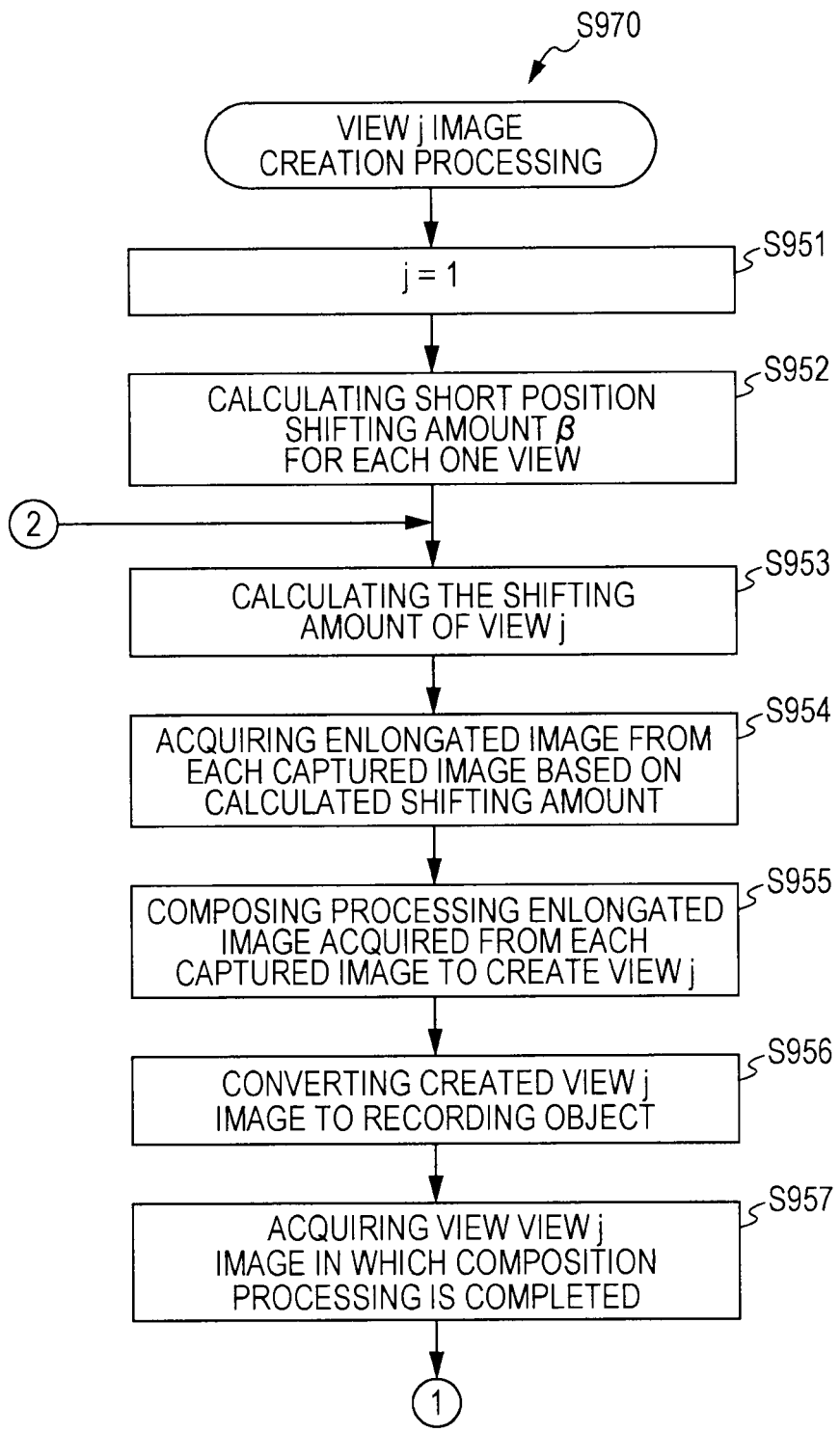
FIG. 32 is a flow chart that shows an example of a processing sequence of a multi-view image recording processing according to an imaging device in the second embodiment of the invention.
Figure 33:
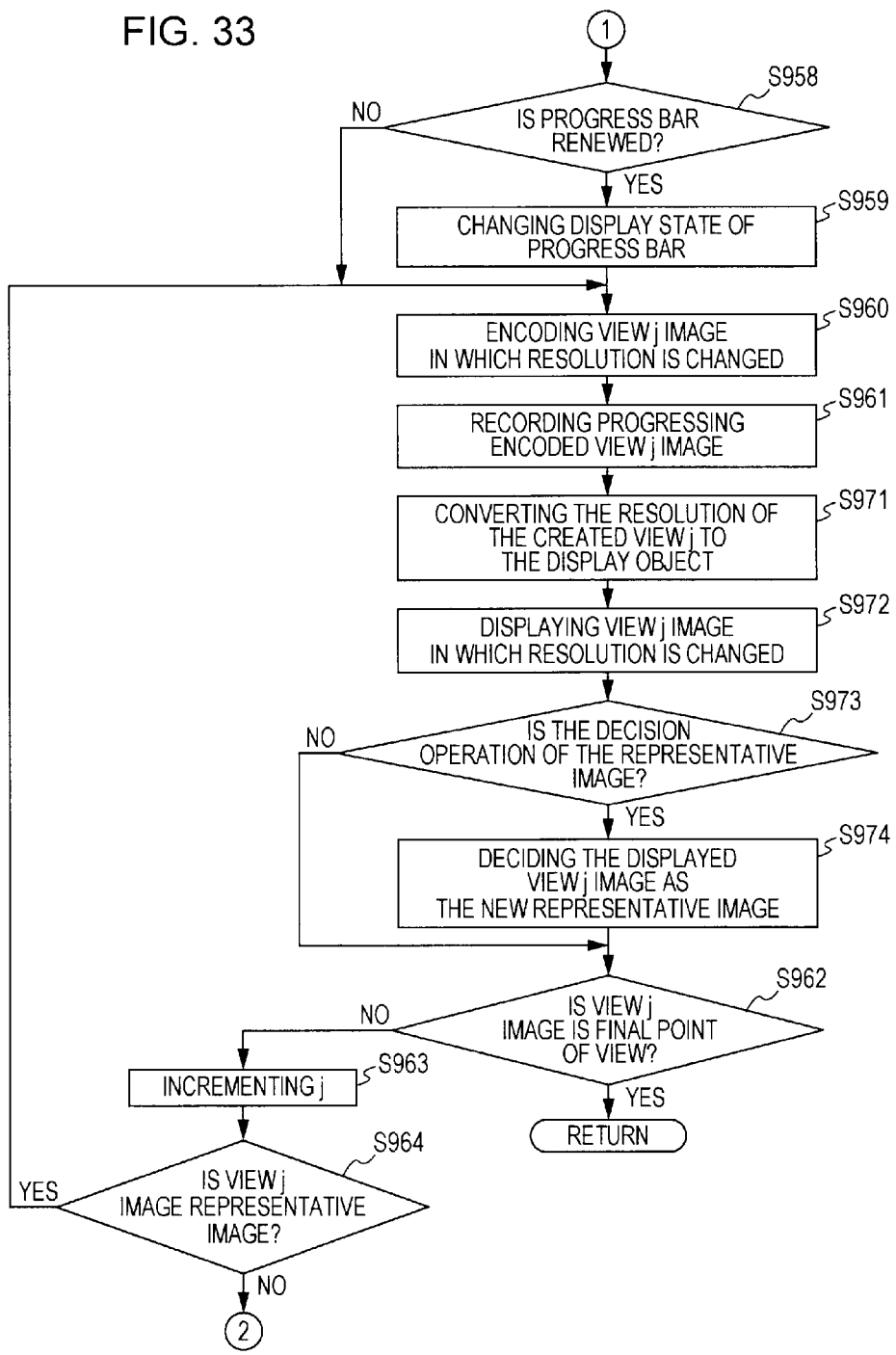
FIG. 33 is a flow chart that shows an example of a processing sequence of a multi-view image recording processing according to an imaging device in the second embodiment of the invention.

FIGS. 32 and 33 are flow charts that show an example of the processing sequence of the multi-view image recording processing by the imaging device 700 in the second embodiment of the invention. The processing sequence is a modified example of FIG. 27 (the processing sequence of step S950 shown in FIG. 22). For this reason, the same processing sequences as those shown in FIG. 27 are denoted by the same reference numerals and the description of the common portion will be omitted. Furthermore, the processing sequence shows an example in which the representative image is determined by the user operation from the multi-view image that is automatically and sequentially displayed.

After the encoded view j image is recorded on the MP file (step S961), the display control portion 280 converts the resolution of the view j image created by the composition portion 270 to the display purpose (step S971). Next, the display control portion 280 displays the display view j image, in which the resolution is converted, on the display portion 285 (step S972).

Next, it is decided whether or not the determination operation of the representative image is performed (step S973), and when the determination operation of the representative image is performed, the control portion 230 determines the view j image displayed on the display portion 285 as a new representative image (step S974). On the other hand, when the determination operation of the representative image is not performed (step S973), the process progresses to step S962.

Figure 34:
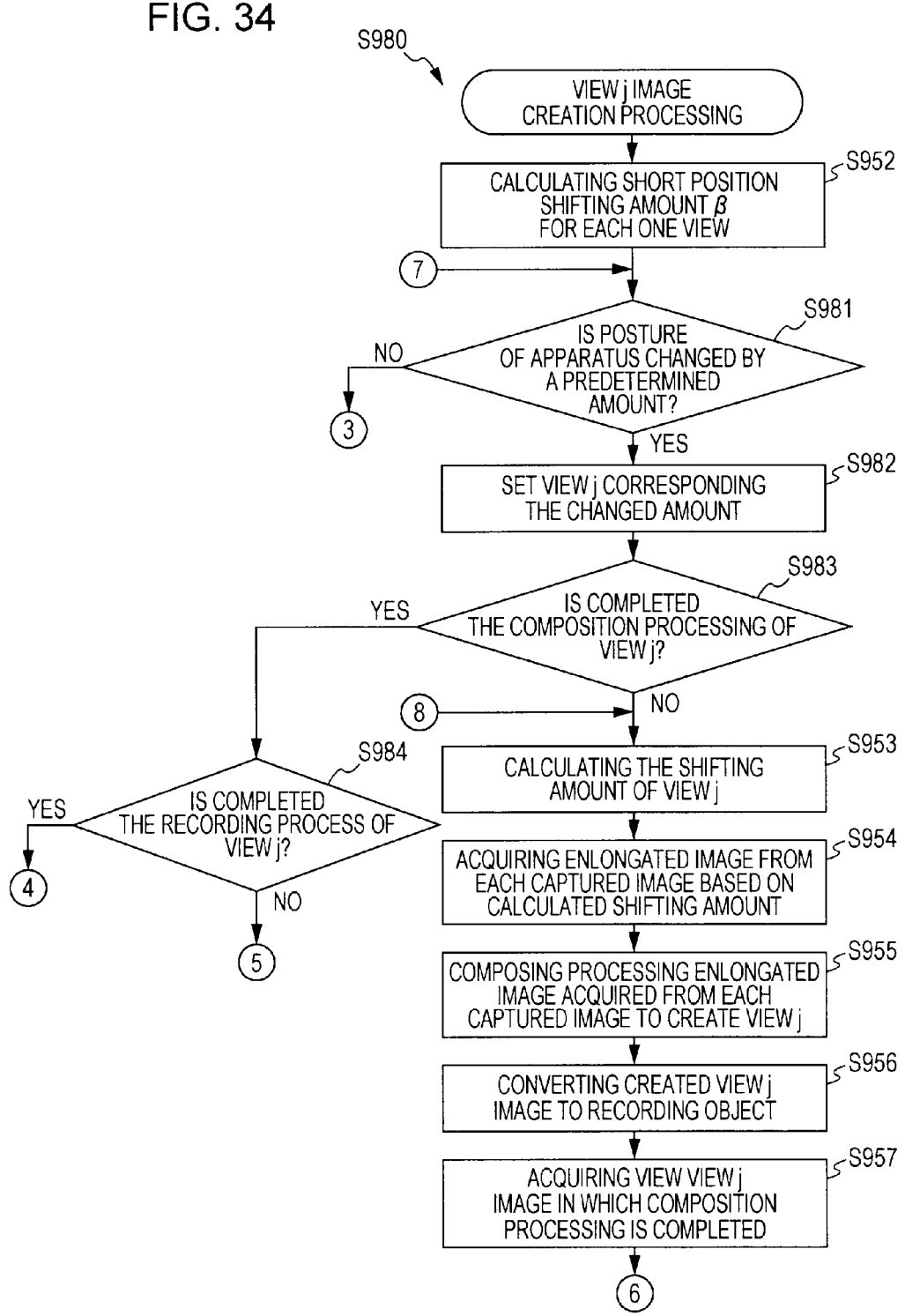
FIG. 34 is a flow chart that shows an example of a processing sequence of a multi-view image recording processing according to an imaging device in the second embodiment of the invention.
Figure 35:
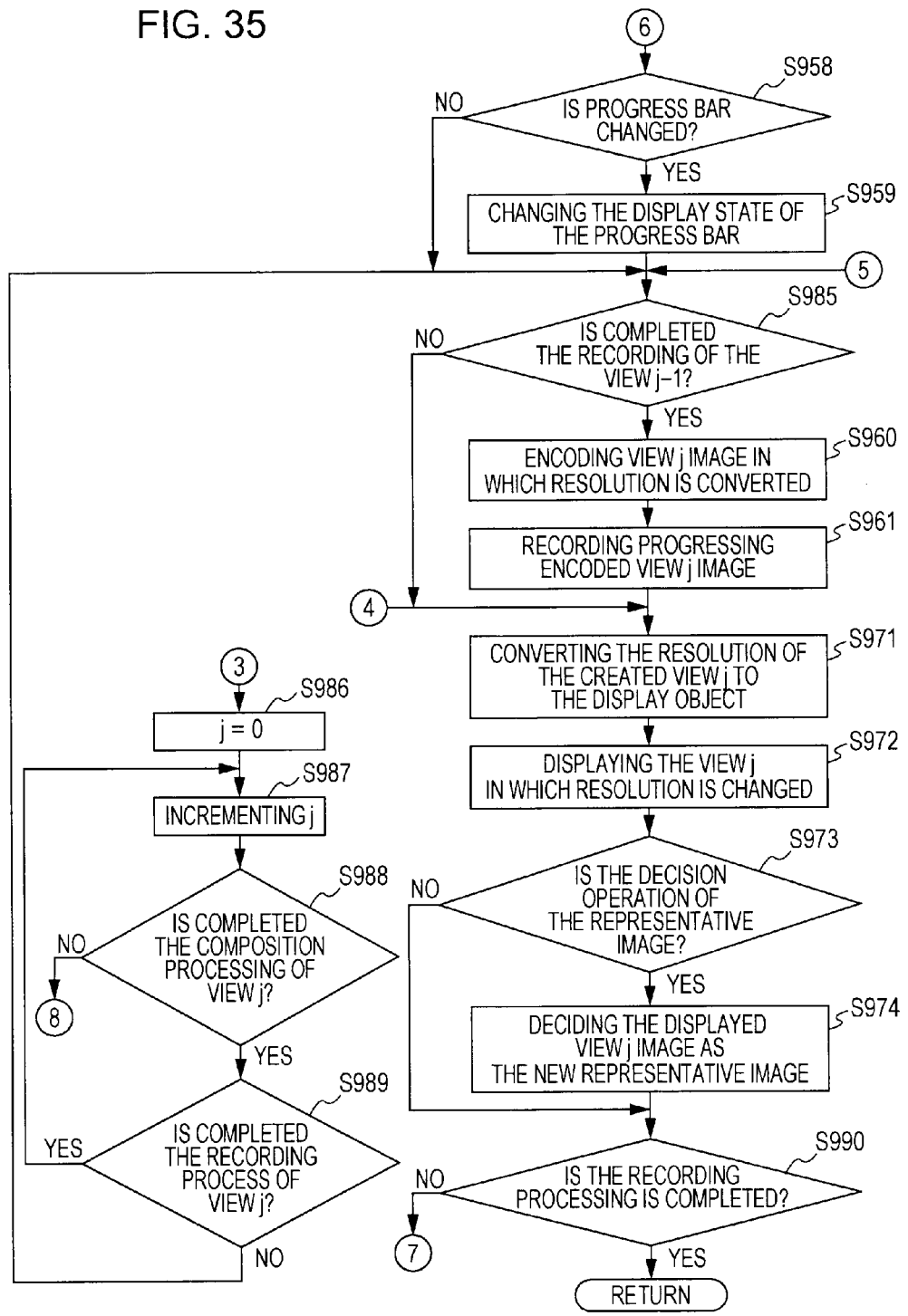
FIG. 35 is a flow chart that shows an example of a processing sequence of a multi-view image recording processing according to an imaging device in the second embodiment of the invention.

FIGS. 34 and 35 are flow charts that show an example of the processing sequence of the multi-view image recording processing by the imaging device 700 of the second embodiment of the invention. The processing sequence is a modified example of FIGS. 32 and 33 (the processing sequence of step S950 shown in FIG. 22). For this reason, the same processing sequences as those shown in FIGS. 32 and 33 are denoted by the same reference numerals and the description of the common portion will be omitted. Furthermore, the processing sequence shows an example in which the representative image candidate is displayed by the user operation to determine the representative image.

After the elongated position shifting amount β is calculated (step S952), it is decided whether or not the posture of the imaging device 700 is changed by more than a certain amount (step S981), and, when the posture of the imaging device 700 is not changed by more than a certain amount, the process progresses to step S985. Meanwhile, when the posture of the imaging device 700 is changed by more than a certain amount (step S981), the view j corresponding to the change is set (step S982). Next, it is decided whether or not the composition processing of the multi-view image of the view j is completed (step S983), and, when the composition processing of the multi-view image of the view j is completed, it is decided whether or not the recording processing of the multi-view image of the view j is completed (step S984). Herein, a case, where the composition processing of the multi-view image of the view j is completed, is, for example, a case where, in regard to the view j image (the multi-view image) created by the composition of the elongated image, the recording resolution conversion is not performed (e.g., the view j image (the final image) 420 shown in FIG. 9). Furthermore, a case where, the recording processing of the multi-view image of the view j is completed, is, for example, a case where the encoded view j image (the multi-view image) is recorded on the MP file (e.g., a case of being recorded on the MP file shown in FIG. 9).

Furthermore, when the composition processing of the multi-view image of the view j is completed (step S938), the process progresses to step S953. Furthermore, when the recording processing of the multi-view image of the view j is completed (step S984), the process progresses to step S971, and, when the recording processing of the multi-view image of the view j is not completed, the process progresses to step S985.

Moreover, in step S985, it is decided whether or not the recording processing of a view (j−1) image is completed, and, when the recording processing of the view (j−1) image is completed, the process progresses to step S960. On the other hand, when the recording processing of the view (j−1) image is not completed (step S985), the process progresses to step S971.

Moreover, when the posture of the imaging device 700 is not changed by more than a certain amount (step S981), j=0 ((step S986), and j is incremented (step S987). Next, it is decided whether or not the composition processing of the multi-view image of the view j is completed (step S988), and when the composition processing of the multi-view image of the view j is completed, it is decided whether or not the recording processing of the multi-view image of the view j is completed (step S989). When the recording processing of the multi-view image of the view j is completed (step S989), the process returns to step S987, and when the recording processing of the multi-view image of the view j is not completed, the process returns to step S985. Moreover, when the composition processing of the multi-view image of the view j is not completed (step S988), the process returns to step S953.

Furthermore, when the recording processing of the multi-view image is completely finished (step S990), the operation of the view j image creation processing is finished. Meanwhile, when the recording processing of the multi-view image is not completely finished (step S990), the process returns to step S981.

In addition, in the embodiment of the invention, an example has been shown of the display example of the review display in a case where the multi-view image is created using the plurality of captured images that continue in the time series. However, when the continuous image is created using the plurality of captured images that continues in the time series, the embodiment of the invention can be applied to a case where the review-display is performed in regard to the continuous image. For example, when the continuous mode is set, the imaging portion 240 creates the plurality of captured images (e.g., 15 sheets) that continues in the time series. Moreover, the recording control portion 290 gives at least a part (or the whole) among the plurality of created captured images a sequence relationship based on a predetermined rule, relates them to each other, and records them on the content memory unit 300. That is, the plurality of captured images that continues in the time series is given with the sequence relationship depending on the creation sequence thereof, is related to each other, and recorded as the image file of the continuous image. In this case, the control portion 230 performs a control which displays the captured image (e.g., the image (the seventh image) of the right center) becoming a predetermined sequence among the plurality of captured images becoming the recording target on the display portion 285 as the representative image, after the creation processing of the plurality of captured images by the imaging portion 240 is finished.

Furthermore, the invention can be applied to an imaging device such as a mobile phone having an imaging function or a portable terminal device having an imaging function.

Moreover, the processes and functions described above may be implemented in a distributed or "cloud" computing environment in which the processing responsibilities are distributed among a plurality of processing devices. For example, the image data may be acquired at the imaging device, then transferred over a network, or other connection, to another processing device, which performs the processing steps described above to create the composite images. The composite images may then be transferred back to the imaging device, or to another processing device, which could then display the composite images. Similarly, the imaging device may acquire the image data from another processing device or imaging device, then perform the processing steps described above to create the composite images. Various other combinations are possible in such a distributed computing environment, and the present disclosure is not limited to a configuration in which all of the processing is performed in a single device, as disclosed in an exemplary embodiment above.

In addition, the embodiment of the invention shows an example for embodying the invention, as it is apparent from the embodiment of the invention, the matters in the embodiment of the invention and the specific matters of the invention in the claims are in the corresponding relationship, respectively. Similarly, the specific matters of the invention in the claims and the matter in the embodiment of the invention having the same name as the former are in the corresponding relationship, respectively. However, the present invention is not limited to the embodiment but can be embodied by carrying out various modifications of the embodiment within the scope without departing from the gist of the invention.

Furthermore, the processing sequence described in the embodiment of the invention may be understood as a method having the series of sequences, and may be understood as a program for executing the series sequences in a computer and as a recording medium that stores the program. The recording medium, for example, a CD (Compact Disc), an MD (Mini-Disc), a DVD (Digital Versatile Disc), a memory card, a Blu-ray Disc (trade mark) or the like can be used.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   circuitry configured to
      acquire a plurality of images;
      create a plurality of composite images having a sequential relationship based on a predetermined rule using at least a portion of each of the acquired images; and
      select one of the plurality of composite images in a middle of the sequential relationship with the other plurality of composite images as a representative image to be a first of the plurality of composite images to be created and displayed while the other plurality of composite images are being created.

2. The image processing apparatus of claim 1, further comprising:
   an imaging element configured to capture image data.

3. The image processing apparatus of claim 1, wherein the circuitry is configured to create each of the plurality of composite images by extracting selected portions of each of the acquired images.

4. The image processing apparatus of claim 1, wherein the acquired plurality of images correspond to a directional sequence of images.

5. The image processing apparatus of claim 4, wherein the predetermined rule defines that each of the plurality of composite images are generated by determining the portions of each of the acquired images that are extracted to form each composite image based on an amount of deviation between each of the images corresponding to the directional sequence of images.

6. The image processing apparatus of claim 1, further comprising:
   a display, wherein the circuitry is configured to control the display to display the plurality of composite images in the sequence in which they were created.

7. The image processing apparatus of claim 1, further comprising:
   a display, wherein the circuitry is configured to control the display to display the plurality of composite images in order according to the sequential relationship.

8. The image processing apparatus of claim 1, further comprising:
   a detection portion configured to detect a change in posture of the image processing apparatus.

9. The image processing apparatus of claim 8, further comprising:
   a display, wherein the circuitry is configured to control the display to display each of the plurality of composite images based on an output of the detection portion.

10. The image processing apparatus of claim 9, wherein the circuitry is configured to control the display to switch between displaying each of the plurality of composite images according to the sequential relationship based on an output of the detection portion.

11. The image processing apparatus of claim 9, wherein the change in posture corresponds to the image processing apparatus being tilted or rotated.

12. The image processing apparatus of claim 1, further comprising:
   a display, wherein the circuitry is configured to control the display to display the representative image and a graphical user interface configured to receive a command to sequentially scroll through the plurality of composite images.

13. The image processing apparatus of claim 12, wherein the graphical user interface is configured to receive an input selecting a currently displayed one of the plurality of composite images as the representative image.

14. The image processing apparatus of claim 12, further comprising:
   a detection portion configured to detect a change in posture of the image processing apparatus, wherein the circuitry is configured to control to the display to sequentially scroll through the plurality of composite images based on an output of the detection portion.

15. An image processing method performed by an image processing apparatus, the method comprising:
   acquiring, by circuitry of the image processing apparatus, a plurality of images;
   creating, by the circuitry, a plurality of composite images having a sequential relationship based on a predetermined rule using at least a portion of each of said acquired images; and
   selecting one of the plurality of composite images in a middle of the sequential relationship with the other plurality of composite images as a representative image to be a first of the plurality of composite images to be created and displayed while the other plurality of composite images are being created.

16. A non-transitory computer-readable medium including computer program instructions, which when executed by an image processing apparatus, cause the image processing apparatus to perform a method comprising:
   acquiring a plurality of images;
   creating a plurality of composite images having a sequential relationship based on a predetermined rule using at least a portion of each of said acquired images; and
   selecting one of the plurality of composite images in a middle of the sequential relationship with the other plurality of composite images as a representative image to be a first of the plurality of composite images to be created and displayed while the other plurality of composite images are being created.

* * * * *